US012446967B2

(12) United States Patent
Hananel et al.

(10) Patent No.: US 12,446,967 B2
(45) Date of Patent: Oct. 21, 2025

(54) SYSTEMS AND METHODS FOR AIMING AND ALIGNING OF A TREATMENT TOOL WITHIN AN X-RAY DEVICE OR AN ULTRASOUND DEVICE ENVIRONMENT

(71) Applicant: Fus Mobile Inc., Alpharetta, GA (US)

(72) Inventors: Ari Hananel, Alpharetta, GA (US); Ron Aginsky, Haifa (IL); Guy Medan, Haifa (IL)

(73) Assignee: Fus Mobile Inc.

( * ) Notice: Subject to any disclaimer, the term of this patent is extended or adjusted under 35 U.S.C. 154(b) by 896 days.

(21) Appl. No.: 17/442,183

(22) PCT Filed: Mar. 25, 2020

(86) PCT No.: PCT/IL2020/050355
§ 371 (c)(1),
(2) Date: Sep. 23, 2021

(87) PCT Pub. No.: WO2020/194302
PCT Pub. Date: Oct. 1, 2020

(65) Prior Publication Data
US 2022/0175461 A1    Jun. 9, 2022

Related U.S. Application Data

(60) Provisional application No. 62/823,020, filed on Mar. 25, 2019, provisional application No. 62/934,002, filed on Nov. 12, 2019.

(51) Int. Cl.
*A61B 34/20* (2016.01)
*A61B 90/00* (2016.01)
*G06T 7/73* (2017.01)
(52) U.S. Cl.
CPC .............. *A61B 34/20* (2016.02); *A61B 90/37* (2016.02); *A61B 90/39* (2016.02); *G06T 7/73* (2017.01);
(Continued)

(58) Field of Classification Search
None
See application file for complete search history.

(56) References Cited

U.S. PATENT DOCUMENTS

2003/0130576 A1   7/2003   Seeley et al.
2004/0087852 A1   5/2004   Chen et al.
(Continued)

FOREIGN PATENT DOCUMENTS

CA    2320230      6/1999
CN    103445866    12/2013
(Continued)

OTHER PUBLICATIONS

Partial Search Report of Application No. EP 20 77 6477 mailed on Nov. 16, 2022.
(Continued)

*Primary Examiner* — Yi-Shan Yang
(74) *Attorney, Agent, or Firm* — PEARL COHEN ZEDEK LATZER BARATZ LLP

(57) ABSTRACT

In general, systems and methods for aiming of a treatment tool at a target area and/or aligning of the treatment tool with respect to an imaging device are disclosed. The system may determine a position and orientation of the treatment tool with respect to the imaging device and to display, on a display, a visual indicator that indicates the determined position and orientation of the treatment tool. A user may aim and/or align the treatment tool based on the visual indicator displayed on the display.

10 Claims, 31 Drawing Sheets

(52) U.S. Cl.
CPC .  *A61B 2034/2055* (2016.02); *A61B 2090/376* (2016.02); *A61B 2090/3937* (2016.02); *A61B 2090/3966* (2016.02); *G06T 2207/10116* (2013.01); *G06T 2207/30204* (2013.01)

(56) References Cited

U.S. PATENT DOCUMENTS

| | | |
|---|---|---|
| 2004/0122311 A1 | 6/2004 | Cosman |
| 2005/0273004 A1 | 12/2005 | Simon et al. |
| 2009/0285366 A1 | 11/2009 | Essenreiter et al. |
| 2010/0298704 A1 | 11/2010 | Pelissier et al. |
| 2014/0243658 A1 | 8/2014 | Breisacher et al. |
| 2015/0148664 A1 | 5/2015 | Stolka et al. |
| 2016/0296292 A1 | 10/2016 | Ekin |
| 2017/0116729 A1 | 4/2017 | Stolka et al. |
| 2017/0319156 A1 | 11/2017 | Hong et al. |
| 2017/0332986 A1 | 11/2017 | Grondin et al. |
| 2018/0132927 A1 | 5/2018 | Chen et al. |
| 2018/0147727 A1 | 5/2018 | Mewes et al. |
| 2018/0185113 A1 | 7/2018 | Gregerson et al. |
| 2018/0280092 A1* | 10/2018 | Van Beek .............. A61B 90/39 |
| 2018/0368922 A1 | 12/2018 | Roth et al. |
| 2019/0021877 A1* | 1/2019 | Federspiel ............ A61F 2/4601 |
| 2020/0060658 A1 | 2/2020 | Gafner et al. |
| 2021/0192759 A1* | 6/2021 | Lang ....................... A61B 90/98 |
| 2022/0117676 A1* | 4/2022 | Besser .............. A61M 25/0127 |

FOREIGN PATENT DOCUMENTS

| | | |
|---|---|---|
| CN | 107997821 A | 5/2018 |
| CN | 108601629 A | 9/2018 |
| CN | 212281375 U | 1/2021 |
| CN | 111655160 | 7/2024 |
| DE | 10206193 | 7/2003 |
| JP | 2006-509554 | 3/2006 |
| JP | 2006-181252 | 7/2006 |
| JP | 2009-207677 | 9/2009 |
| JP | 2011-502686 | 1/2011 |
| JP | 2012-196327 | 10/2012 |
| JP | 2015-198888 | 11/2015 |
| JP | 2017-131433 | 8/2017 |
| JP | 2020-44045 | 3/2020 |
| KR | 10-2018-0038538 | 4/2018 |
| WO | WO 2018/114041 | 6/2018 |
| WO | WO 2019/012520 | 1/2019 |
| WO | WO 2019/217405 | 11/2019 |

OTHER PUBLICATIONS

Search Report of International Application No. PCT/IL2020/050355 mailed on Jul. 27, 2020.

* cited by examiner

Bottom view:

Bottom view:

300

Side view:

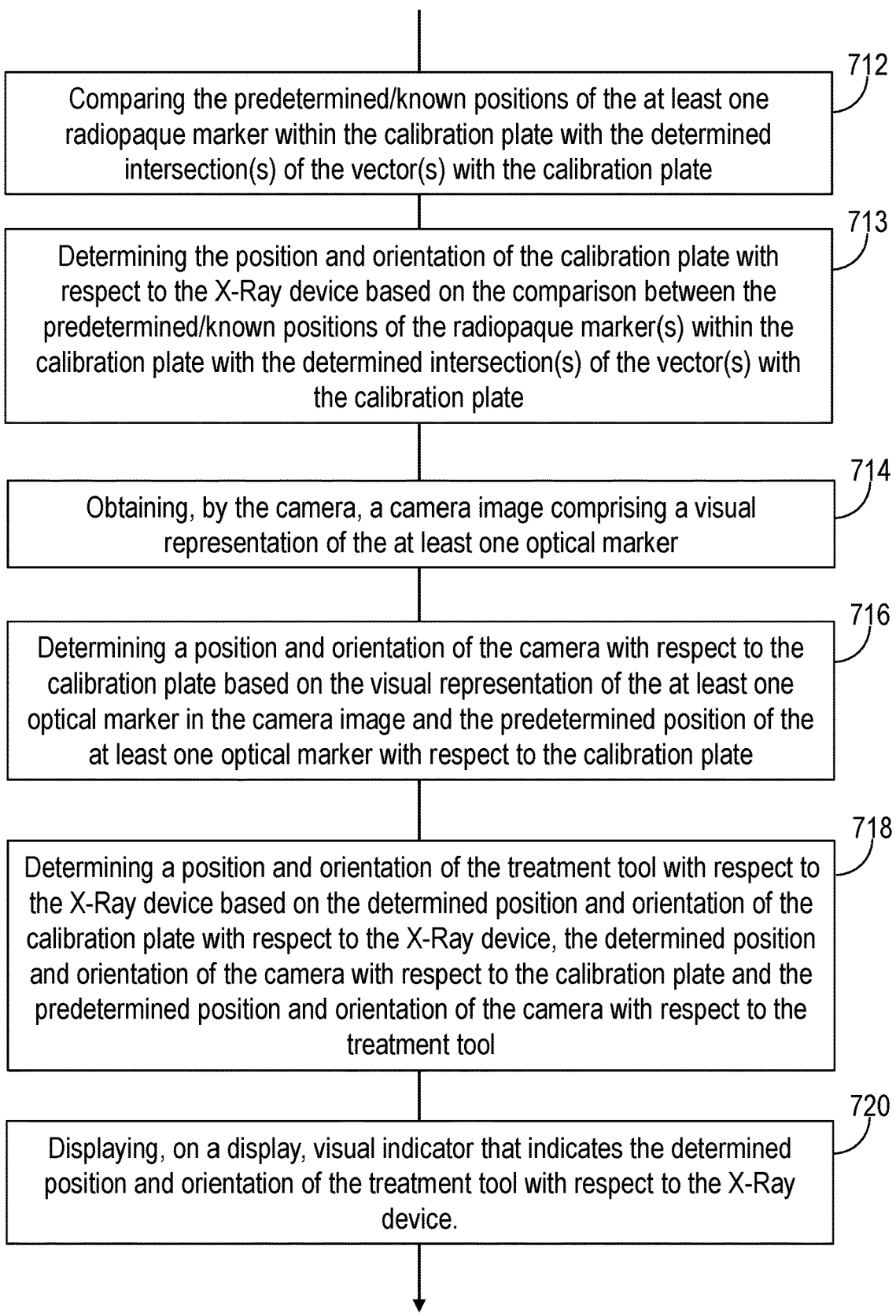
Fig. 7 (cont. 1)

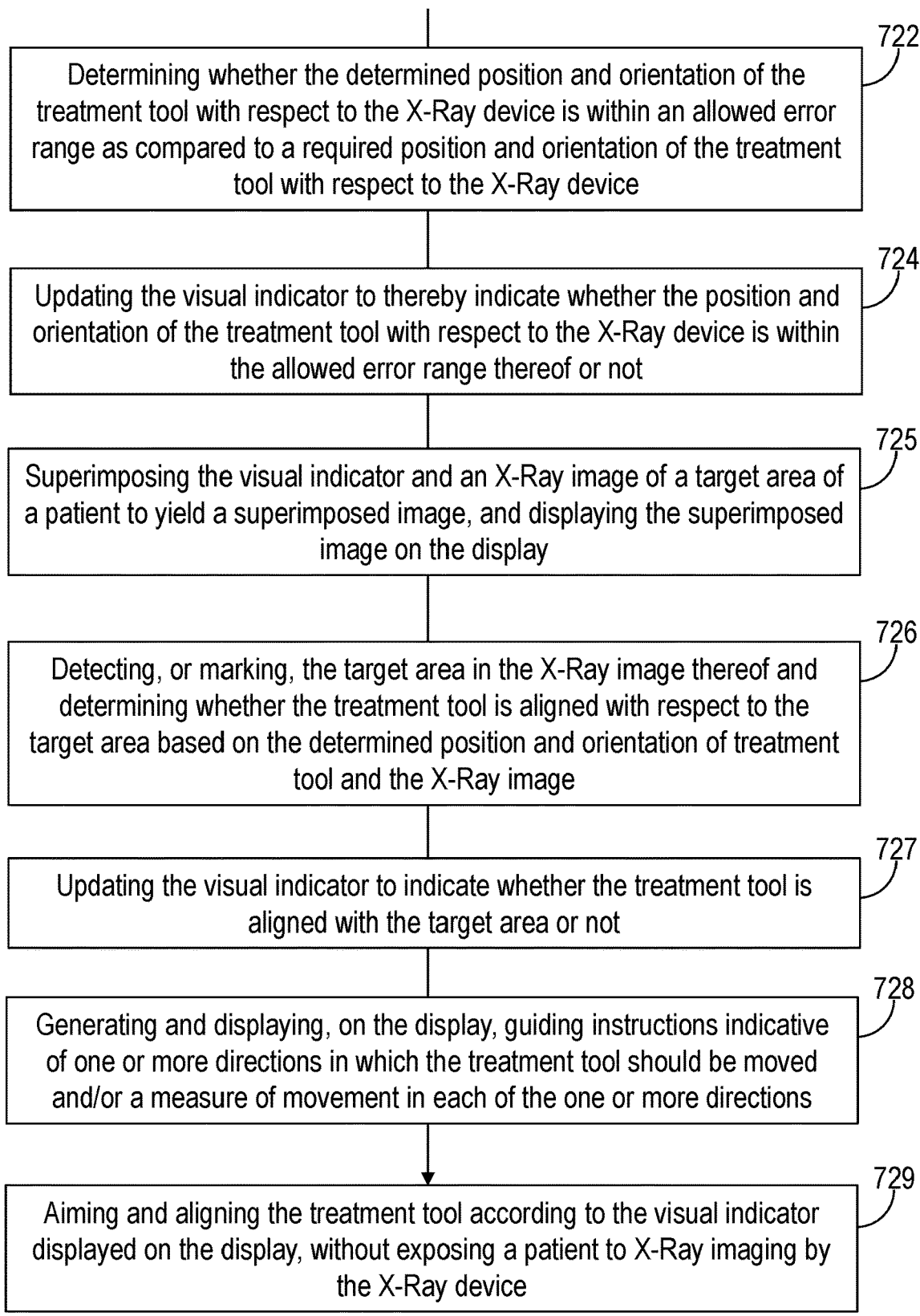
Fig. 7 (cont. 2)

Side view:

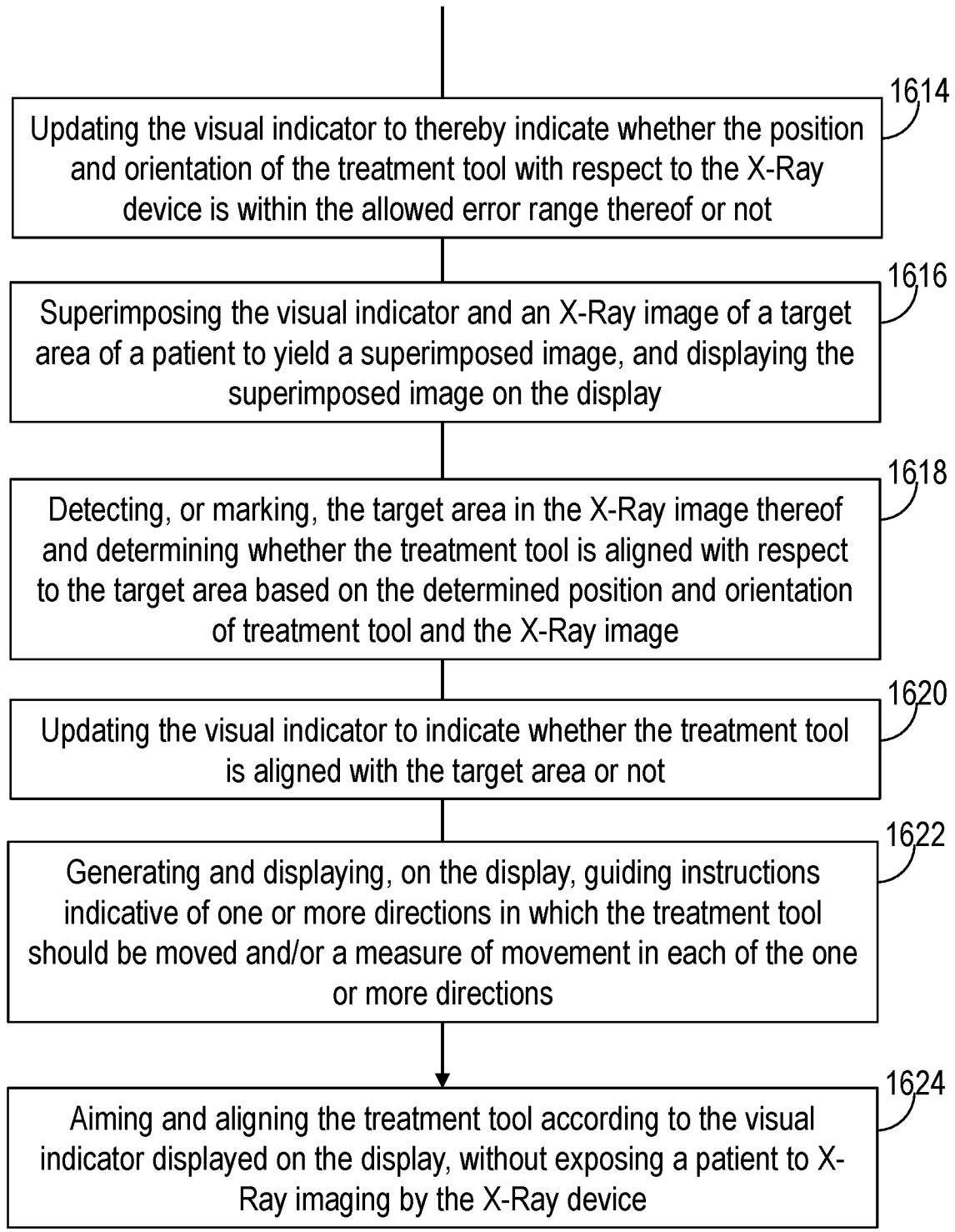
Fig. 16 (cont. 2)

SYSTEMS AND METHODS FOR AIMING AND ALIGNING OF A TREATMENT TOOL WITHIN AN X-RAY DEVICE OR AN ULTRASOUND DEVICE ENVIRONMENT

CROSS-REFERENCE TO RELATED APPLICATIONS

This application is a National Phase Application of PCT International Application No. PCT/IL2020/050355, International Filing Date Mar. 25, 2020, published as WO 2020/194302 on Feb. 28, 2019 and entitled Systems and Methods for Aiming and Aligning of a Treatment Tool within an X-Ray Device or an Ultrasound Device Environment, claiming the benefit of U.S. Provisional Patent Application Nos. 62/823,020, filed Mar. 25, 2020 and 62/934,002, filed Nov. 12, 2019 both of which are hereby incorporated by reference.

FIELD OF THE INVENTION

The present invention relates to the field of systems and methods for aiming a treatment tool, and more particularly, to systems and methods for aiming a treatment tool using an X-Ray device or an ultrasound device.

BACKGROUND OF THE INVENTION

Aiming of a treatment tool at a target area and/or aligning of the treatment tool with respect to a imaging device (e.g., such as X-Ray device, ultrasound device, etc.) typically requires at least one of a rigid mechanical connection between the treatment tool and the guiding imaging device, and an expensive and/or complex tracking unit capable of monitoring relative position and/or orientation between the treatment tool and the imaging device at relatively high update frequency (e.g., multiple times per second). Aiming and/or aligning of the treatment tool with respect to, for example, X-ray device using X-ray imaging for tracking the treatment tool may also require multiple exposures of a patient to X-Ray radiation.

There is an unmet need for a system and method for aiming and/or aligning of the treatment tool within an environment of the imaging device that may reduce the cost and complexity of the aiming and/or aligning as compared to current procedures while eliminating a need in rigid mechanical connection between the treatment tool and the imaging device. With respect to X-Ray device, there is an unmet need for a system and method for aiming and/or aligning of the treatment tool within an environment of the X-Ray device that may reduce the exposure of the patient to the X-Ray radiation as compared to current procedures.

SUMMARY OF THE INVENTION

Some embodiments may provide a system for aiming and aligning of a treatment tool in an X-Ray device environment, the system may include: a calibration plate attachable to an X-Ray device and including at least one radiopaque marker and at least one optical marker at predetermined positions within the calibration plate; a camera attachable to the treatment tool at a predetermined position and orientation with respect to the treatment tool; and a processing unit in communication with the camera and an X-Ray imaging unit of the X-Ray device, the processing unit is configured to: receive, from the X-Ray imaging unit, an X-Ray image including a visual representation of the at least one radiopaque marker; determine a position and orientation of the calibration plate with respect to the X-Ray device based on the visual representation of the at least one radiopaque marker in the X-Ray image, the predetermined position of the at least one radiopaque marker within the calibration plate and specified parameters of the X-Ray device; receive, from the camera, a camera image including a visual representation of the at least one optical marker; determine a position and orientation of the camera with respect to the calibration plate based on the visual representation of the at least one optical marker in the camera image and the predetermined position of the at least one optical marker within the calibration plate; and determine a position and orientation of the treatment tool with respect to the X-Ray device based on the determined position and orientation of the calibration plate with respect to the X-Ray device, the determined position and orientation of the camera within the calibration plate and the predetermined position and orientation of the camera with respect to the treatment tool.

In some embodiments, the calibration plate may include at least one of: at least one non-symmetric radiopaque marker; and multiple symmetric radiopaque markers that are asymmetrically positioned within the calibration plate.

In some embodiments, the system may include a display and wherein the processing unit is configured to present, on the display, a visual indicator that indicates the determined position and orientation of the treatment tool.

In some embodiments, the processing unit is configured to: determine whether the determined position and orientation of the treatment tool with respect to the X-Ray device is within an allowed error range as compared to a required position and orientation of the treatment tool with respect to the X-Ray device; and modify the visual indicator to thereby indicate whether the position and orientation of the treatment tool is within the allowed error range thereof or not.

In some embodiments, the processing unit is configured to superimpose the visual indicator on an X-Ray image of a target area within a patient.

In some embodiments, the processing unit is configured to: detect, or mark, the target area in the X-Ray image; determine whether the treatment tool is aligned with respect to the target area based on the determined position and orientation of the treatment tool and the X-Ray image; and modify the visual indicator to indicate whether the treatment tool is aligned with respect to the target area.

In some embodiments, the processing unit is configured to: generate treatment tool guiding instructions based on the determined position and orientation of the treatment tool with respect to the X-Ray device; and display the treatment tool guiding instructions on the display.

In some embodiments, the treatment tool guiding instructions are indicative of one or more directions in which the treatment tool should be moved and a measure of movement in each of the one or more directions in order to bring the treatment tool into a position and orientation that is within and allowed error range thereof.

In some embodiments, the processing unit is configured to display at least one of: treatment tool visual data including a visual representation of at least a portion of the treatment tool; and system components visual data including a visual representation of at least one component of the system and indicative of an actual position and orientation of the respective at least one component with respect to the treatment tool.

In some embodiments, the treatment tool is one of: a focused ultrasound transducer, and an interventional treatment tool.

Some embodiments may provide a method of aiming and aligning of a treatment tool in an X-Ray device environment, the method may include: attaching a calibration plate to an X-Ray device, wherein the calibration plate may include at least one radiopaque marker and at least one optical marker positioned at predetermined positions within the calibration plate; attaching a camera to the treatment tool at a predetermined position and orientation with respect to the treatment tool; obtaining, by the X-Ray device, an X-Ray image of the calibration plate, wherein the X-Ray image may include a visual representation of the at least one radiopaque marker; determining, by a processing unit, a position and orientation of the calibration plate with respect to the X-Ray device based on the visual representation of the at least one radiopaque marker in the X-Ray image, the predetermined position of the at least one radiopaque marker within the calibration plate and specified parameters of the X-Ray device; obtaining, by the camera, a camera image including a visual representation of the at least one optical marker; determining a position and orientation of the camera with respect to the calibration plate based on the visual representation of the at least one optical marker in the camera image and the predetermined position of the at least one optical marker within the calibration plate; and determining a position and orientation of the treatment tool with respect to the X-Ray device based on the determined position and orientation of the calibration plate with respect to the X-Ray device, the determined position and orientation of the camera within the calibration plate and the predetermined position and orientation of the camera with respect to the treatment tool.

In some embodiments, the method may include displaying, on a display, visual indicator that indicates the determined position and orientation of the treatment tool.

In some embodiments, the method may include determining whether the determined position and orientation of the treatment tool with respect to the X-Ray device is within an allowed error range as compared to a required position and orientation of the treatment tool with respect to the X-Ray device.

In some embodiments, the method may include modifying the visual indicator to thereby indicate whether the position and orientation of the treatment tool is within the allowed error range thereof or not.

In some embodiments, the method may include superimposing the visual indicator on an X-Ray image of a target area within a patient.

In some embodiments, the method may include: detecting, or marking, the target area in the X-Ray image; determining whether the treatment tool is aligned with respect to the target area based on the determined position and orientation of the treatment tool and the X-Ray image; and modifying the visual indicator to indicate whether the treatment tool is aligned with respect to the target area.

In some embodiments, the method may include: generating treatment tool guiding instructions based on the determined position and orientation of the treatment tool with respect to the X-Ray device; and displaying the treatment tool guiding instructions on the display.

In some embodiments, the treatment tool guiding instructions are indicative of one or more directions in which the treatment tool should be moved and a measure of movement in each of the one or more directions in order to bring the treatment tool into a position and orientation that is within and allowed error range thereof.

In some embodiments, the method may include displaying at least one of: treatment tool visual data including a visual representation of at least a portion of the treatment tool; and system components visual data including a visual representation of at least one component of the system and indicative of an actual position and orientation of the respective at least one component with respect to the treatment tool.

In some embodiments, the method may include aiming and aligning the treatment tool according to the visual indicator displayed on the display, without exposing a patient to X-Ray imaging by the X-Ray device.

Some embodiments may provide a system for aiming and aligning of a treatment tool in an ultrasound imaging device environment, the system may include: a calibration plate attachable to an ultrasound imaging probe of the ultrasound imaging device and including at least one optical marker at predetermined positions within the calibration plate; a camera attachable to the treatment tool at a predetermined position and orientation with respect to the treatment tool; and a processing unit in communication with the camera and an ultrasound imaging unit of the ultrasound imaging device, the processing unit is configured to: receive, from the camera, a camera image including a visual representation of the at least one optical marker; determine a position and orientation of the camera with respect to the calibration plate based on the visual representation of the at least one optical marker in the camera image and the predetermined position of the at least one optical marker within the calibration plate; and determine a position and orientation of the treatment tool with respect to the ultrasound imaging probe based on a predetermined position and orientation of the calibration plate with respect to the ultrasound imaging probe, the determined position and orientation of the camera with respect to the calibration plate and the known position and orientation of the camera with respect to the treatment tool.

In some embodiments, the system may include a display and wherein the processing unit is configured to present, on the display, a visual indicator that indicates the determined position and orientation of the treatment tool.

In some embodiments, the processing unit is configured to: determine whether the determined position and orientation of the treatment tool with respect to the ultrasound imaging probe is within an allowed error range as compared to a required position and orientation of the treatment tool with respect to the ultrasound imaging probe; and modify the visual indicator to thereby indicate whether the position and orientation of the treatment tool with respect to the ultrasound imaging probe is within the allowed error range thereof or not.

In some embodiments, the processing unit is configured to superimpose the visual indicator on an ultrasound image of a target area within a patient.

In some embodiments, the processing unit is configured to: detect, or mark, the target area in the ultrasound image; determine whether the treatment tool is aligned with respect to the target area based on the determined position and orientation of the treatment tool and the ultrasound image; and modify the visual indicator to indicate whether the treatment tool is aligned with respect to the target area.

In some embodiments, the processing unit is configured to: generate treatment tool guiding instructions based on the determined position and orientation of the treatment tool with respect to the ultrasound imaging probe; and display the treatment tool guiding instructions on the display.

In some embodiments, the treatment tool guiding instructions are indicative of one or more directions in which the treatment tool should be moved and a measure of movement in each of the one or more directions in order to bring the treatment tool into a position and orientation that is within and allowed error range thereof.

In some embodiments, the processing unit is configured to display at least one of: treatment tool visual data including a visual representation of at least a portion of the treatment tool; and system components visual data including a visual representation of at least one component of the system and indicative of an actual position and orientation of the respective at least one component with respect to the treatment tool.

In some embodiments, the treatment tool is one of: a focused ultrasound transducer, and an interventional treatment tool.

Some embodiments may provide a method of aiming and aligning of a treatment tool in an ultrasound imaging device environment, the method may include: attaching a calibration plate to an ultrasound imaging probe of the ultrasound imaging device, wherein the calibration plate may include at least one optical marker positioned at predetermined positions within the calibration plate; attaching a camera to the treatment tool at a predetermined position and orientation with respect to the treatment tool; obtaining, by the camera, a camera image including a visual representation of the at least one optical marker; determining a position and orientation of the camera with respect to the calibration plate based on the visual representation of the at least one optical marker in the camera image and the predetermined position of the at least one optical marker within the calibration plate; and determining a position and orientation of the treatment tool with respect to the ultrasound imaging probe based on the determined position and orientation of the calibration plate with respect to the ultrasound imaging probe, the determined position and orientation of the camera within the calibration plate and a predetermined position and orientation of the camera with respect to the treatment tool.

In some embodiments, the method may include displaying, on a display, visual indicator that indicates the determined position and orientation of the treatment tool.

In some embodiments, the method may include determining whether the determined position and orientation of the treatment tool with respect to the ultrasound imaging probe is within an allowed error range as compared to a required position and orientation of the treatment tool with respect to the ultrasound imaging probe.

In some embodiments, the method may include modifying the visual indicator to indicate whether the position and orientation of the treatment tool with respect to the ultrasound imaging probe is within the allowed error range thereof or not.

In some embodiments, the method may include superimposing the visual indicator on an ultrasound image of a target area within a patient.

In some embodiments, the method may include: detecting, or marking, the target area in the ultrasound image; determining whether the treatment tool is aligned with respect to the target area based on the determined position and orientation of the treatment tool and the ultrasound image; and modifying the visual indicator to indicate whether the treatment tool is aligned with respect to the target area.

In some embodiments, the method may include: generating treatment tool guiding instructions based on the determined position and orientation of the treatment tool with respect to the ultrasound imaging probe; and displaying the treatment tool guiding instructions on the display.

In some embodiments, the treatment tool guiding instructions are indicative of one or more directions in which the treatment tool should be moved and a measure of movement in each of the one or more directions in order to bring the treatment tool into a position and orientation that is within and allowed error range thereof.

In some embodiments, the method may include displaying at least one of: treatment tool visual data including a visual representation of at least a portion of the treatment tool; and system components visual data including a visual representation of at least one component of the system and indicative of an actual position and orientation of the respective at least one component with respect to the treatment tool.

In some embodiments, the method may include aiming and aligning the treatment tool according to the visual indicator displayed on the display.

Some embodiments may provide a system for aiming and aligning of a treatment tool in an X-Ray device environment, the system may include: a calibration plate attachable to a treatment tool and including at least one optical marker at predetermined positions within the calibration plate; a camera attachable to the X-Ray device; and a processing unit in communication with the camera and an X-Ray imaging unit of the X-Ray device, the processing unit is configured to: receive, from the camera, a camera image including a visual representation of the at least one optical marker; determine a position and orientation of the calibration plate with respect to the camera based on the visual representation of the at least one optical marker in the camera image and the predetermined position of the at least one optical marker within the calibration plate; and determine a position and orientation of the treatment tool with respect to the X-Ray device based on the determined position and orientation of the calibration plate with respect to the camera and a position and orientation of the camera with respect to the X-Ray device.

In some embodiments, the position and orientation of the camera is known.

In some embodiments: the camera comprises at least one radiopaque marker at least partly disposed within a field-of-view of an X-Ray source of the X-Ray; and the processing unit is configured to: receive an X-Ray image including a visual representation of the at least one radiopaque marker; and determine the position and orientation of the camera with respect to the X-Ray device based on the visual representation of the at least one radiopaque marker.

In some embodiments, the system may include a display and wherein the processing unit is configured to present, on the display, a visual indicator that indicates the determined position and orientation of the treatment tool.

In some embodiments, the processing unit is configured to: determine whether the determined position and orientation of the treatment tool with respect to the X-Ray device is within an allowed error range as compared to a required position and orientation of the treatment tool with respect to the X-Ray device; and modify the visual indicator to thereby indicate whether the position and orientation of the treatment tool with respect to the X-Ray device is within the allowed error range thereof or not.

In some embodiments, the processing unit is configured to superimpose the visual indicator on an X-Ray image of a target area within a patient.

In some embodiments, the processing unit is configured to: detect, or mark, the target area in the X-Ray image; determine whether the treatment tool is aligned with respect to the target area based on the determined position and orientation of the treatment tool and the X-Ray image; and modify the visual indicator to indicate whether the treatment tool is aligned with respect to the target area.

In some embodiments, the processing unit is configured to: generate treatment tool guiding instructions based on the determined position and orientation of the treatment tool with respect to the X-Ray device; and display the treatment tool guiding instructions on the display.

In some embodiments, the treatment tool guiding instructions are indicative of one or more directions in which the treatment tool should be moved and a measure of movement in each of the one or more directions in order to bring the treatment tool into a position and orientation that is within and allowed error range thereof.

In some embodiments, the processing unit is configured to display at least one of: treatment tool visual data including a visual representation of at least a portion of the treatment tool; and system components visual data including a visual representation of at least one component of the system and indicative of an actual position and orientation of the respective at least one component with respect to the treatment tool.

In some embodiments, the treatment tool is one of: a focused ultrasound transducer, and an interventional treatment tool.

Some embodiments may provide a method of aiming and aligning of a treatment tool in an X-Ray device environment, the method may include: attaching a calibration plate to a treatment tool, wherein the calibration plate includes at least one optical marker positioned at predetermined positions within the calibration plate; attaching a camera to the X-Ray device; obtaining, by the camera, a camera image including a visual representation of the at least one optical marker; determining a position and orientation of the treatment tool with respect to the camera based on the visual representation of the at least one optical marker in the camera image and the predetermined position of the at least one optical marker within the calibration plate; and determining a position and orientation of the treatment tool with respect to the X-Ray device based on the determined position and orientation of the calibration plate with respect to the camera and a position and orientation of the camera with respect to the X-Ray device.

In some embodiments, the position and orientation of the camera is known.

In some embodiments, the method may include: attaching the camera to the X-Ray device such that at least one radiopaque marker thereof is at least partly disposed within a field-of-view of an X-Ray source of the X-Ray device; obtaining an X-Ray image including a visual representation of the at least one radiopaque marker; and determining the position and orientation of the camera with respect to the X-Ray device based on the visual representation of the at least one radiopaque marker.

In some embodiments, the method may include displaying, on a display, visual indicator that indicates the determined position and orientation of the treatment tool.

In some embodiments, the method may include determining whether the determined position and orientation of the treatment tool with respect to the X-Ray device is within an allowed error range as compared to a required position and orientation of the treatment tool with respect to the X-Ray device.

In some embodiments, the method may include modifying the visual indicator to thereby indicate whether the position and orientation of the treatment tool with respect to the X-Ray device is within the allowed error range thereof or not.

In some embodiments, the method may include superimposing the visual indicator on an X-Ray image of a target area within a patient.

In some embodiments, the method may include: detecting, or marking, the target area in the X-Ray image; determining whether the treatment tool is aligned with respect to the target area based on the determined position and orientation of the treatment tool and the X-Ray image; and modifying the visual indicator to indicate whether the treatment tool is aligned with respect to the target area.

In some embodiments, the method may include: generating treatment tool guiding instructions based on the determined position and orientation of the treatment tool with respect to the X-Ray device; and displaying the treatment tool guiding instructions on the display.

In some embodiments, the treatment tool guiding instructions are indicative of one or more directions in which the treatment tool should be moved and a measure of movement in each of the one or more directions in order to bring the treatment tool into a position and orientation that is within and allowed error range thereof.

In some embodiments, the method may include displaying at least one of: treatment tool visual data including a visual representation of at least a portion of the treatment tool; and system components visual data including a visual representation of at least one component of the system and indicative of an actual position and orientation of the respective at least one component with respect to the treatment tool.

In some embodiments, the method may include aiming and aligning the treatment tool according to the visual indicator displayed on the display, without exposing a patient to X-Ray imaging by the X-Ray device.

Some embodiments may provide a system for aiming and aligning of a treatment tool in an ultrasound imaging device environment, the system may include: a calibration plate attachable to a treatment tool and including at least one optical marker at predetermined positions within the calibration plate; a camera attachable to an ultrasound imaging probe at a predetermined position and orientation with respect to the ultrasound imaging probe; and a processing unit in communication with the camera and an ultrasound imaging unit of the ultrasound imaging device, the processing unit is configured to: receive, from the camera, a camera image including a visual representation of the at least one optical marker; determine a position and orientation of the calibration plate with respect to the camera based on the visual representation of the at least one optical marker in the camera image and the predetermined position of the at least one optical marker within the calibration plate; and determine a position and orientation of the treatment tool with respect to the ultrasound imaging probe based on a predetermined position and orientation of the calibration plate with respect to the treatment tool, the determined position and orientation of the calibration plate with respect to the camera and the known position and orientation of the camera with respect to the ultrasound imaging probe.

In some embodiments, the system may include a display and wherein the processing unit is configured to present, on the display, a visual indicator that indicates the determined position and orientation of the treatment tool.

In some embodiments, the processing unit is configured to: determine whether the determined position and orientation of the treatment tool with respect to the ultrasound imaging probe is within an allowed error range as compared to a required position and orientation of the treatment tool with respect to the ultrasound imaging probe; and modify the visual indicator to thereby indicate whether the position and orientation of the treatment tool with respect to the ultrasound imaging probe is within the allowed error range thereof or not.

In some embodiments, the processing unit is configured to superimpose the visual indicator on an ultrasound image of a target area within a patient.

In some embodiments, the processing unit is configured to: detect, or mark, the target area in the ultrasound image; determine whether the treatment tool is aligned with respect to the target area based on the determined position and orientation of the treatment tool and the ultrasound image; and modify the visual indicator to indicate whether the treatment tool is aligned with respect to the target area.

In some embodiments, the processing unit is configured to: generate treatment tool guiding instructions based on the determined position and orientation of the treatment tool with respect to the ultrasound imaging probe; and display the treatment tool guiding instructions on the display.

In some embodiments, the treatment tool guiding instructions are indicative of one or more directions in which the treatment tool should be moved and a measure of movement in each of the one or more directions in order to bring the treatment tool into a position and orientation that is within and allowed error range thereof.

In some embodiments, the processing unit is configured to display at least one of: treatment tool visual data including a visual representation of at least a portion of the treatment tool; and system components visual data including a visual representation of at least one component of the system and indicative of an actual position and orientation of the respective at least one component with respect to the treatment tool.

In some embodiments, the treatment tool is one of: a focused ultrasound transducer, and an interventional tool.

Some embodiments may provide a method of aiming and aligning of a treatment tool in an ultrasound imaging device environment, the method may include: attaching a calibration plate to a treatment tool, wherein the calibration plate includes at least one optical marker positioned at predetermined positions within the calibration plate; attaching a camera to an ultrasound imaging probe of an ultrasound imaging device at a predetermined position and orientation with respect to the treatment tool; obtaining, by the camera, a camera image including a visual representation of the at least one optical marker; determining a position and orientation of the calibration plate with respect to the camera based on the visual representation of the at least one optical marker in the camera image and the predetermined position of the at least one optical marker within the calibration plate; and determining a position and orientation of the treatment tool with respect to the ultrasound imaging probe based on a predetermined position and orientation of the calibration plate with respect to the treatment tool, the determined position and orientation of the calibration plate with respect to the camera and the known position and orientation of the camera with respect to the ultrasound imaging probe.

In some embodiments, the method may include displaying, on a display, visual indicator that indicates the determined position and orientation of the treatment tool.

In some embodiments, the method may include determining whether the determined position and orientation of the treatment tool with respect to the ultrasound imaging probe is within an allowed error range as compared to a required position and orientation of the treatment tool with respect to the ultrasound imaging probe.

In some embodiments, the method may include modifying the visual indicator to indicate whether the position and orientation of the treatment tool with respect to the ultrasound imaging probe is within the allowed error range thereof or not.

In some embodiments, the method may include superimposing the visual indicator on an ultrasound image of a target area within a patient.

In some embodiments, the method may include: detecting, or marking, the target area in the ultrasound image; determining whether the treatment tool is aligned with respect to the target area based on the determined position and orientation of the treatment tool and the ultrasound image; and modifying the visual indicator to indicate whether the treatment tool is aligned with respect to the target area.

In some embodiments, the method may include: generating treatment tool guiding instructions based on the determined position and orientation of the treatment tool with respect to the ultrasound imaging probe; and displaying the treatment tool guiding instructions on the display.

In some embodiments, the treatment tool guiding instructions are indicative of one or more directions in which the treatment tool should be moved and a measure of movement in each of the one or more directions in order to bring the treatment tool into a position and orientation that is within and allowed error range thereof.

In some embodiments, the method may include displaying at least one of: treatment tool visual data including a visual representation of at least a portion of the treatment tool; and system components visual data including a visual representation of at least one component of the system and indicative of an actual position and orientation of the respective at least one component with respect to the treatment tool.

In some embodiments, the method may include aiming and aligning the treatment tool according to the visual indicator displayed on the display.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings.

Figure 1:
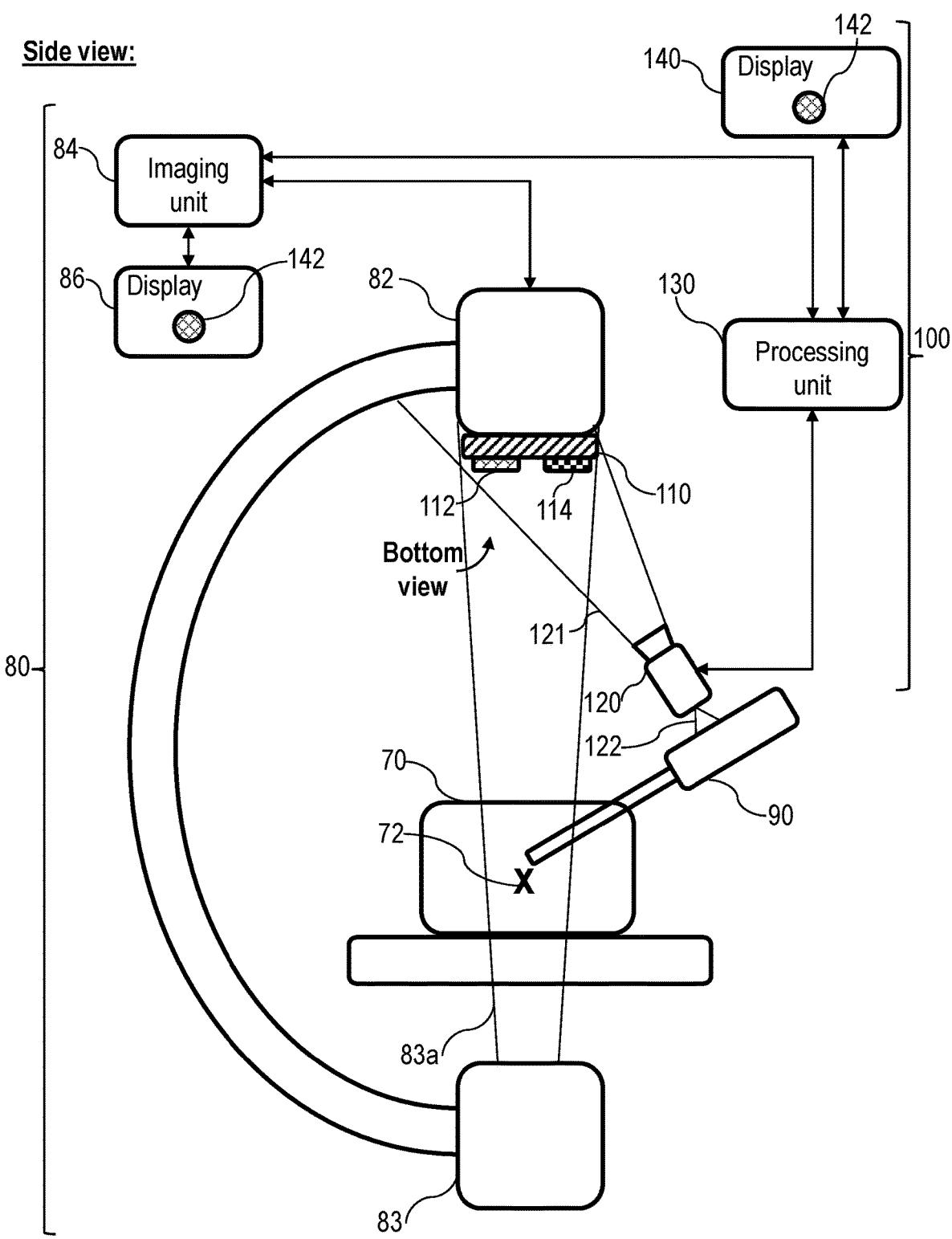
FIG. 1 is a schematic illustration of a first embodiment of a system for aiming and/or aligning of a treatment tool in an X-Ray device environment, according to some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units can be at least partially implemented by a computer processor.

Reference is now made to FIG. 1, which is a schematic illustration of a first embodiment of a system 100 for aiming and/or aligning of a treatment tool 90 in an X-Ray device 80 environment, according to some embodiments of the invention.

According to some embodiments, system 100 may include a calibration plate 110, a camera 120 and a processing unit 130 (e.g., as shown in FIG. 1). FIG. 1 shows a side view of system 100. System 100 may enable aiming of a treatment tool 90 at a target area 72 within a patient 70 and/or aligning of treatment tool 90 with respect to an X-Ray device 80, while significantly reducing the exposure of patient 70 to X-Ray radiation as compared to treatment procedures that are performed without system 100.

X-Ray device 80 may be any type of fluoroscopy device, for example, a C-arm type, G-arm type or O-arm type (e.g., 9-inch, 12-inch or flat screen device) and may include an X-Ray intensifier 82, an X-Ray source 83, an X-Ray imaging unit 84 and an X-Ray display 86 (e.g., as show in FIG. 1).

Treatment tool 90 may be, for example, an invasive treatment tool (such as a needle (e.g., biopsy needle, radiofrequency needle) and/or a probe) or a non-invasive treatment tool (such as an ultrasound transducer or a focused ultrasound transducer) that needs to be aimed with respect to target area 72 and/or aligned with respect to X-Ray device 80. For example, FIG. 1 shows a needle as an example for treatment tool 90. In another example, FIGS. 5A-5G and FIG. 6 show a focused ultrasound transducer as an example for treatment tool 90.

According to some embodiments, calibration plate 110 may include at least one radiopaque marker 112 and at least one optical marker 114. Radiopaque marker(s) 112 and optical marker(s) 114 may be positioned within calibration plate 110 (e.g., within the perimeter of the calibration plate, optionally on the surface thereof) at predetermined and/or known positions. Calibration plate 110 may be attachable, or removably attachable, to X-Ray device 80 such that calibration plate 110 will be in a field-of-view 83a of X-Ray source 83. For example, calibration plate 110 may be attachable, or removably attachable, to X-Ray intensifier 82 of X-Ray device 80. Various embodiments of calibration plate 110 are described below with respect to FIGS. 2A, 2B and 2C.

According to some embodiments, camera 120 is attachable, or removably attachable, to treatment tool 90. Camera 120 may be attachable to treatment tool 90 at a predetermined and/or known position and orientation with respect to treatment tool 90.

Camera 120 may be attachable to treatment tool 90 such that at least a portion of calibration plate 110 will be within a field of view 121 of camera 120, for example during a treatment procedure, and/or such that camera 120 is out of a field of view 83a (or substantially out of the field of view) of X-Ray device 80 (e.g., as shown in FIG. 1).

In some embodiments, system 100 may include a camera connector 122. Camera connector 122 may be configured to tightly and stably attach camera 120 to treatment tool 90 and to prevent unintended relative movements of camera 120 with respect to treatment tool 90. In some embodiments, camera connector 122 may be made of a radiolucent material. In this manner, camera connector 122 does not interfere with X-Ray imaging performed by X-Ray device 80.

In some embodiments, camera connector 122 may enable a controlled rotation of camera 120. This may, for example, enable to follow calibration plate 110, for example when treatment tool 90 is moved or in the case of 90° degrees tilt of the C-arm of X-Ray device 80 for capturing a side view of the patient anatomy.

In some embodiments, system 100 may include a second camera. The second camera may be tightly and stably attachable (e.g., using a connector like connector 122) to treatment tool 90 at a predetermined angle with respect to camera 120. For example, the second camera may be attached to treatment tool 90 at an angle of 90° with respect to camera 120. This may, for example, enable to capture calibration plate 110 by the second camera if calibration plate 110 exits field-of-view 121 of camera 120, for example due to movement of treatment tool 90 or 90 degrees tilt of the C-arm for capturing a side view of the patient anatomy.

According to some embodiments, processing unit 130 may be in communication (e.g., wired or wireless) with camera 120 and with an X-Ray imaging unit 84 of X-Ray device 80.

According to some embodiments, processing unit 130 may be configured to receive, from X-Ray imaging unit 84, one or more X-Ray images of calibration plate 110. X-Ray image(s) of calibration plate 110 may include a visual representation of radiopaque marker(s) 112 (e.g., as shown in and described below with respect to FIG. 3).

According to some embodiments, processing unit 130 may be configured to determine a position and orientation of calibration plate 110 with respect to X-Ray device 80 based on the visual representation of radiopaque marker(s) 112, based on the known positions of radiopaque markers 112 within calibration plate 110 and based on specified parameters, or specified model, of X-Ray device 80. The specified parameters/model of X-Ray device 80 may, for example, include a distance value of X-Ray source 83 to X-Ray intensifier 82 and a size of a field of view of X-Ray intensifier 82 (e.g., the metric size of an image pixel on X-Ray intensifier 82).

In some embodiments, processing unit 130 may be configured to identify the visual representation of radiopaque marker(s) 112 in the X-Ray image(s) of calibration plate 110. The identification thereof may be utilized using, for example, pattern matching algorithms.

In some embodiments, processing unit 130 may be further configured to determine one or more vectors that extend from X-Ray source 83 towards X-Ray intensifier 82 and calibration plate 110 attached thereto and intersect with calibration plate 110. The vector(s) may, for example, represent X-Rays generated by X-Ray source 83. The determination of vector(s) may be based on, for example, the specified model of X-Ray device 80.

In some embodiments, processing unit 130 may be further configured to determine one or more intersections of the corresponding one or more vectors with calibration plate 110.

In some embodiments, processing unit 130 may be further configured to compare the predetermined/known positions of the radiopaque marker(s) 112 within calibration plate 110 with the determined intersection(s) of the vector(s) with calibration plate 110. The comparison thereof may be utilized using, for example, point-cloud matching algorithms (e.g., brute-force algorithm or iterative closest point algorithm).

In some embodiments, processing unit 130 may be further configured to determine the position and orientation of calibration plate 110 with respect to X-Ray device 80 based on the comparison between the predetermined/known positions of the radiopaque marker(s) 112 within calibration plate 110 with the determined intersection(s) of the vector(s) with calibration plate 110. The determination thereof may be utilized using, for example, aligning algorithms such as Singular Value Decomposition (SVD) algorithm.

According to some embodiments, processing unit 130 may be configured to receive, from camera 120, one or more camera images of calibration plate 110. Camera image(s) of calibration plate 110 may include a visual representation of optical marker(s) 114 (e.g., as shown in and described below with respect to FIG. 4).

According to some embodiments, processing unit 130 may be configured to determine a position and orientation of camera 120 with respect to calibration plate 110 (that may be attached to, for example, X-Ray intensifier 82) based on the visual representation of optical marker(s) 114 in the camera image(s), based on the known positions of optical marker(s) 114 within calibration plate 110 and based on parameters of camera 120 (e.g., such as distortion, field of view 121, etc.). The determination thereof may be utilized using, for example, bundle adjustment/PnP algorithms.

According to some embodiments, processing unit 130 may be configured to determine a position and orientation of treatment tool 90 with respect to X-Ray device 80 based on the determined position and orientation of calibration plate 110 with respect to X-Ray device 80, the determined position and orientation of camera 120 with respect to calibration plate 110 and the known position and orientation of camera 120 with respect to the treatment tool 90.

According to some embodiments, system 100 may include a display 140. Processing unit 130 may be configured to present, for example on display 140 and/or on X-ray display 86, at least one visual indicator 142 that indicates the determined position and orientation of treatment tool 90.

In some embodiments, processing unit 130 may be configured to determine whether the determined position and orientation of treatment tool 90 with respect to X-Ray device 80 is within an allowed error range as compared to a required position and orientation of treatment tool 90 with respect to X-Ray device 80. In some embodiments, processing unit 130 may be configured to update visual indicator(s) 142 to thereby indicate whether the position and orientation of treatment tool 90 is within the allowed error range thereof or not. The modification of visual indicator(s) 142 may, for example, include change of a color and/or a shape of visual indicator(s) 142 (e.g., according to predetermined rules).

In various embodiments, processing unit 130 may be configured to superimpose visual indicator 142 on, for example, an X-Ray image of target area 72 of patient 70 to yield a superimposed image, and to display the superimposed image on display 140 and/or on X-Ray display 86.

In some embodiments, processing unit 130 may be configured to detect, or mark, target area 72 in the X-Ray image thereof. In some embodiments, the marking may be made based on user's input. Processing unit 130 may be configured to determine whether treatment tool 90 is aligned with respect to target area 72 based on the determined position and orientation of treatment tool 90 and the X-Ray image. In some embodiments, processing unit 130 may be configured to update visual indicator 142 to thereby indicate whether treatment tool 90 is aligned with target area 72 or not.

In some embodiments, processing unit 130 may generate treatment tool guiding instructions based on the determined position and orientation of treatment tool 90 with respect to X-Ray device 80 and display the treatment tool guiding instructions on display 86/140 (e.g., as described below with respect to FIGS. 14A and 14B). The guiding instruction may be indicative of one or more directions in which treatment tool 90 should be moved (e.g., displaced and/or tilted) and/or a measure of movement in each of the direction(s) in order to bring treatment tool 90 into a position and orientation that is within the allowed error range thereof. The treatment tool guiding instructions may, for example, enable easy and intuitive aiming and/or aligning of treatment tool 90 with respect to target area 72 and/or X-Ray device 80.

System 100 may enable the user (e.g., treating physician) to aim treatment tool 90 at target area 72 and/or to align (e.g., translate, tilt, pitch, yaw, roll, etc.) treatment tool 90 with respect to X-Ray device 80 using visual indicator 142 displayed on display 140 and/or on X-Ray display 86. Visual indicator 142 may indicate the position and orientation of treatment tool 90 with respect to X-Ray device 80, which eliminates (or substantially eliminates) a need in X-Ray imaging of patent 70 during the aiming and/or aligning of treatment tool 90. When using system 100, X-Ray imaging may be required only at final stages of aiming and/or aligning of treatment tool 90 in order to verify, prior to application of the treatment, that the actual position and orientation of treatment tool 90 with respect to X-Ray device 80 corresponds to the required position and orientation thereof or within the allowed error range thereof. In this manner, system 100 may enable significantly reducing the exposure of the patient and/or the user to the X-Ray radiation during the treatment procedure as compared to current treatment procedures that require multiple exposures of patient 70 to X-Ray radiation during aiming and/or aligning of treatment tool 90.

Figure 2A:
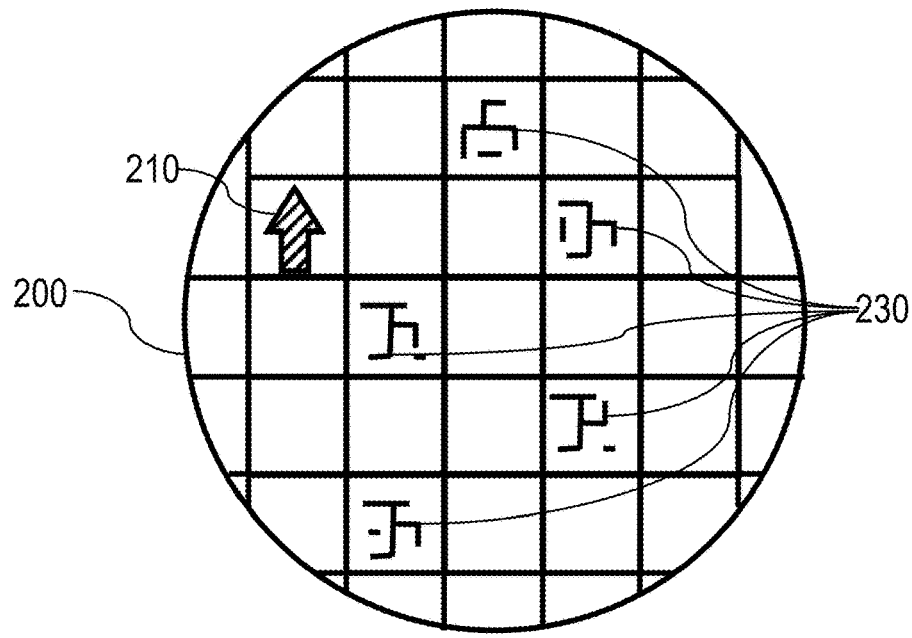
FIGS. 2A and 2B are schematic illustrations of a calibration plate for a system for aiming and/or aligning of a treatment tool within an X-Ray device environment, according to some embodiments of the invention.
Figure 2B:
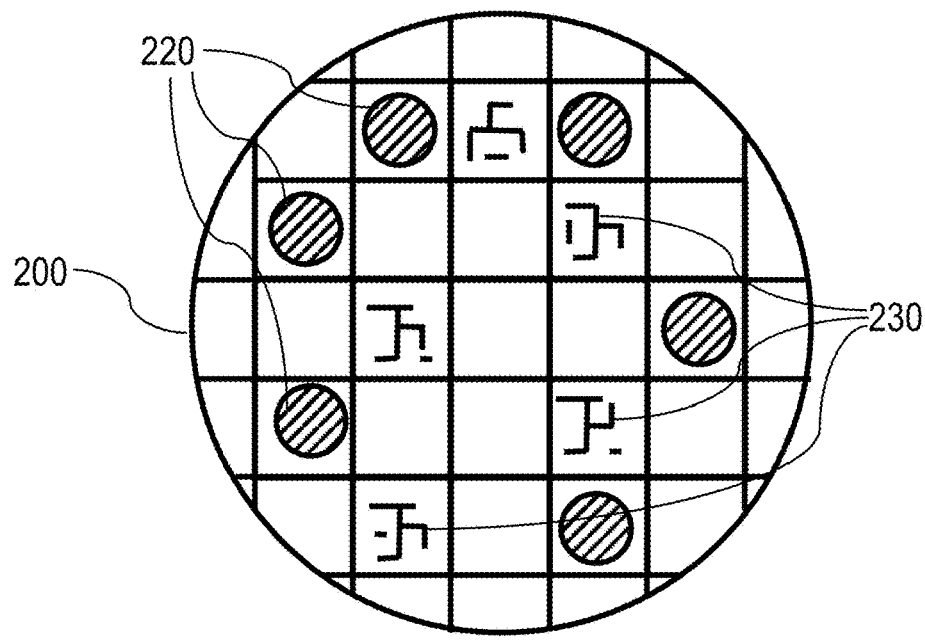

Reference is made to FIGS. 2A and 2B, which are schematic illustrations of a calibration plate 200 as may be used in a system for aiming and/or aligning of a treatment tool 90 within an X-Ray device 80 environment (such as system 100), according to some embodiments of the invention.

Figure 2C:
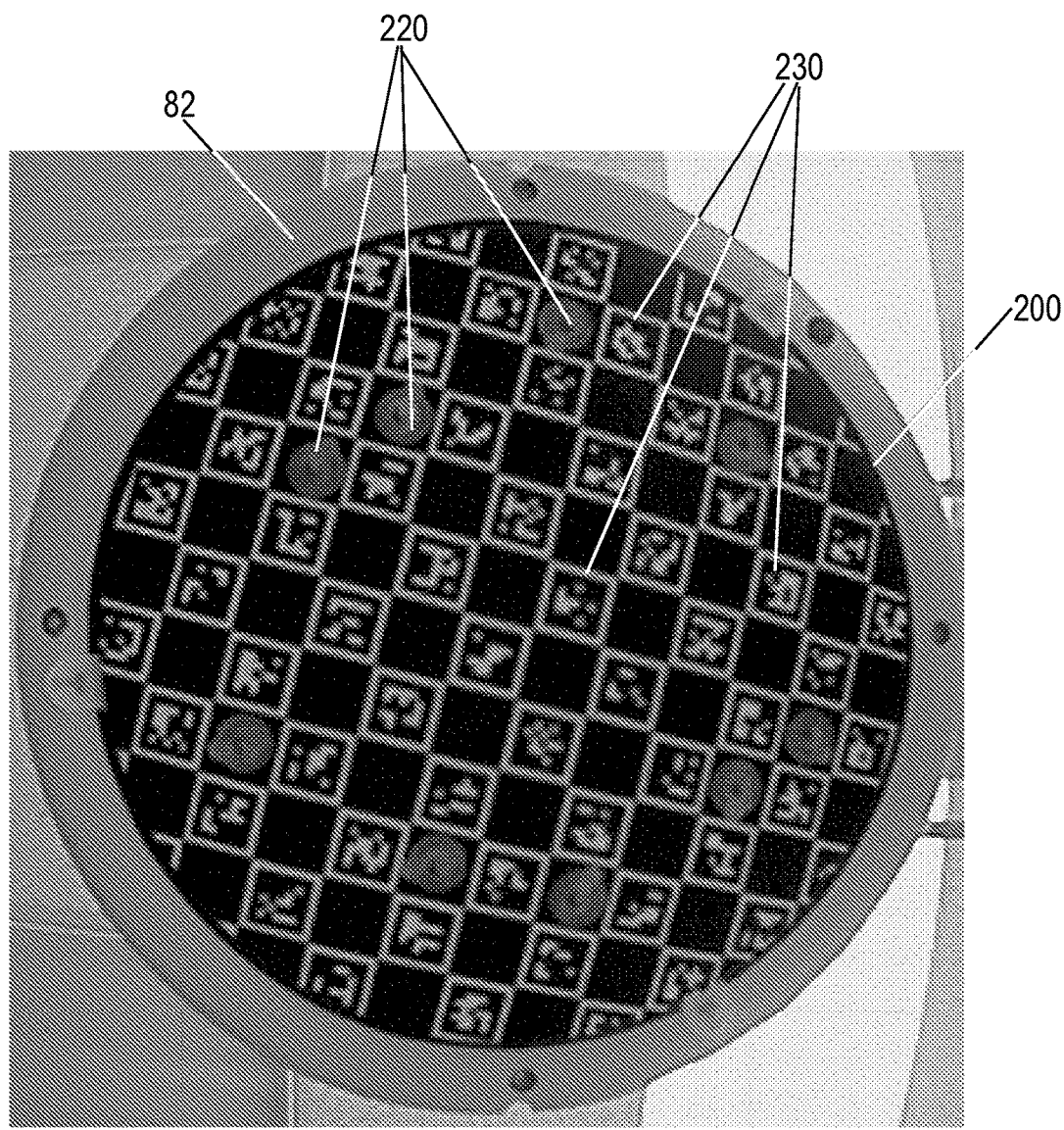
FIG. 2C is an image of a calibration plate for a system for aiming and/or aligning of a treatment tool within an X-Ray device environment, according to some embodiments of the invention.

Reference is also made to FIG. 2C, which is an image of a calibration plate 200 as may be used in a system for aiming and/or aligning of a treatment tool 90 within an X-Ray device 80 environment (such as system 100), according to some embodiments of the invention.

According to some embodiments, calibration plate 200 may be used in a system for aiming and/or aligning a treatment tool 90 within an X-Ray device 80 environment (e.g., such as system 100 described above with respect to FIG. 1). For example, calibration plate 200 may be calibration plate 110 described above with respect to FIG. 1.

FIGS. 2A, 2B and 2C show a face of calibration plate 200 that is marked with optical and/or radiopaque markers.

According to some embodiments, calibration plate 200 may include at least one radiopaque marker 210 at a known position within calibration plate 200 (e.g., as shown in FIG. 2A). Radiopaque marker(s) 210 may be asymmetric with respect to at least one of its axes. For example, FIG. 2A shows single radiopaque marker 210 that has a shape of an arrow (e.g., that is asymmetric with respect to its traverse axis). In some embodiments, radiopaque marker(s) 210 may be radiopaque marker(s) 112 described above with respect to FIG. 1.

In embodiments shown in FIG. 2A, radiopaque marker(s) 210 may have any non-symmetric shape that may enable determination/identification of the position and orientation of calibration plate 200 (e.g., with respect to X-Ray device 80) based on the visual representation of radiopaque marker(s) 210 in the X-Ray image of calibration plate 200 (e.g., as described above with respect to FIG. 1).

According to some embodiments, calibration plate 200 may include multiple radiopaque markers 220 (e.g., as shown in FIGS. 2B and 2C). Radiopaque markers 220 may be symmetric or asymmetric (e.g., with respect to at least one of their axes). For example, radiopaque markers 220 may be spheres (e.g., symmetric markers) or arced arrows (e.g., asymmetric markers). Radiopaque markers 220 may be asymmetrically distributed within calibration plate 220 (e.g., with respect to at least one of axes of calibration plate 220). In some embodiments, radiopaque marker(s) 220 may be radiopaque marker(s) 112 described above with respect to FIG. 1.

In embodiments shown in FIGS. 2B and 2C, the positions of radiopaque markers 220 within calibration plate 200 may be predetermined to enable determination/identification of the position and orientation of calibration plate 200 (e.g., with respect to X-Ray device 80) based on the visual representation of radiopaque markers 220 in the X-Ray image of calibration plate 200 (e.g., as described above with respect to FIG. 1).

In some embodiments, the processing unit (e.g., processing unit 130 described above with respect to FIG. 1) may be configured to detect and correct, based on the visual representation of radiopaque markers 220 in the X-Ray image of calibration plate 200, a rotation and/or a flip of the X-Ray image with respect the visual representation of radiopaque markers 220 in previous X-Ray image of calibration plate 200. The detection of the rotation and/or flip of the X-Ray image may be performed, in some embodiments, for each obtained X-Ray image as the detection is fast in means of computational time.

According to some embodiments, calibration plate 200 includes multiple optical markers 230 positioned at predetermined positions within calibration plate 200 (e.g., as shown in FIGS. 2A, 2B and 2C). In some embodiments, optical marker(s) 230 may be optical marker(s) 114 described above with respect to FIG. 1.

In some embodiments, each of optical marker(s) 230 may include its unique visual label. The visual labels of optical marker(s) 230 may, for example, include barcodes, QR codes, graphical patterns or shapes, Aruco, apriltag, ARtag and the like, that may bear additional data associated with the visual label. The visual labels may, for example, encode the position of optical marker(s) 230 within calibration plate 200.

Parameters of optical marker(s) 230, such as for example, the amount of optical marker(s) 230, the dimensions of optical marker(s) 230 and/or the visual labels of optical marker(s) 230 may be determined based on, for example, a resolution of camera 120. The parameters of optical marker(s) 230 may be further determined to enable determination/identification of the position and orientation of the camera (e.g., camera 120 as described above with respect to FIG. 1) with respect to calibration plate 200 based on the visual representation of optical marker(s) 230 in the camera image of calibration plate 200 (e.g., as described above with respect to FIG. 1).

According to various embodiments, calibration plate 200 may made of a radiolucent and/or rigid material. For example, calibration plate 200 may be made of plexiglass, cardboard, foamboard and/or adhesive material. In this manner, deformation of calibration plate 200, and thus displacement of radiopaque marker(s) 210, 220 and optical marker(s) 230 from the predetermined positions thereof may be prevented.

In various embodiments, radiopaque marker(s) (e.g., radiopaque marker(s) 210 and/or 220) may be embedded within or attached to a surface of calibration plate 200 (e.g., as shown in FIG. 2C). In some embodiments, optical marker(s) 230 may be printed on the surface of calibration plate 200 (e.g., as shown in FIG. 2C).

In some embodiments, calibration plate 200 may have matte surface. The matte surface of calibration plate 200 may, for example, reduce light reflection from light sources in the operating room and eliminate (or substantially eliminate) a glare in the camera image due to the light reflection thereof and thereby and avoid a loss of information that may be obtained from optical markers 230.

Figure 3:
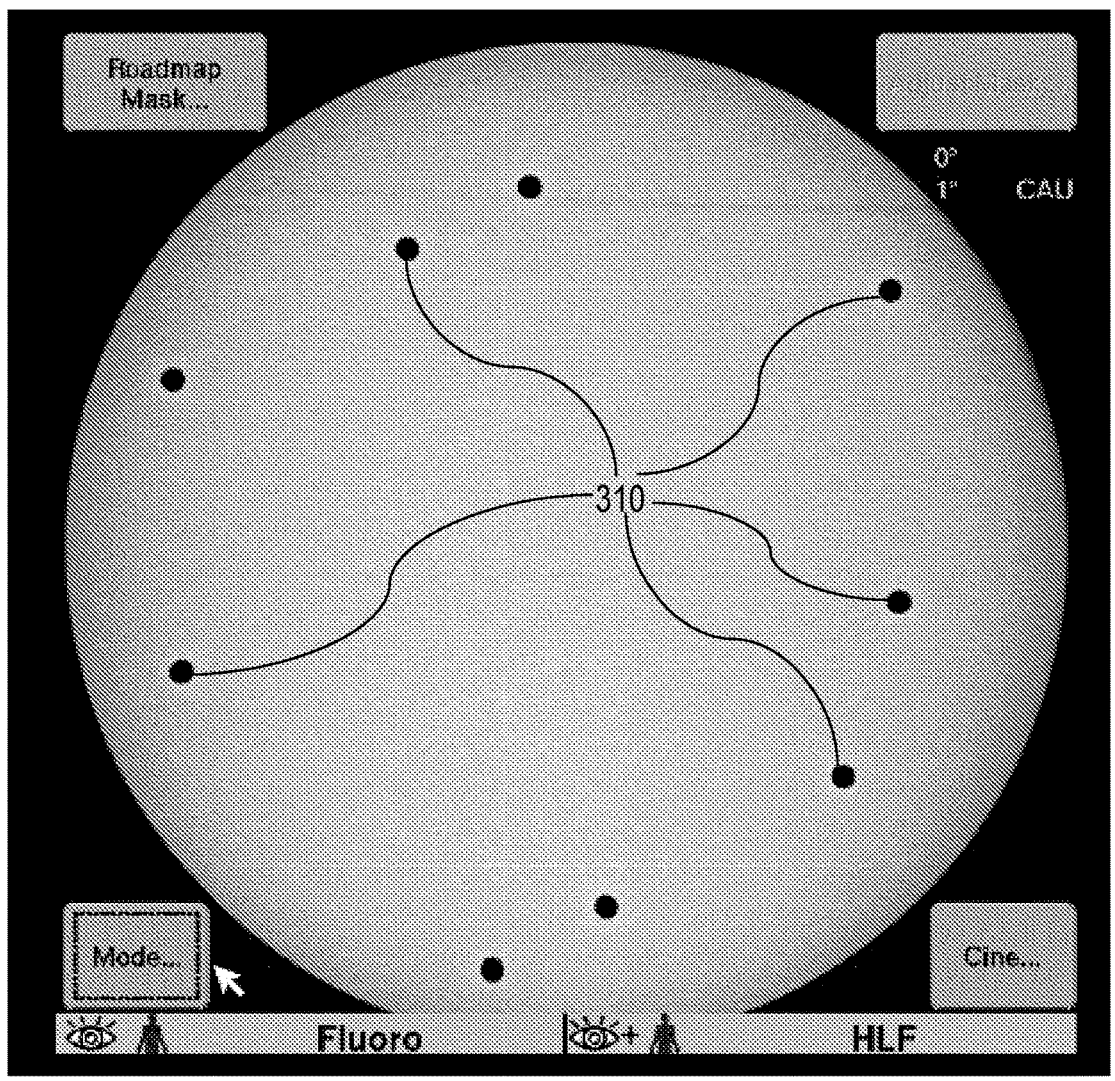
FIG. 3 is an X-Ray image of a calibration plate for a system for aiming and/or aligning of a treatment tool within an X-Ray device environment, according to some embodiments of the invention.

Reference is now made to FIG. 3, which is an X-Ray image 300 of a calibration plate (such as calibration plates 110 or 200) for a system for aiming and/or aligning of a treatment tool 90 within an X-Ray device 80 environment (such as system 100), according to some embodiments of the invention.

FIG. 3 depicts, for example, an X-Ray image 300 of a calibration plate (e.g., calibration plate 200 depicted in FIG. 2C). X-ray image 300 may be obtained using X-Ray device 80 prior to, or during, the treatment procedure (e.g., as described above with respect to FIG. 1). X-Ray image 300 includes a visual representation 310 of radiopaque markers asymmetrically positioned at predetermined positions thereof within the calibration plate (e.g., radiopaque markers 220 depicted in FIG. 2C).

Figure 4:
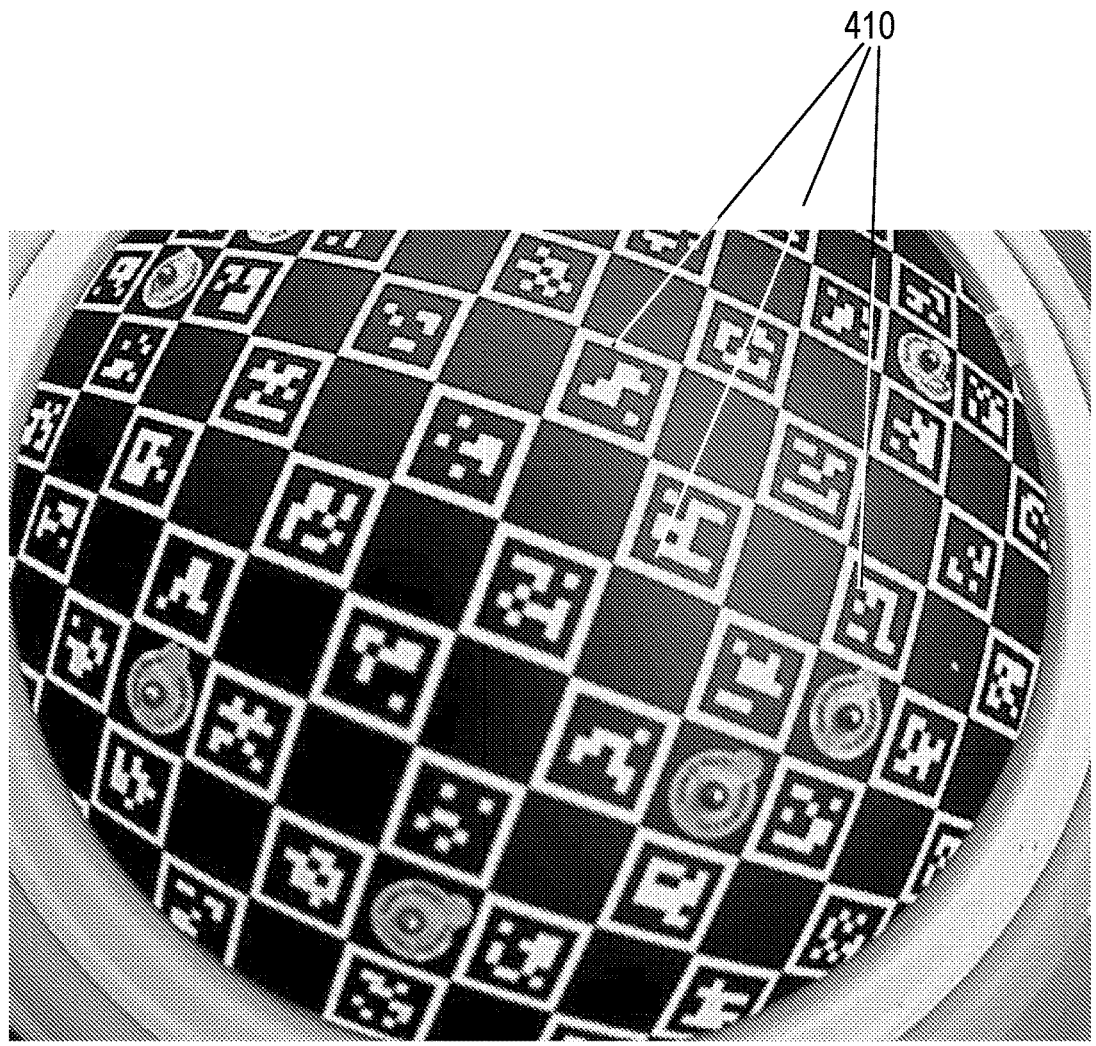
FIG. 4 is a camera image of a calibration plate of a system for aiming and/or aligning of a treatment tool within an X-Ray device environment, according to some embodiments of the invention.

Reference is now made to FIG. 4, which is a camera image 400 of a calibration plate (such as calibration plates 110 or 200) of a system for aiming/aligning of a treatment tool 90 within an X-Ray device 80 environment (such as system 100), according to some embodiments of the invention.

FIG. 4 depicts, for example, a camera image 400 of a calibration plate (e.g., calibration plate 200 depicted in FIG. 2C). Camera image 400 may be obtained using a camera (e.g., camera 120 as described above with respect to FIG. 1) attached to treatment tool 90 during, for example, a treatment procedure. Camera image 400 may include a visual representation 410 of optical markers positioned at predetermined positions thereof within the calibration plate (e.g., optical markers 230 depicted in FIG. 2C).

Figure 5A:
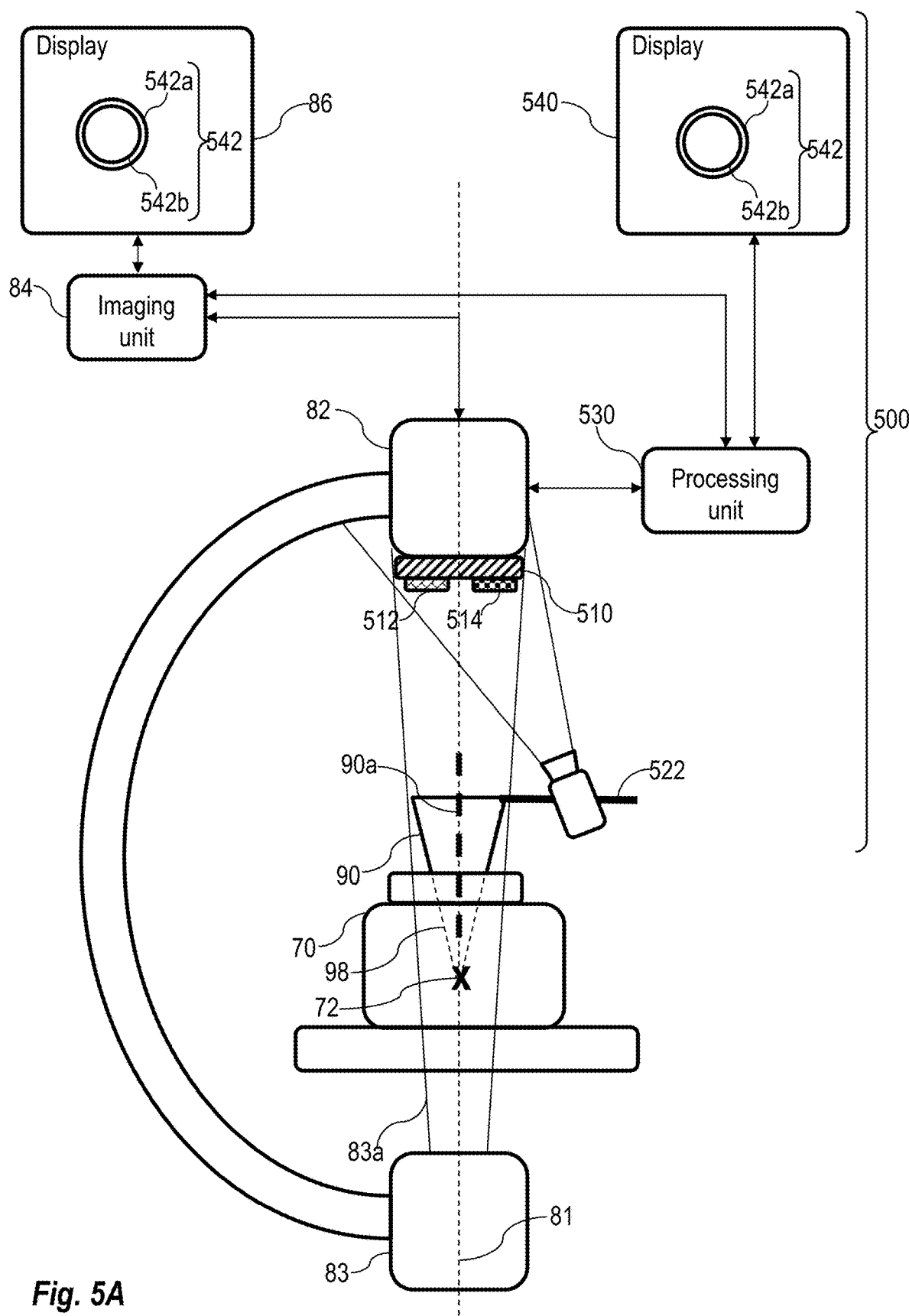
FIGS. 5A, 5B and 5C are schematic illustrations of a system for aiming and/or aligning of a treatment tool in an X-Ray device environment, wherein the treatment tool requires alignment thereof with respect to the X-Ray device, according to some embodiments of the invention.
Figure 5B:
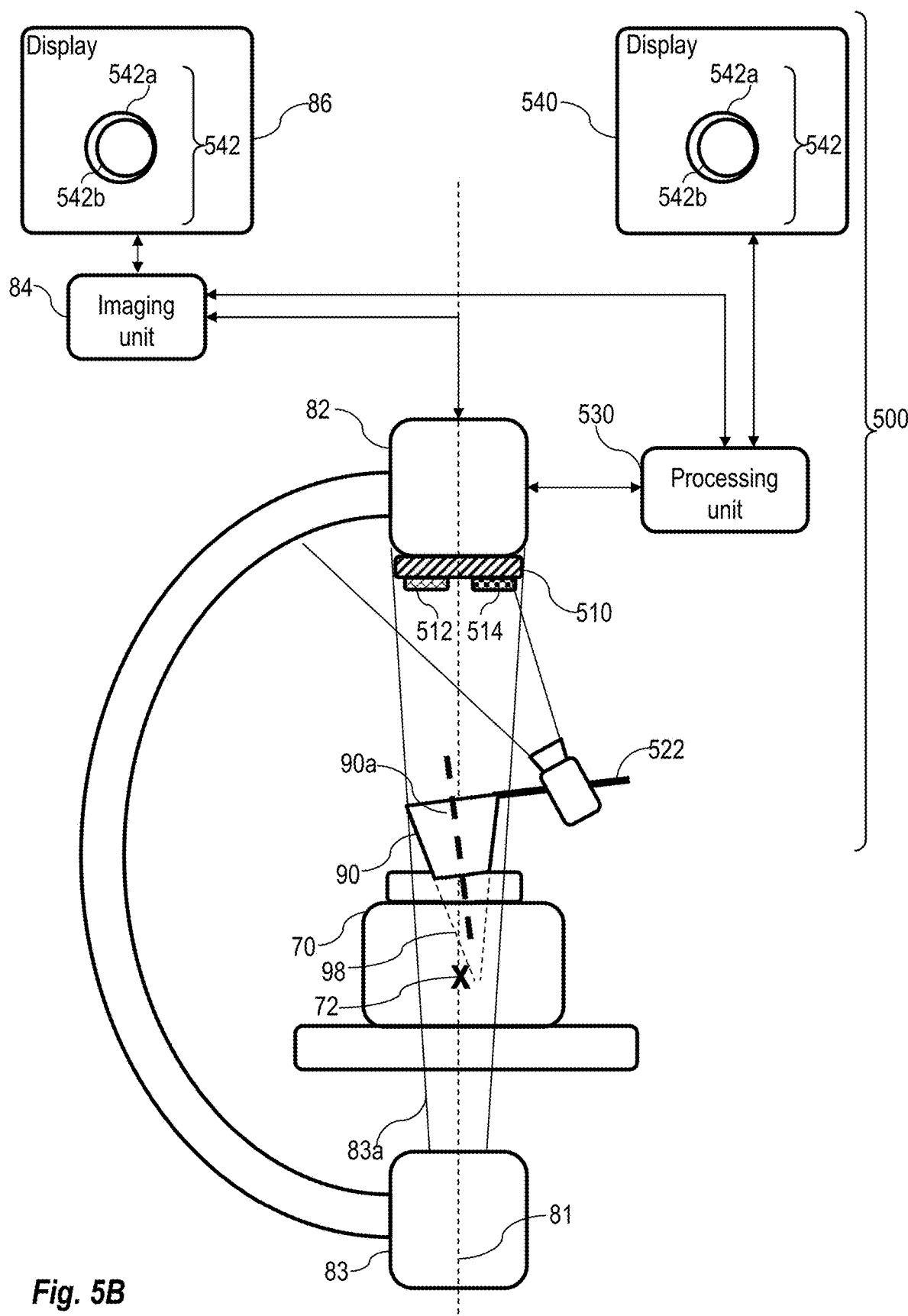
Figure 5C:
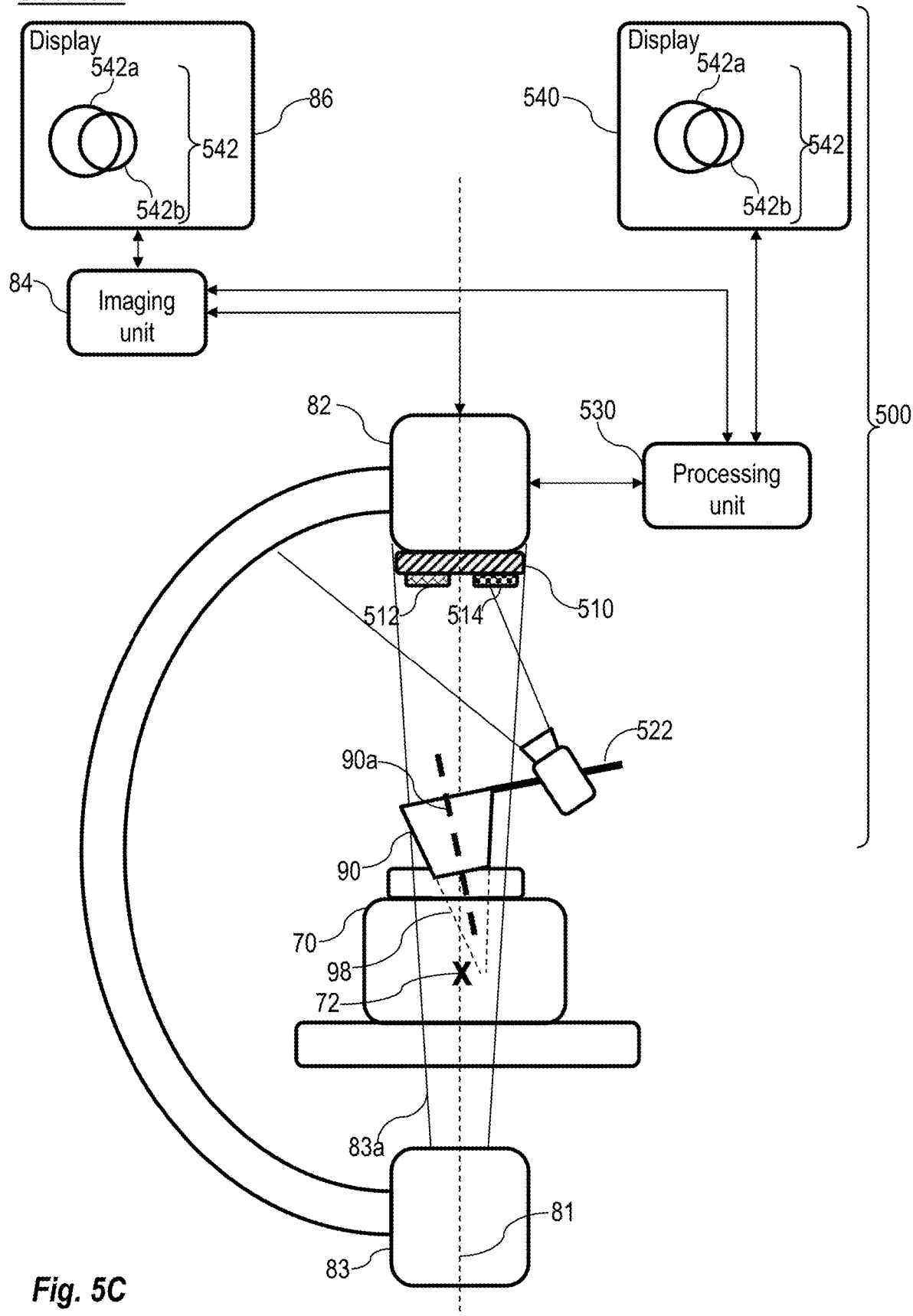

Reference is now made to FIGS. 5A, 5B and 5C, which are schematic illustrations of a system 500 for aiming and/or aligning of a treatment tool 90 in an X-Ray device 80 environment, wherein treatment tool 90 requires alignment thereof with respect to X-Ray device 80, according to some embodiments of the invention.

Some treatment tools 90 need to be aligned with respect to X-Ray device 80 in order to safely apply the treatment. For example, the required position and orientation of such treatment tools (e.g., the required position and orientation described above with respect to FIG. 1) may include alignment of a central longitudinal axis 90a of treatment tool 90 with a central longitudinal axis 81 of X-Ray device 80 (e.g., axis that extends between centers of X-Ray source 83 and X-Ray intensifier 82). An example of such treatment tool 90 may include a focused ultrasound (FUS) transducer configured to project a focused ultrasound energy 98 onto target area 72 within patient 70, such as a human patient, or any other mammal—e.g., as schematically illustrated in FIGS. 5A, 5B and 5C.

For example, FIG. 5A shows treatment tool 90 that is aligned along its central longitudinal axis 90a with central longitudinal axis 81 of X-Ray device 80. FIGS. 5B and 5C show treatment tool 90 that is misaligned with respect to central longitudinal axis 81 of X-Ray device 80.

According to some embodiments, system 500 may include a calibration plate 510, a camera 520 and a processing unit 530 (e.g., as shown in FIG. 5A). For example, system 500 may be a system such as system 100 described above with respect to FIG. 1.

According to some embodiments, calibration plate 510 may be attachable, or removably attachable, to X-Ray device 80 such that calibration plate 510 will be in a field-of-view 83a of X-Ray source 83. For example, calibration plate 510 may be attachable, or removably attachable, to X-Ray intensifier 82 of X-Ray device 80.

For example, calibration plate 510 may be calibration plate 110 (described above with respect to FIG. 1) or calibration plate 200 (described above with respect to FIGS. 2A, 2B and 2C). Radiopaque marker(s) 512 may be radiopaque marker(s) 112 (described above with respect to FIG. 1), radiopaque marker(s) 210 (described above with respect to FIG. 2A) or radiopaque marker(s) 220 (described above with respect to FIGS. 2B and 2C). Optical marker(s) 514 may be optical marker(s) 114 (described above with respect to FIG. 1) or optical marker(s) 230 (described above with respect to FIGS. 2A, 2B and 2C).

According to some embodiments, camera 520 may be attachable, or removably attachable, to treatment tool 90 (for example, using a camera connector 522) at a predetermined/known position and orientation with respect to treatment tool 90. For example, camera 520 and camera connector 522 may be a camera and connector such as camera 120 and camera connector 122, respectively, described above with respect to FIG. 1.

According to some embodiments, processing unit 530 may be in communication (wired or wireless) with X-Ray imaging unit 84 and camera 520. For example, processing unit 530 may be processing unit 130 described above with respect to FIG. 1.

Processing unit 530 may be configured to determine the position and orientation of treatment tool 90 with respect to X-Ray device 80 (e.g., as described above with respect to FIG. 1).

In various embodiments, processing unit 530 may be configured to determine, based on the determined position and orientation of treatment tool 90 with respect to X-Ray device 80, whether central longitudinal axis 90a of treatment tool 90 is aligned along/misaligned with respect to central longitudinal axis 81 of X-Ray device 80 and/or whether the misalignment thereof is within the allowed error range (e.g., the allowed error range described above with respect to FIG. 1).

According to various embodiments, processing unit 530 may be configured to display, for example, on a display 540 and/or on X-Ray display 86, a visual indicator 542 that indicates the determined position and orientation of treatment tool 90 with respect to X-Ray device 80 (e.g., as described above with respect to FIG. 1). Visual indicator 542 may be visual indicator 142 described above with respect to FIG. 1.

Visual indicator 542 may be further configured to indicate whether central longitudinal axis 90a of treatment tool 90 is aligned along or misaligned with respect to central longitudinal axis 81 of X-Ray device 80 and/or whether the misalignment therebetween is within the allowed error range.

In some embodiments, visual indicator 542 may include a first visual member 542a and a second visual member 542b (e.g., as shown in FIGS. 5A, 5B and 5C). First visual member 542a and second visual marker 542b may have different shapes, dimensions or other visual parameters (e.g., color, line width, etc.). For example, first visual member 542a and second visual member 542b may have any combination of ring-like markers (e.g., "O"), cross-like markers (e.g., "+") or the like.

For example, when processing unit 530 determines that central longitudinal axis 90a of treatment tool 90 is aligned along central longitudinal axis 81 of X-Ray device 80, first visual member 542a and second visual member 542b may coincide with respect to each other when displayed on display 540 and/or X-Ray display 86.

Yet in this example, when processing unit 530 determines that central longitudinal axis 90a of treatment tool 90 is misaligned with respect to central longitudinal axis 81 of X-Ray device 80, first visual member 542a and second visual member 542b do not coincide with respect to each other when displayed on display 540 and/or X-Ray display 86.

In some embodiments, processing unit 530 may be configured to update the visual parameters of visual indicator 542 (or of first visual member 542a and second visual member 542b) based on the determined position and orientation of treatment tool 90 with respect to X-Ray device 80.

For example, when central longitudinal axis 90a of treatment tool 90 is aligned along central longitudinal axis 81 of X-Ray device 80 or when the misalignment therebetween is within the allowed error range, visual indicator 542 may have, for example, green color.

Yet in this example, when the misalignment between central longitudinal axis 90a of treatment tool 90 and central longitudinal axis 81 of X-Ray device 80 is not within the allowed error range, visual indicator 542 may have, for example, red color.

FIGS. 5A, 5B and 5C show a non-limiting example of first visual member 542a and second visual member 542b that have ring-like shapes, wherein the diameter of second visual member 542b is smaller than the diameter of first visual member 542a.

In this example, when processing unit 530 determines that central longitudinal axis 90a of treatment tool 90 is aligned along central longitudinal axis 81 of X-Ray device 80, first visual member 542a and second visual member 542b may coincide with respect to each other when displayed on display 540 and/or X-Ray display 86 (e.g., as shown in FIG. 5A).

Yet in this example, when processing unit 530 determines that central longitudinal axis 90a of treatment tool 90 is misaligned with respect to central longitudinal axis 81 of X-Ray device 80 and when the misalignment therebetween is within the allowed error range, second visual member 542b may be completely positioned within first visual member 542a, when displayed on display 540 and/or X-Ray display 86, but not coincide therewith (e.g., as shown in FIG. 5B).

Yet in this example, when processing unit 530 determines the misalignment between central longitudinal axis 90a of treatment tool 90 and central longitudinal axis 81 of X-Ray device 80 is not within the allowed error range, second visual member 542b may only partly overlap, or not overlap at all, within first visual member 542a, when displayed on display 540 and/or X-Ray display 86 (.g., as shown in FIG. 5C).

Figure 5D:
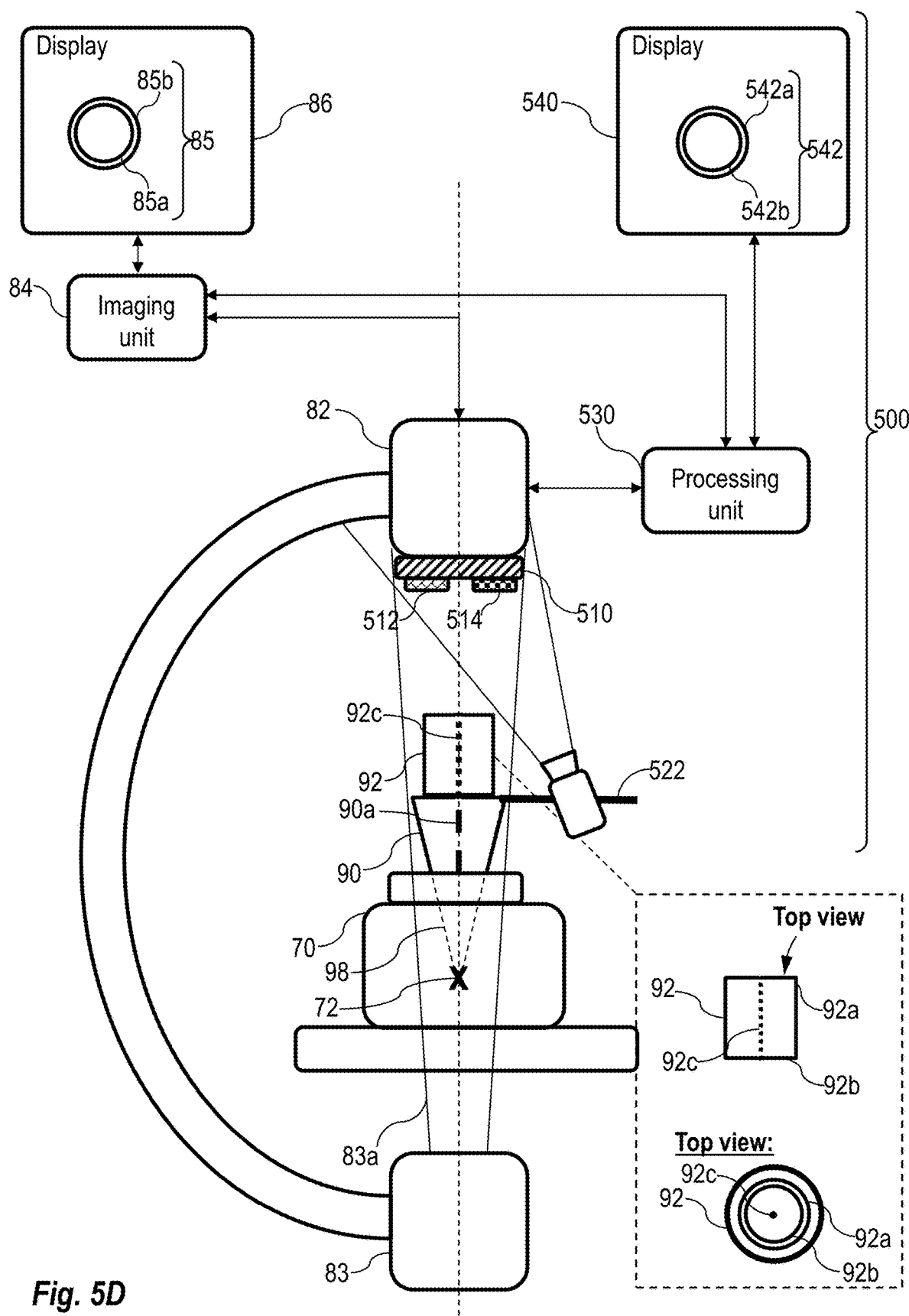
FIG. 5D is a schematic illustration of a system for aiming and/or aligning of a treatment tool in an X-Ray device environment, wherein the treatment tool has an X-Ray aiming and aligning device, according to some embodiments of the invention.

Reference is now made to FIG. 5D, which is a schematic illustration of a system 500 for aiming and/or aligning of a treatment tool 90 in an X-Ray device 80 environment, wherein treatment tool 90 has an X-Ray aiming and aligning device 92, according to some embodiments of the invention.

Figure 5E:
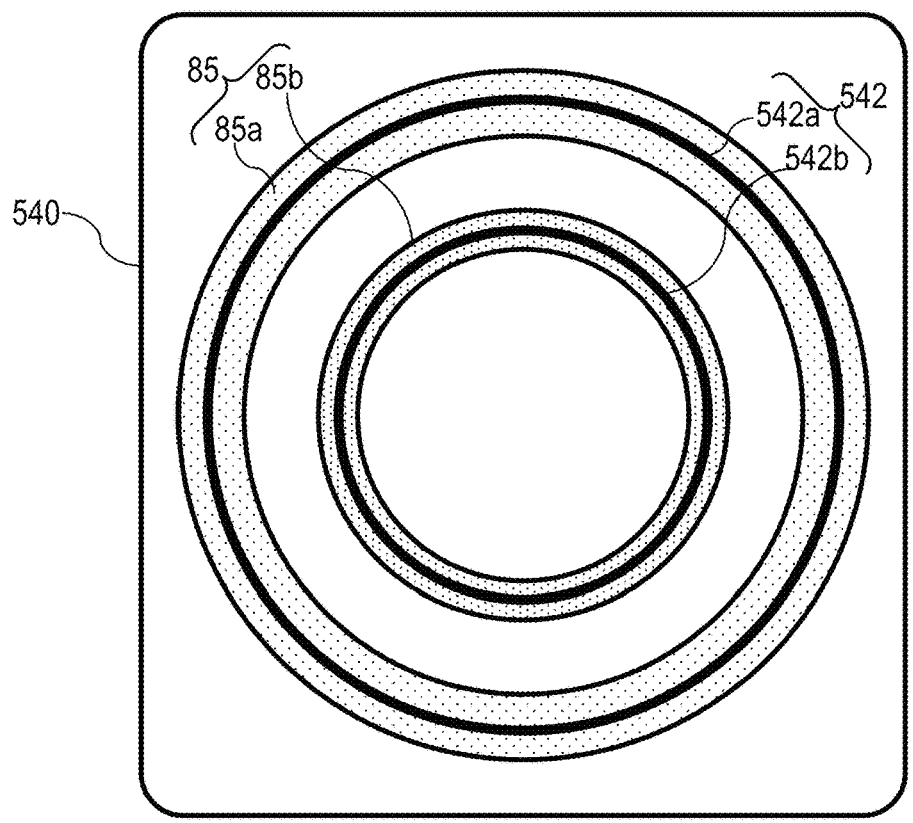
FIGS. 5E and 5F are schematic illustrations of a visual representation of an X-Ray aiming and aligning device of a treatment tool and of a visual indicator generated by a processing unit of a system for aiming and/or aligning a treatment tool in an X-Ray device environment, according to some embodiments of the invention.
Figure 5F:
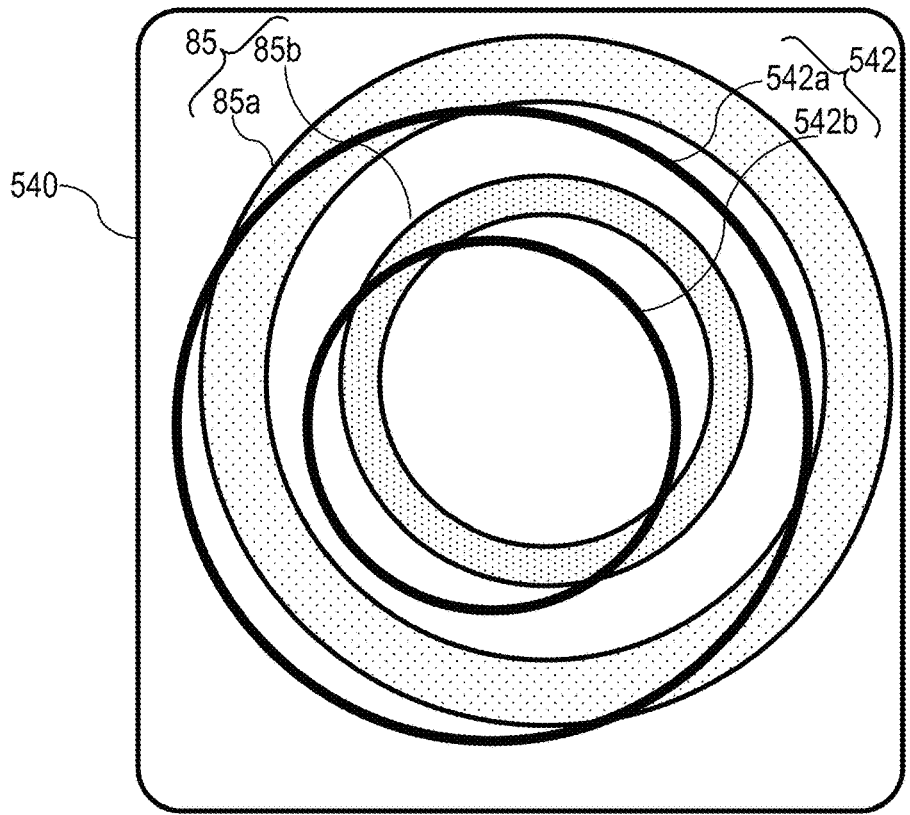

Reference is also made to FIGS. 5E and 5F, which are schematic illustrations of a visual representation 85 of an X-Ray aiming and aligning device 92 of a treatment tool 90 and of a visual indicator 542 generated by a processing unit 530 of a system 500 for aiming and/or aligning of a treatment tool 90 in an X-Ray device 80 environment, according to some embodiments of the invention.

Some treatment tools that need to be aligned with respect to X-Ray device 80 prior to applying a treatment (e.g., as described above with respect to FIGS. 5A, 5B and 5C) may include an X-Ray aiming and aligning device 92 (e.g., as shown in FIG. 5D).

X-Ray aiming and aligning device 92 may, for example, include two radiopaque surfaces (e.g., a first radiopaque surface 92a and a second radiopaque surface 92b) that are parallel, congruent and positioned at a distance along a central longitudinal axis 92c of X-Ray aiming and aligning device 92 with respect to each other (e.g., as shown in FIG. 5D). X-Ray aiming and aligning device 92 may be attachable to treatment device 90 such that central longitudinal axis 92c of X-Ray aiming and aligning device is aligned along central longitudinal axis 90a of treatment device 90.

A visual representation 85 of X-Ray aiming and aligning device 92 in an X-Ray image thereof (e.g., a visual representation 85a of first surface 92a and a visual representation 85b of second surface 92b) may provide an indication whether the position and orientation of treatment tool 90 with respect to X-Ray device 80 is within the allowed error range as compared to the required position and orientation thereof.

For example, when the position and orientation of treatment tool 90 with respect to X-Ray device 80 is within the allowed error range as compared to the required position and orientation thereof, visual representation 85a of first surface 92a may coincide (or substantially coincide) with visual representation 85b of second surface 92b on the X-ray image of X-ray aiming and aligning device 92 (e.g., displayed on, for example, X-Ray display 86) (e.g., as shown in FIG. 5D).

In some embodiments, processing unit 530 may generate visual indicator 542 that corresponds to X-Ray aiming and aligning device 92. For example, first visual marker 542a and second visual marker 542b of visual indicator 542 may have same (or substantially same) shapes and/or dimensions as visual representation 85a of first surface 92a and visual representation 85b of second surface 92b of X-Ray aiming and aligning device 92, respectively (e.g., as shown in FIG. 5D).

According to various embodiments, processing unit 530 may be configured to display visual indicator 542 on display 540 (e.g., as shown in FIG. 5D) and/or X-Ray display 86. In various embodiments, processing unit 530 may be configured to display, on display 540 and/or X-Ray display 86, both visual representation 85 of X-Ray aiming and aligning device 92 and visual indicator 542 (e.g., as shown in FIGS. 5E and 5F).

In various embodiments, processing unit 530 may be configured to superimpose visual representation 85 of X-Ray aiming and/or aligning device 92 and visual indicator 542 on an X-Ray image of target area 72 of patient 70, displayed on display 540 and/or X-Ray display 86.

In some embodiments, processing unit 530 may be configured to detect, or mark, target area 72 in the X-Ray image thereof. Processing unit 530 may be configured to determine whether treatment tool 90 is aligned with respect to target area 72 based on the determined position and orientation of treatment tool 90 and the X-Ray image. In some embodiments, processing unit 530 may be configured to update visual indicator 542 to thereby indicate whether treatment tool 90 is aligned with target area 72 or not.

According to some embodiments, the determined position and orientation of treatment tool 90 with respect to X-Ray device 80 may differ from the actual position and orientation thereof by a specified error value. The specified error value may depend on, for example, an error in a metric resolution of X-Ray intensifier 82, an error in a distance value between X-Ray source 83 and X-Ray intensifier 82, incorrect connection of calibration plate 510 to X-Ray intensifier 82 (e.g., such that calibration plate 510 is not parallel to X-Ray intensifier 82) and/or incorrect connection of camera 520 to treatment tool 90 (e.g., such that camera 520 is not at the predetermined position and orientation with respect to treatment tool 90).

In some embodiments, processing unit 530 may be configured to determine the position and orientation of treatment tool 90 with respect to X-Ray device 80 such that the specified error value is no more than a millimeter.

When the determined position and orientation of treatment tool 90 with respect to X-Ray device 80 differs from the actual position and orientation thereof, visual indicator 542 may be shifted with respect to visual representation 85 of X-Ray aiming and aligning device 92 (e.g., that represents the actual position and orientation thereof)—e.g., as schematically illustrated in FIG. 5F.

In some embodiments, processing unit 530 may be configured to update the determined position and orientation of treatment tool 90 with respect to X-Ray device 80, based on the visual representation 85 of X-Ray aiming and aligning device 92, to thereby minimize an error therebetween and to yield an updated position and orientation of treatment tool 90 with respect to X-Ray device 80. The updating may be utilized by, for example, identifying radiopaque markers (e.g., first surface 92a and second surface 92b) of X-Ray aiming and aligning device 92 and extrapolating, based on the position thereof, a location of treatment area 72 in a space between X-Ray source 83 and X-Ray intensifier 82 within field of view 83a thereof, and further superimposing the visual representation of the radiopaque markers on the X-Ray images.

In some embodiments, processing unit 530 may generate treatment tool guiding instructions based on the determined position and orientation of treatment tool 90 with respect to X-Ray device 80 and display the treatment tool guiding instructions on display 86/540 (e.g., as described below with respect to FIGS. 14A and 14B). The guiding instruction may be indicative of one or more directions in which treatment tool 90 should be moved (e.g., displaced and/or tilted) and/or a measure of movement in each of the direction(s) in order to bring treatment tool 90 into a position and orientation that is within the allowed error range thereof. The treatment tool guiding instructions may, for example, enable easy and intuitive aiming and/or aligning of treatment tool 90 with respect to target area 72 and/or X-Ray device 80.

It is noted that the treatment may be applied merely based on visual representation 85 of X-Ray aiming and aligning device 92 and X-Ray image of target area 72, without relying on virtual indicator 542.

Figure 5G:
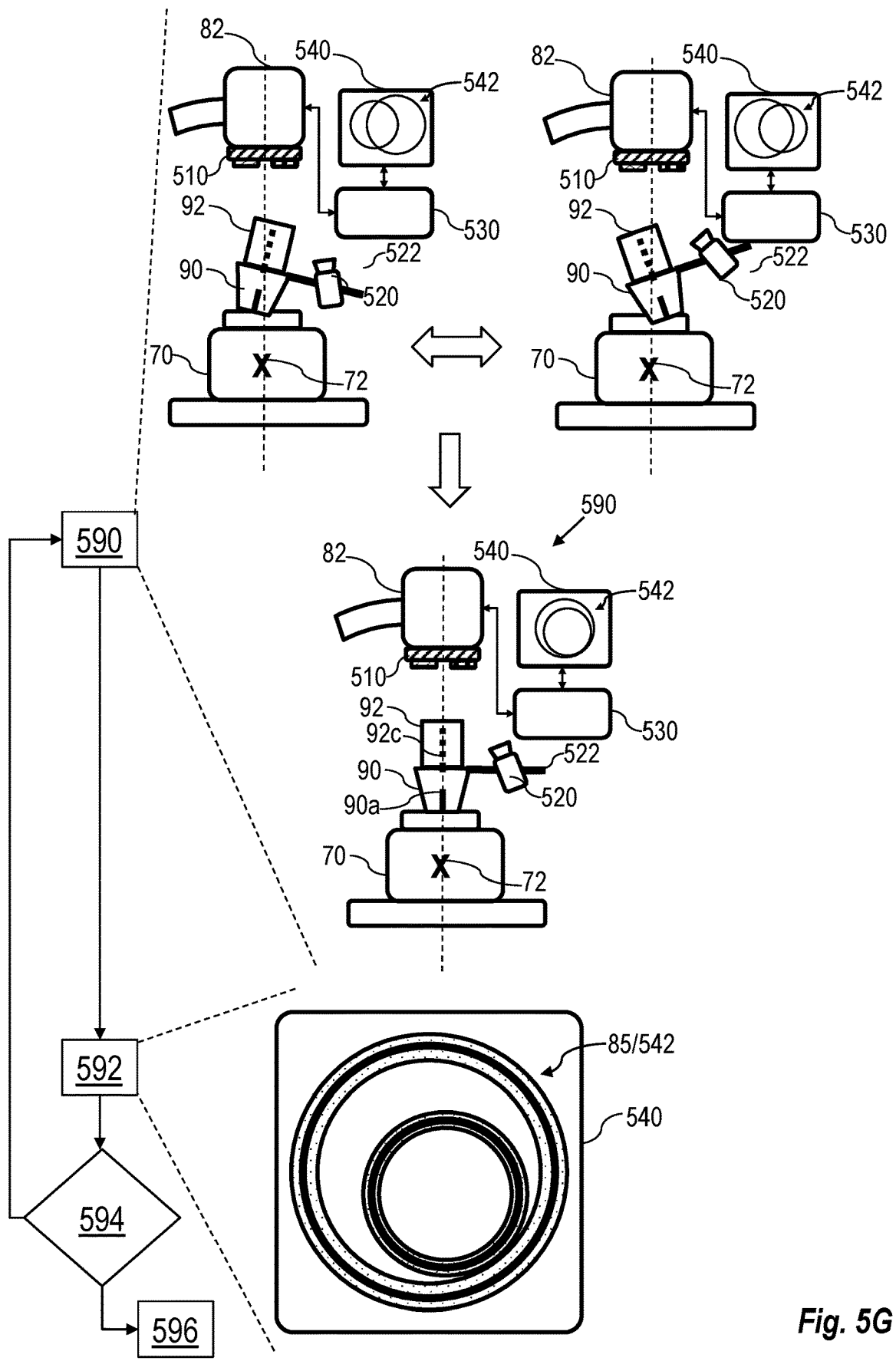
FIG. 5G presents schematic illustrations of a system for aiming and/or aligning of a treatment tool in an X-Ray device environment and a flowchart of a method of using the system, according to some embodiments of the invention.

Reference is now made to FIG. 5G, which presents schematic illustrations of a system 500 for aiming and/or aligning of a treatment tool 90 in an X-Ray device 80 environment and a flowchart of a method of using system 500, according to some embodiments of the invention.

It is noted that the method is not limited to the flowchart illustrated in FIG. 5G and to the corresponding description. For example, in various embodiments, the method needs not move through each illustrated box or stage, or in exactly the same order as illustrated and described.

Stage 590 of the method may, for example, include aiming treatment tool 90 at target area 72 within patient 70 and/or aligning treatment tool 90 with respect to X-Ray device 80 based on visual indicator 542 (e.g., displayed on display 540) that indicates the determined position and orientation of treatment tool 90 with respect to X-Ray device 80 (e.g., as described above with respect to FIGS. 5A, 5B, 5C, 5D, 5E and 5F). The aiming and/or aligning may, for example, include translating, tilting, pitching, yawing, rolling, etc. of treatment tool 90.

Stage 590 of the method may be repeated until, for example, visual indicator 542 indicates that the position and orientation of treatment tool 90 with respect to X-Ray device 80 is within the allowed error range as compared to the required position and orientation thereof (e.g., as described above with respect to FIGS. 5A, 5B, 5C, 5D, 5E and 5F).

Stage 590 of the method may be performed without obtaining X-Ray images of treatment tool 90/X-Ray aiming and aligning device 92, e.g., only based on the visual indicator 542 (e.g., as described above with respect to FIGS. 5A, 5B, 5C, 5D, 5E and 5F). This in contrast to, for example, current treatment procedures that do not utilize system 500 and that require frequent X-Ray imaging of treatment tool 90 and patient 70 during this stage of aiming and/or aligning.

Stage 592 of the method may, for example, include obtaining an X-Ray image of X-Ray aiming and aligning device 92 of treatment tool 90 and displaying visual representation 85 of X-Ray aiming and aligning device 92, optionally together with visual indicator 542, on, for example, display 540 (e.g., as described above with respect to FIGS. 5A, 5B, 5C, 5D, 5E and 5F).

Stage 594 of the method may, for example, include determining, based on visual representation 85 of X-Ray aiming and aligning device 92, whether the actual position and orientation of treatment tool 90 is within the allowed error range with respect to the required position and orientation thereof or not e.g., as described above with respect to FIGS. 5A, 5B, 5C, 5D, 5E and 5F.

If the actual position and orientation of treatment tool 90 is within the allowed error range thereof, the method may move to stage 596 that may, for example, include applying the treatment by treatment tool 90.

If the actual position and orientation of treatment tool 90 is not within the allowed error range thereof, the method may include repeating stage 590.

Figure 6:
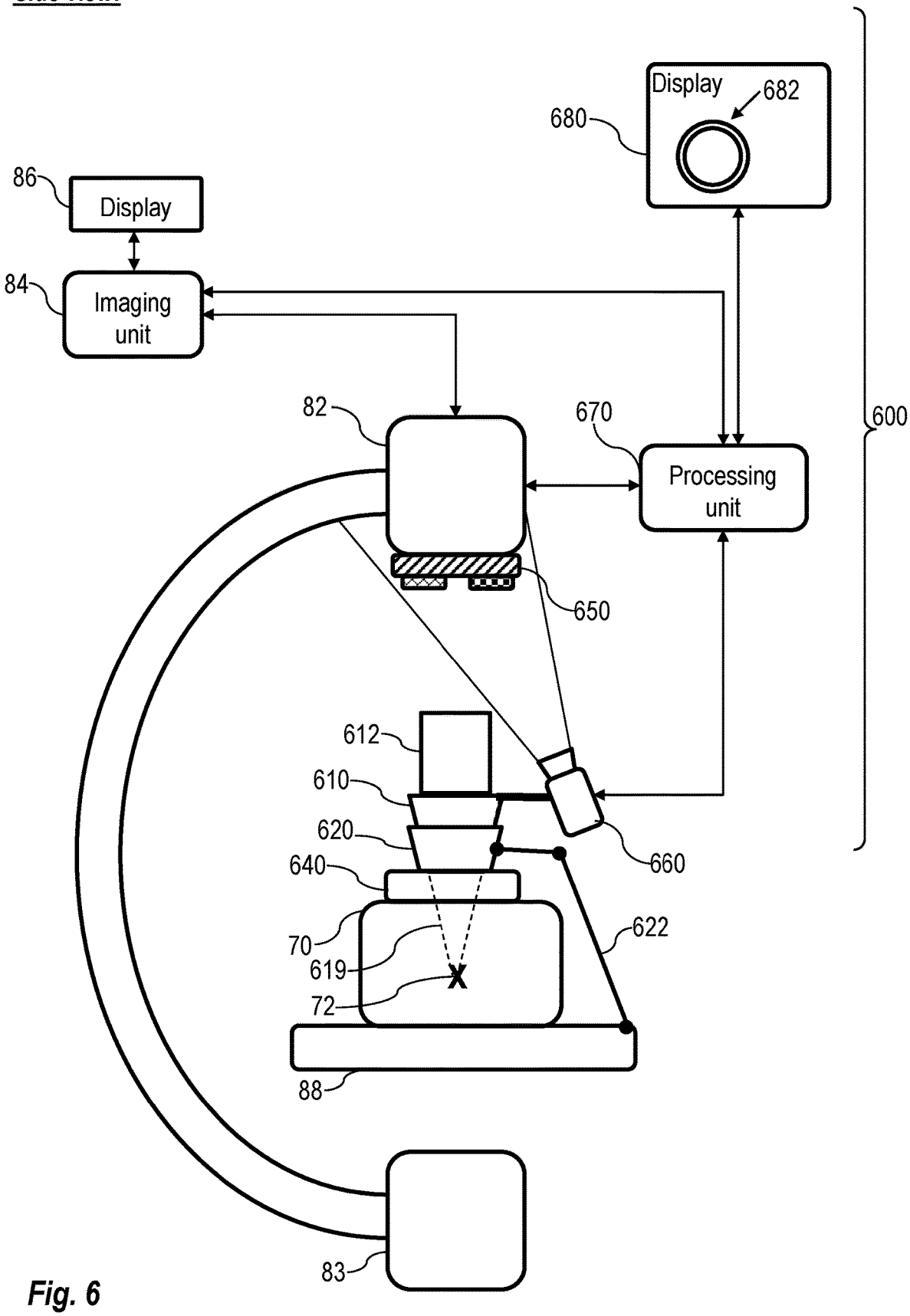
FIG. 6 is a schematic illustration of a first embodiment of a system for projecting a focused ultrasound energy, according to some embodiments of the invention.

Reference is now made to FIG. 6, which is a schematic illustration of a first embodiment of a system 600 for projecting a focused ultrasound energy, according to some embodiments of the invention.

According to some embodiments, system 600 may include a focused ultrasound (FUS) transducer 610 arranged to generate a FUS energy 619 (e.g., treatment tool 90 described above with respect to FIGS. 5A-5G).

According to some embodiments, system 600 may include an X-Ray aiming and aligning device 612 attachable to FUS transducer 610 (e.g., X-Ray aiming and aligning device 92 described above with respect to FIGS. 5D-5G).

According to some embodiments, system 600 may include a support 620 adapted to accommodate FUS transducer 610. In some embodiments, support 622 may be hand-held. In some embodiments, system 600 may include an articulated arm 622 coupled to a table 88 at its first end to support 620 at its second end. Articulated arm 622 may be arranged to enable translation, tilting, pitching, yawing and/or rolling of support 620 and FUS transducer 610 accommodated therein.

According to some embodiments, system 600 may include an acoustic coupler 640 arranged to acoustically couple FUS transducer 610 to patient 70 to thereby enable delivery of FUS energy 619 to target area 72 within patient 70.

According to some embodiments, system 600 may include a calibration plate 650 attachable, or removably attachable, to X-Ray device 80, for example X-Ray intensifier 82 (e.g., calibration plate 110 described above with respect to FIG. 1 or calibration plate 200 described above with respect to FIGS. 2A-2C).

According to some embodiments, system 600 may include a camera 660 removably attachable to support 620/FUS transducer 610 (e.g., camera 120 described above with respect to FIG. 1 or camera 520 described above with respect to FIGS. 5A-5G).

According to some embodiments, system 600 may include a processing unit 670 (e.g., processing unit 130 described above with respect to FIG. 1 or processing unit 530 described above with respect to FIGS. 5A-5G). Processing unit 670 may be configured to determine the position and orientation of FUS transducer 610 with respect to X-Ray device 80 (e.g., as described above with respect to FIGS. 5A-5G).

According to some embodiments, system 600 may include a display 680. Processing unit 670 may be configured to display, on display 680 and/or on X-Ray display 86, a visual indicator 682 indicating the determined position and orientation of FUS transducer 610 (e.g., visual indicator 542 described above with respect to FIGS. 5A-5G).

In various embodiments, processing unit 670 may be configured to superimpose visual indicator 682 on, for example, an X-Ray image of target area 72 of patient 70 to yield a superimposed image, and to display the superimposed image on display 680 and/or on X-Ray display 86.

In some embodiments, processing unit 670 may be configured to detect, or mark, target area 72 in the X-Ray image thereof. Processing unit 670 may be configured to determine whether treatment tool 90 is aligned with respect to target area 72 based on the determined position and orientation of treatment tool 90 and the X-Ray image. In some embodiments, processing unit 670 may be configured to update visual indicator 682 to thereby indicate whether treatment tool 90 is aligned with target area 72 or not.

In some embodiments, processing unit 670 may generate treatment tool guiding instructions based on the determined position and orientation of treatment tool 90 with respect to X-Ray device 80 and display the treatment tool guiding instructions on display 86/680 (e.g., as described below with respect to FIGS. 14A and 14B). The treatment tool guiding instructions may, for example, enable easy and intuitive aiming and/or aligning of treatment tool 90 with respect to target area 72 and/or X-Ray device 80.

System 600 may enable the user (e.g., treating physician) to aim FUS transducer 610 at target area 72 within patient 70 and/or to align FUS transducer 610 with respect to X-Ray device 80 using visual indicator 682 displayed on display 680 and/or on X-Ray display 86. Visual indicator 682 may indicate the determined position and orientation of FUS transducer 610 with respect to X-Ray device 80, which eliminates (or substantially eliminates) a need in X-Ray imaging of patent 70 during the aiming and/or aligning of FUS transducer 610. When using system 600, X-Ray imaging may be required only at final stages of aiming and/or aligning of FUS transducer 610 in order to verify, prior to application of the treatment, that the actual position and orientation of FUS transducer 610 with respect to X-Ray device 80 corresponds to the required position and orientation thereof or within the allowed error range thereof (e.g., as described above with respect to FIGS. 5A-5G). In this manner, system 600 may enable significantly reducing the exposure of the patient and/or the user to the X-Ray radiation during the treatment procedure as compared to current treatment procedures that require multiple exposures of patient 70 to X-Ray radiation during aiming and/or aligning of FUS transducer 610. Furthermore, system 600 may enable significantly reducing the overall time duration of the treatment procedure as compared to current treatment procedures that do not utilize system 600.

Figure 7:
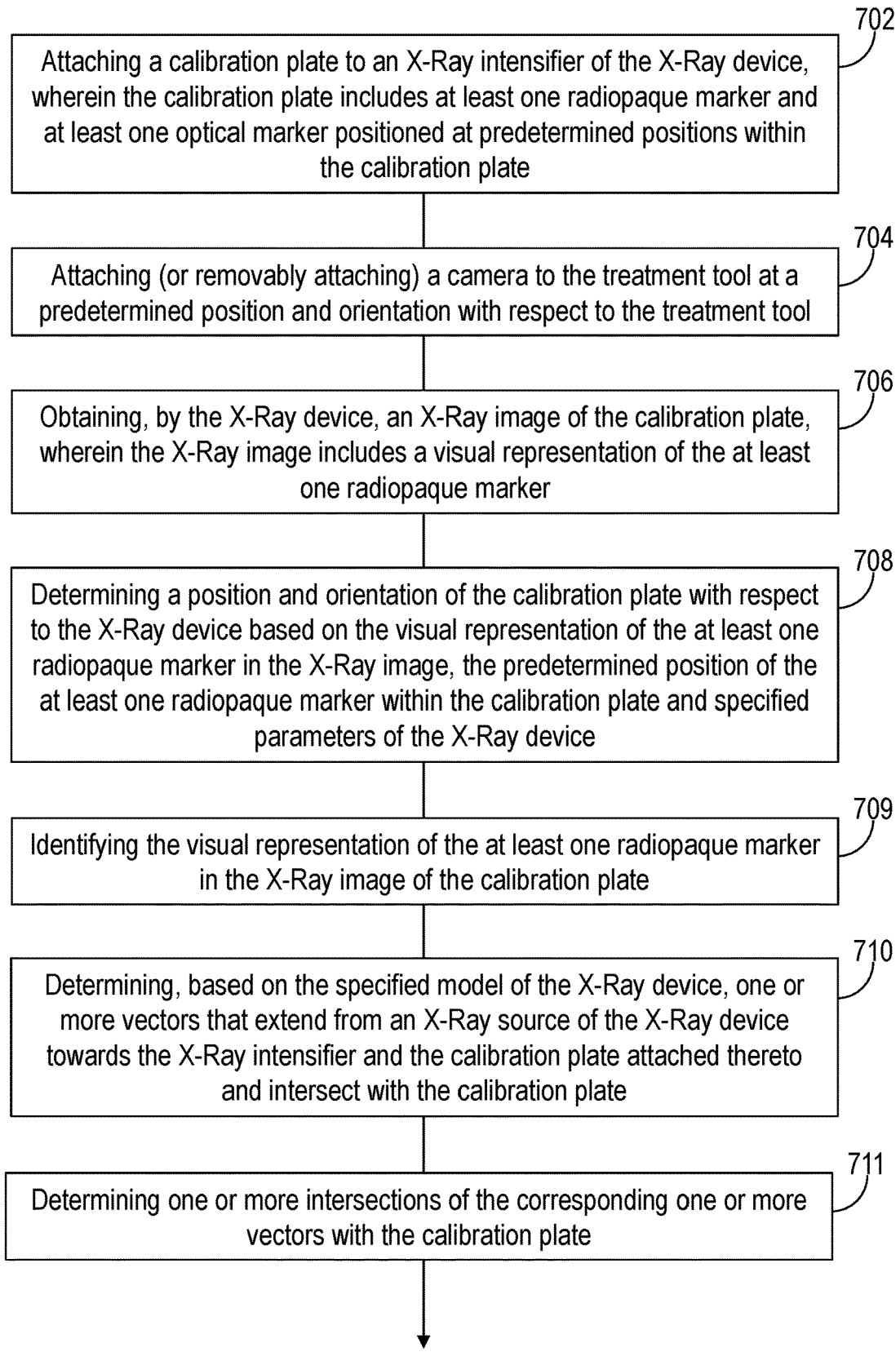
FIG. 7 is a flowchart of a first method of aiming and/or aligning of a treatment tool in an X-Ray device environment, according to some embodiments of the invention.

Reference is now made to FIG. 7, which is a flowchart of a first method of aiming and/or aligning a treatment tool in an X-Ray device environment, according to some embodiments of the invention.

The method may be implemented by a system for aiming/aligning a treatment tool in an X-Ray device environment (such as system 100 described above with respect to FIG. 1 or system 500 described above with respect to FIGS. 5A-5G), which may be configured to implement the method. It is noted that the method is not limited to the flowcharts illustrated in FIG. 7 and to the corresponding description. For example, in various embodiments, the method needs not move through each illustrated box or stage, or in exactly the same order as illustrated and described.

According to some embodiments, the method includes attaching (or removably attaching) a calibration plate to an X-Ray intensifier of the X-Ray device, wherein the calibration plate includes at least one radiopaque marker and at least one optical marker positioned at predetermined positions within the calibration plate (stage 702).

For example, calibration plate 110, radiopaque marker(s) 112 and optical marker(s) 114 described above with respect to FIG. 1 or calibration plate 200, radiopaque marker(s) 210 or 220 and optical marker(s) 230 described above with respect to FIGS. 2A, 2B and 2C.

Some embodiments may include attaching (or removably attaching) a camera to the treatment tool at a predetermined position and orientation with respect to the treatment tool (stage 704) (e.g., as described above with respect to FIG. 1 and FIGS. 5A-5G). For example, camera 120 described above with respect to FIG. 1 or camera 520 described above with respect to FIGS. 5A-5G.

Some embodiments may include obtaining, by the X-Ray device, an X-Ray image of the calibration plate, wherein the X-Ray image includes a visual representation of the at least one radiopaque marker (stage 706) (e.g., as described above with respect to FIG. 1 and FIG. 3).

Some embodiments, may include determining, by a processing unit, a position and orientation of the calibration plate with respect to the X-Ray device based on the visual representation of the at least one radiopaque marker in the X-Ray image, the predetermined position of the at least one radiopaque marker within the calibration plate and specified parameters of the X-Ray device (stage 708) (e.g., as described above with respect to FIG. 1). For example, processing unit 130 described above with respect to FIG. 1 or processing unit 530 described above with respect to FIGS. 5A-5G.

Some embodiments may include identifying the visual representation of the at least one radiopaque marker in the X-Ray image of the calibration plate (stage 709). For example, by utilizing pattern matching algorithms, as described above with respect to FIG. 1.

Some embodiments may include determining, based on the specified model of the X-Ray device, one or more vectors that extend from an X-Ray source of the X-Ray device towards the X-Ray intensifier and the calibration plate attached thereto and intersect with the calibration plate (stage 710) (e.g., as described above with respect to FIG. 1).

Some embodiments may include determining one or more intersections of the corresponding one or more vectors with the calibration plate (stage 711) (e.g., as described above with respect to FIG. 1).

Some embodiments may include comparing the predetermined/known positions of the at least one radiopaque marker within the calibration plate with the determined intersection(s) of the vector(s) with the calibration plate (stage 712). For example, by utilizing point-cloud matching algorithms (e.g., brute-force algorithm or iterative closest point algorithm) as described above with respect to FIG. 1.

Some embodiments may include determining the position and orientation of the calibration plate with respect to the X-Ray device based on the comparison between the predetermined/known positions of the radiopaque marker(s) within the calibration plate with the determined intersection(s) of the vector(s) with the calibration plate (stage 713). For example, by utilizing aligning algorithms (e.g., such as Singular Value Decomposition (SVD) algorithm) as described above with respect to FIG. 1.

Some embodiments may include obtaining, by the camera, a camera image including a visual representation of the at least one optical marker (stage 714) (e.g., as described above with respect to FIG. 1 and FIG. 4).

Some embodiments may include determining a position and orientation of the camera with respect to the calibration plate based on the visual representation of the at least one optical marker in the camera image and the predetermined position of the at least one optical marker within calibration plate (stage 716) (e.g., as described above with respect to FIG. 1). For example, by utilizing bundle adjustment/PnP algorithms as described above with respect to FIG. 1.

Some embodiments, may include determining a position and orientation of the treatment tool with respect to the X-Ray device based on the determined position and orientation of the calibration plate with respect to the X-Ray device, the determined position and orientation of the camera with respect to the calibration plate and the predetermined position and orientation of the camera with respect to the treatment tool (stage 718) (e.g., as described above with respect to FIG. 1 and FIGS. 5A-5G).

Some embodiments may include displaying, on a display, visual indicator that indicates the determined position and orientation of the treatment tool (stage 720). For example, visual indicator 142 described above with respect to FIG. 1 or visual indicator 542 described above with respect to FIGS. 5A-5G.

Some embodiments may include determining whether the determined position and orientation of the treatment tool with respect to the X-Ray device is within an allowed error range as compared to a required position and orientation of the treatment tool with respect to the X-Ray device (stage 722) (e.g., as described above with respect to FIG. 1 and FIGS. 5A-5G).

Some embodiments may include updating the visual indicator to thereby indicate whether the position and orientation of the treatment tool with respect to the X-Ray device is within the allowed error range thereof or not (stage 724) (e.g., as described above with respect to FIG. 1 and FIGS. 5A-5G).

Some embodiments may include superimposing the visual indicator and an X-Ray image of a target area of a patient to yield a superimposed image, and displaying the superimposed image on the display (stage 725).

Some embodiments may include detecting, or marking, the target area in the X-Ray image thereof and determining whether the treatment tool is aligned with respect to the target area based on the determined position and orientation of treatment tool and the X-Ray image (stage 726).

Some embodiments may include updating the visual indicator to indicate whether the treatment tool is aligned with the target area or not (stage 727).

Some embodiments may include generating and displaying, on the display, treatment tool guiding instructions indicative of one or more directions in which the treatment tool 90 should be moved (e.g., displaced and/or tilted) and/or a measure of movement in each of the direction(s) in order to bring the treatment tool into a position and orientation that is within the allowed error range thereof (stage 728). The treatment tool guiding instructions may be determined based on the determined position and orientation of the treatment tool with respect to the X-Ray device, for example, as described below with respect to FIGS. 14A and 14B. The treatment tool guiding instructions may, for example, enable easy and intuitive aiming and/or aligning of treatment tool 90 with respect to the target area and/or the X-Ray device.

Some embodiments may include aiming and aligning the treatment tool according to the visual indicator displayed on the display, without exposing a patient to X-Ray imaging by the X-Ray device (stage 729) (e.g., as described above with respect to FIG. 1 and FIGS. 5A-5G).

Figure 8:
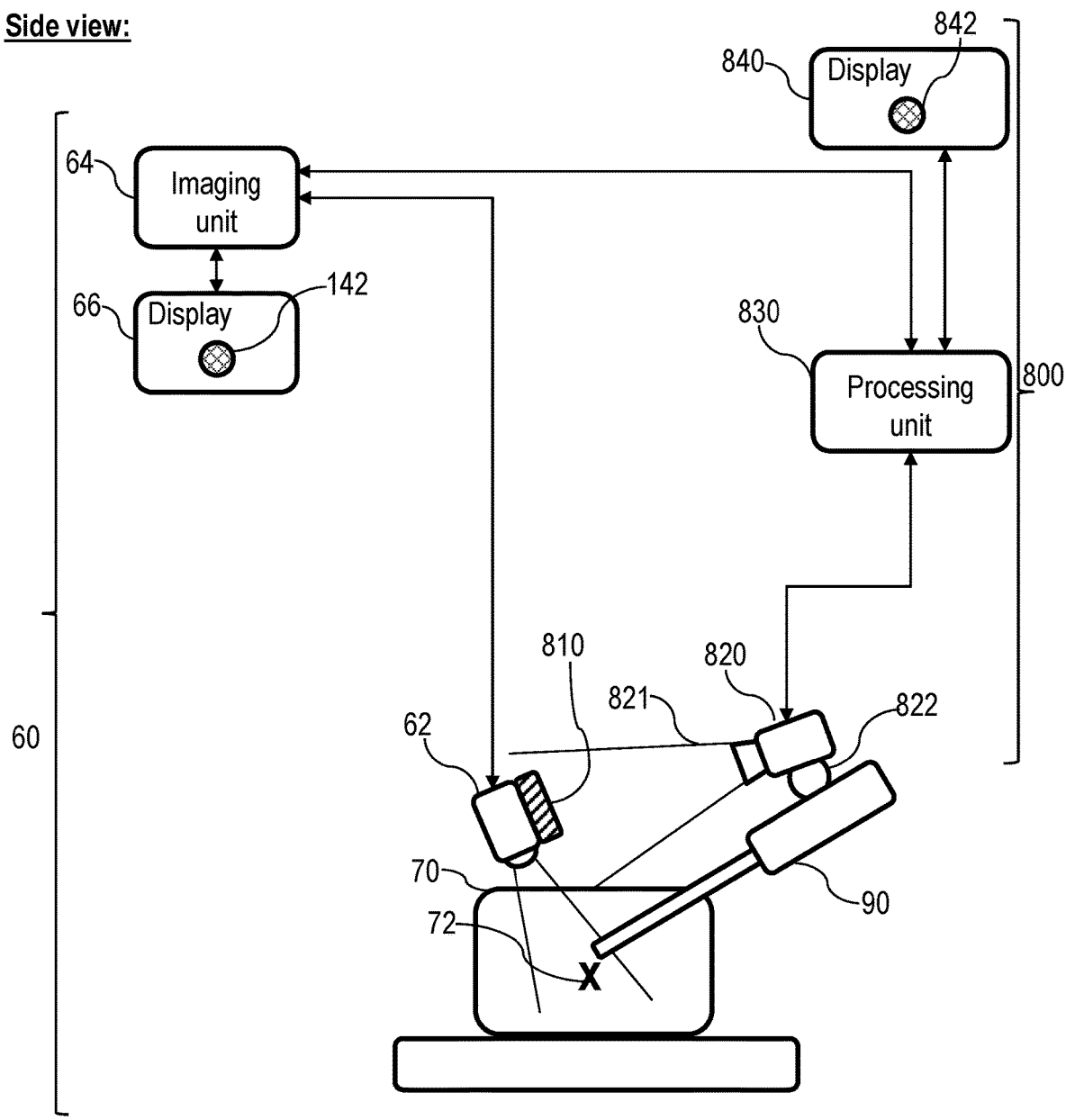
FIG. 8 is a schematic illustration of a first embodiment of a system for aiming and/or aligning a treatment tool in an ultrasound imaging device environment, according to some embodiments of the invention.

Reference is now made to FIG. 8, which is a schematic illustration of a first embodiment of a system 800 for aiming and/or aligning of a treatment tool 90 in an ultrasound imaging device 60 environment, according to some embodiments of the invention.

According to some embodiments, system 800 may include a calibration plate 810, a camera 820 and a processing unit 830. FIG. 8 shows a side view of system 800. System 800 may enable aiming of a treatment tool 90 at a target area 72 within a patient 70 and/or aligning of treatment tool 90 with respect to an ultrasound imaging probe 62.

Ultrasound imaging device 60 may be any type of ultrasound imaging device, for example a handheld device, a laptop device, a probe that is connected to a cell phone or tablet, or a system on a portable cart and may include one or more probes and other accessories.

Treatment tool 90 may be, for example, an invasive treatment tool (such as a needle (e.g., biopsy needle, radiofrequency needle) and/or a probe) or a non-invasive treatment tool (such as an ultrasound transducer or a focused ultrasound transducer) that needs to be aimed with respect to target area 72 and/or aligned with respect to ultrasound imaging probe 62. For example, FIG. 8 shows a needle as an example for treatment tool 90.

According to some embodiments, calibration plate 810 may include at least one optical marker. Optical marker(s) may be positioned within calibration plate 810 at predetermined and/or known positions. Calibration plate 810 may be attachable, or removably attachable, to ultrasound imaging probe 62 of ultrasound imaging device 60. Various embodiments of calibration plate 810 are described below with respect to FIGS. 9A and 9B.

According to some embodiments, camera 820 is attachable, or removably attachable, to treatment tool 90. Camera 820 may be attachable to treatment tool 90 at a predetermined and/or known position and orientation with respect to treatment tool 90.

Camera 820 may be attachable to treatment tool 90 such that at least a portion of calibration plate 810 will be within a field of view 821 of camera 820.

In some embodiments, system 800 may include a camera connector 822. Camera connector 822 may be configured to tightly and stably attach camera 820 to treatment tool 90 and to prevent unintended relative movements of camera 820 with respect to treatment tool 90.

In some embodiments, camera connector 822 may enable a controlled rotation of camera 820. This may, for example, enable to follow calibration plate 810, for example when treatment tool 90 is moved.

In some embodiments, system 800 may include a second camera. The second camera may be tightly and stably attachable (e.g., using a connector like connector 822) to treatment tool 90 at a predetermined angle with respect to camera 820. For example, the second camera may be attached to treatment tool 90 at an angle of 90° with respect to camera 820. This may, for example, capture calibration plate 810 by the second camera if calibration plate 810 exits field-of-view 821 of camera 820, for example due to movement of treatment tool 90.

According to some embodiments, processing unit 830 may be in communication (e.g., wired or wireless) with camera 820 and with an ultrasound imaging unit 64 of ultrasound imaging device 60.

According to some embodiments, processing unit 830 may be configured to receive, from camera 820, one or more camera images of calibration plate 810. Camera image(s) of calibration plate 810 may include a visual representation of optical marker(s) (e.g., as shown in and described below with respect to FIGS. 9A and 9B).

According to some embodiments, processing unit 830 may be configured to determine a position and orientation of camera 820 with respect to calibration plate 810 (that may be attached to, for example, ultrasound imaging probe 62) based on the visual representation of optical marker(s) in the camera image(s), based on the known positions of optical marker(s) within calibration plate 810 and based on parameters of camera 820 (e.g., such as distortion, field of view 821, etc.). The determination thereof may be utilized using, for example, bundle adjustment/PnP algorithms.

According to some embodiments, processing unit 830 may be configured to determine a position and orientation of treatment tool 90 with respect to ultrasound imaging probe 62 based on a predetermined position and orientation of calibration plate 810 with respect to ultrasound imaging probe 62, the determined position and orientation of camera 820 with respect to calibration plate 810 and the known position and orientation of camera 820 with respect to the treatment tool 90.

According to some embodiments, system 800 may include a display 840. Processing unit 830 may be configured to present, for example on display 840 and/or on ultrasound display 66, at least one visual indicator 842 that indicates the determined position and orientation of treatment tool 90.

In some embodiments, processing unit 830 may be configured to determine whether the determined position and orientation of treatment tool 90 with respect to ultrasound imaging probe 62 is within an allowed error range as compared to a required position and orientation of treatment tool 90 with respect to the ultrasound imaging probe 62. Processing unit 830 may be configured to modify visual indicator 842 to thereby indicate whether the position and orientation of treatment tool 90 with respect to ultrasound imaging probe 62 is within the allowed error range thereof or not.

In various embodiments, processing unit 830 may be configured to superimpose visual indicator 842 on, for example, an ultrasound image of target area 72 of patient 70 to yield a superimposed image, and to display the superimposed image on display 840 and/or on ultrasound display 66.

In some embodiments, processing unit 830 may be configured to detect, or mark, target area 72 in the ultrasound image thereof. In some embodiments, the marking may be made based on user's input. Processing unit 830 may be configured to determine whether treatment tool 90 is aligned with respect to target area 72 based on the determined position and orientation of treatment tool 90 and the ultrasound image. In some embodiments, processing unit 830 may be configured to update visual indicator 142 to thereby indicate whether treatment tool 90 is aligned with target area 72 or not.

In some embodiments, processing unit 830 may generate treatment tool guiding instructions based on the determined position and orientation of treatment tool 90 with respect to ultrasound imaging probe 62 and display the treatment tool guiding instructions on display 86/840 (e.g., as described below with respect to FIGS. 14A and 14B). The treatment tool guiding instructions may be indicative of one or more directions in which treatment tool 90 should be moved (e.g., displaced and/or tilted) and/or a measure of movement in each of the direction(s) in order to bring treatment tool 90 into a position and orientation that is within the allowed error range thereof and/or that is aligned with respect to target area 72. The treatment tool guiding instructions may, for example, enable easy and intuitive aiming and/or aligning of treatment tool 90 with respect to target area 72 and/or ultrasound imaging probe 62.

System 800 may enable the user (e.g., treating physician) to aim treatment tool 90 at target area 72 and/or to align (e.g., translate, tilt, pitch, yaw, roll, etc.) treatment tool 90 with respect to ultrasound imaging probe 62 using visual indicator 842 displayed on display 840 and/or on ultrasound display 66. Visual indicator 842 may indicate the position and orientation of treatment tool 90 with respect to ultrasound imaging probe 62, which eliminates (or substantially eliminates) a need for ultrasound imaging of the tip of the treatment tool. When using system 800, ultrasound imaging of the treatment tool tip (where applicable), may be required only at final stages of aiming and/or aligning of treatment tool 90 in order to verify, prior to application of the treatment, that the actual position and orientation of treatment tool 90 with respect to patient anatomy is correct. In this manner, system 800 may enable significantly reducing the procedure time as compared to current treatment procedures.

Figure 9A:
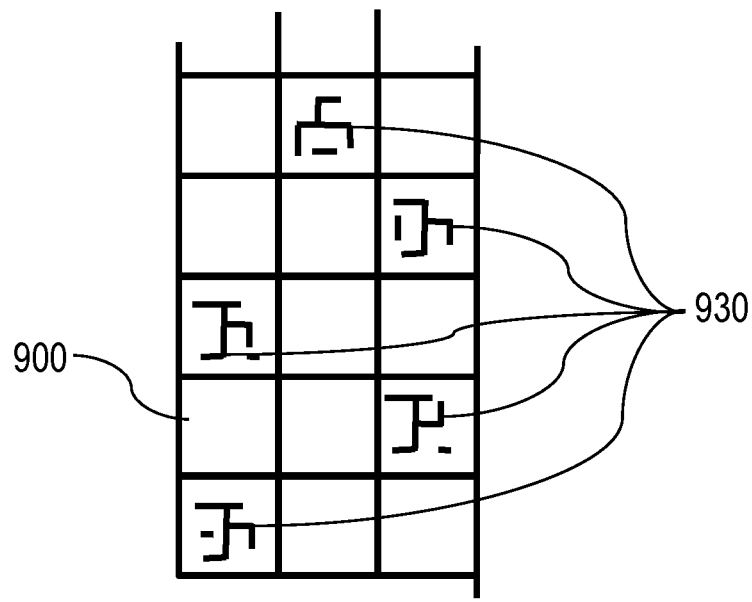
FIGS. 9A and 9B are schematic illustrations of a calibration plate for a system for aiming and/or aligning a treatment tool in an ultrasound imaging device environment, according to some embodiments of the invention.
Figure 9B:
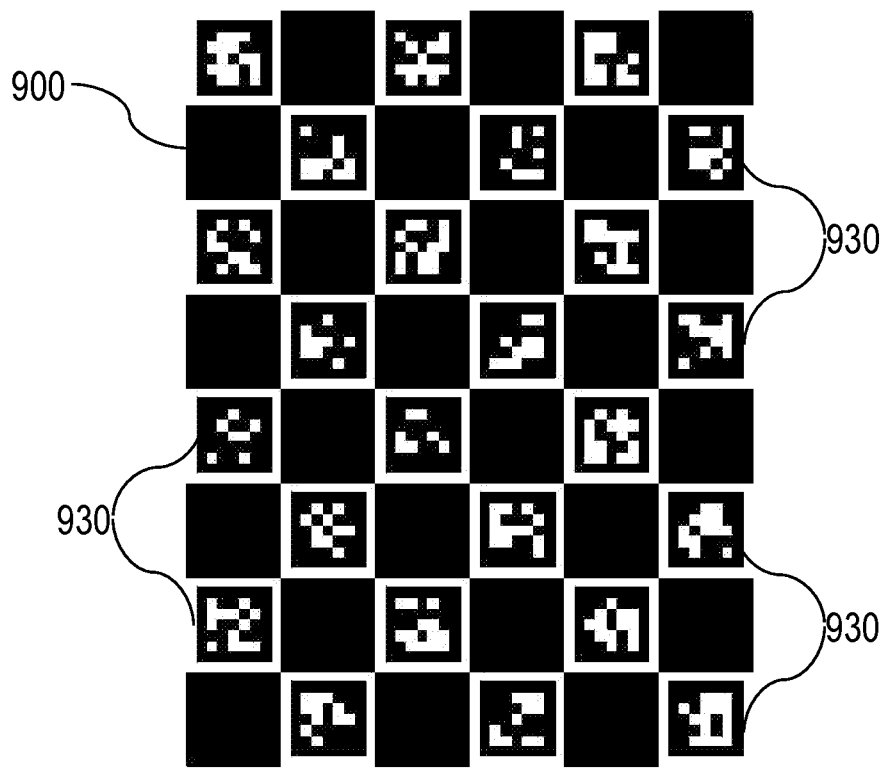

Reference is made to FIGS. 9A and 9B, which are schematic illustrations of a calibration plate 900 for a system for aiming and/or aligning of a treatment tool 90 in an ultrasound imaging device environment (such as system 800), according to some embodiments of the invention.

According to some embodiments, calibration plate 900 includes multiple optical markers 930 positioned at predetermined positions within calibration plate 900 (e.g., as shown in FIGS. 9A and 9B).

In some embodiments, each of optical marker(s) 930 may include its unique visual label. The visual labels of optical marker(s) 930 may, for example, include barcodes, QR codes, graphical patterns or shapes, Aruco, apriltag, ARtag and the like, that may bear additional data associated with the visual label. The visual labels may, for example, encode the position of optical marker(s) 930 within calibration plate 900.

Parameters of optical marker(s) 930, such as for example, the amount of optical marker(s) 930, the dimensions of optical marker(s) 930 and/or the visual labels of optical marker(s) 930 may be determined based on, for example, a resolution of the camera (e.g., camera 820 as described above with respect to FIG. 8). The parameters of optical marker(s) 930 may be further determined to enable determination/identification of the position and orientation of the camera (e.g., camera 820 as described above with respect to FIG. 8) with respect to calibration plate 900 based on the visual representation of optical marker(s) 930 in the camera image of calibration plate 900 (e.g., as described above with respect to FIG. 8).

In some embodiments, calibration plate 900 may have matte surface. The matte surface of calibration plate 900 may, for example, reduce light reflection from light sources in the operating room and eliminate (or substantially eliminate) a glare in the camera image due to the light reflection thereof and thereby and avoid a loss of information that may be obtained from optical markers 930.

Figure 10:
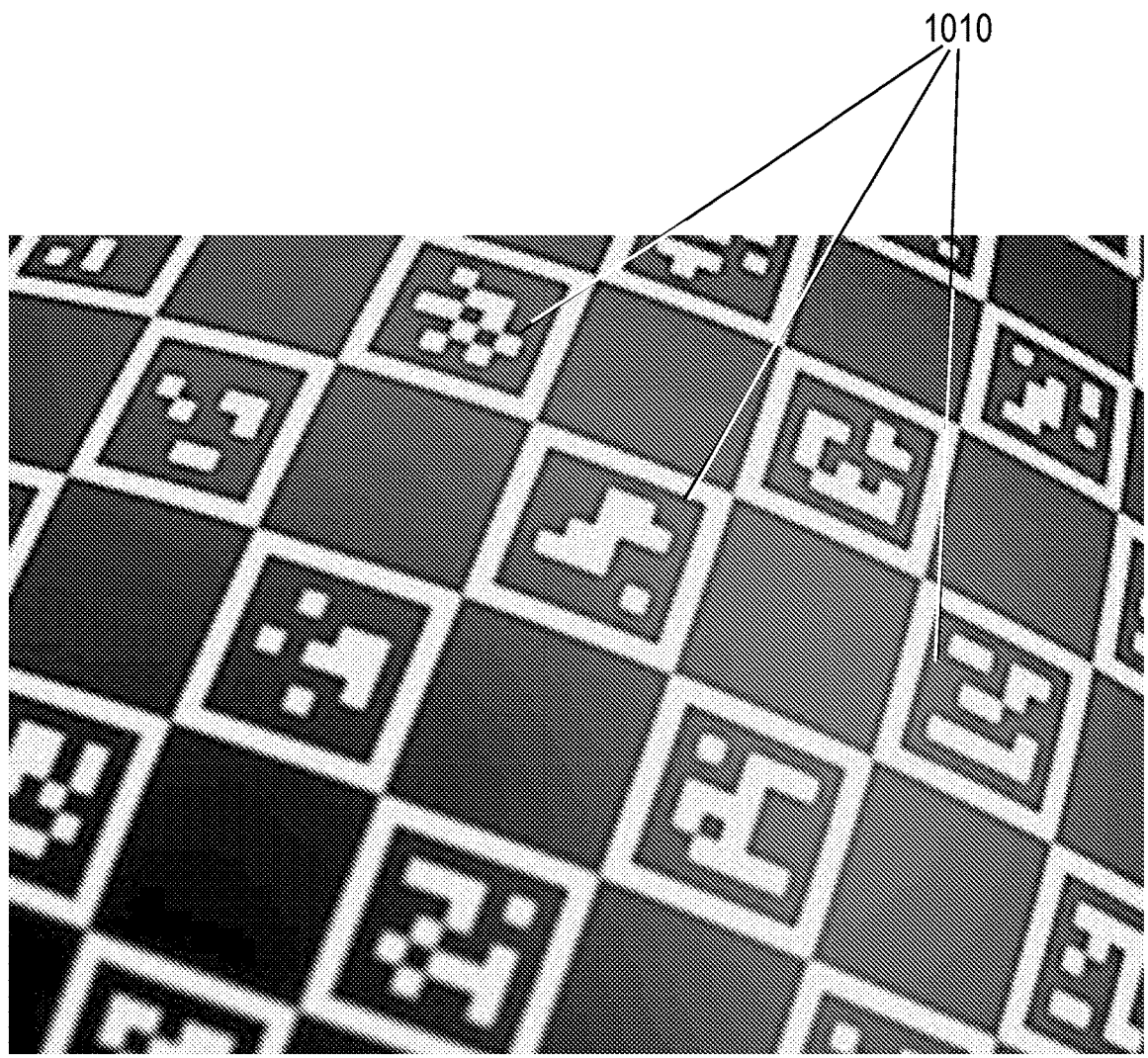
FIG. 10 is a camera image of a calibration plate for a system for aiming and/or aligning a treatment tool in an ultrasound imaging device environment, according to some embodiments of the invention.

Reference is now made to FIG. 10, which is a camera image 1000 of a calibration plate (such as calibration plates 810 or 900) for a system for aiming/aligning of a treatment tool 90 in an ultrasound imaging device environment (such as system 800), according to some embodiments of the invention.

FIG. 10 depicts, for example, a camera image 1000 of a calibration plate (e.g., calibration plate 900 depicted in FIG. 9B). Camera image 1000 may be obtained using a camera (e.g., camera 820 as described above with respect to FIG. 8) attached to treatment tool 90 during, for example, a treatment procedure. Camera image 1000 may include a visual representation 1010 of optical markers positioned at predetermined positions thereof within the optical tracer plate (e.g., optical markers 930 depicted in FIG. 9B).

Figure 11:
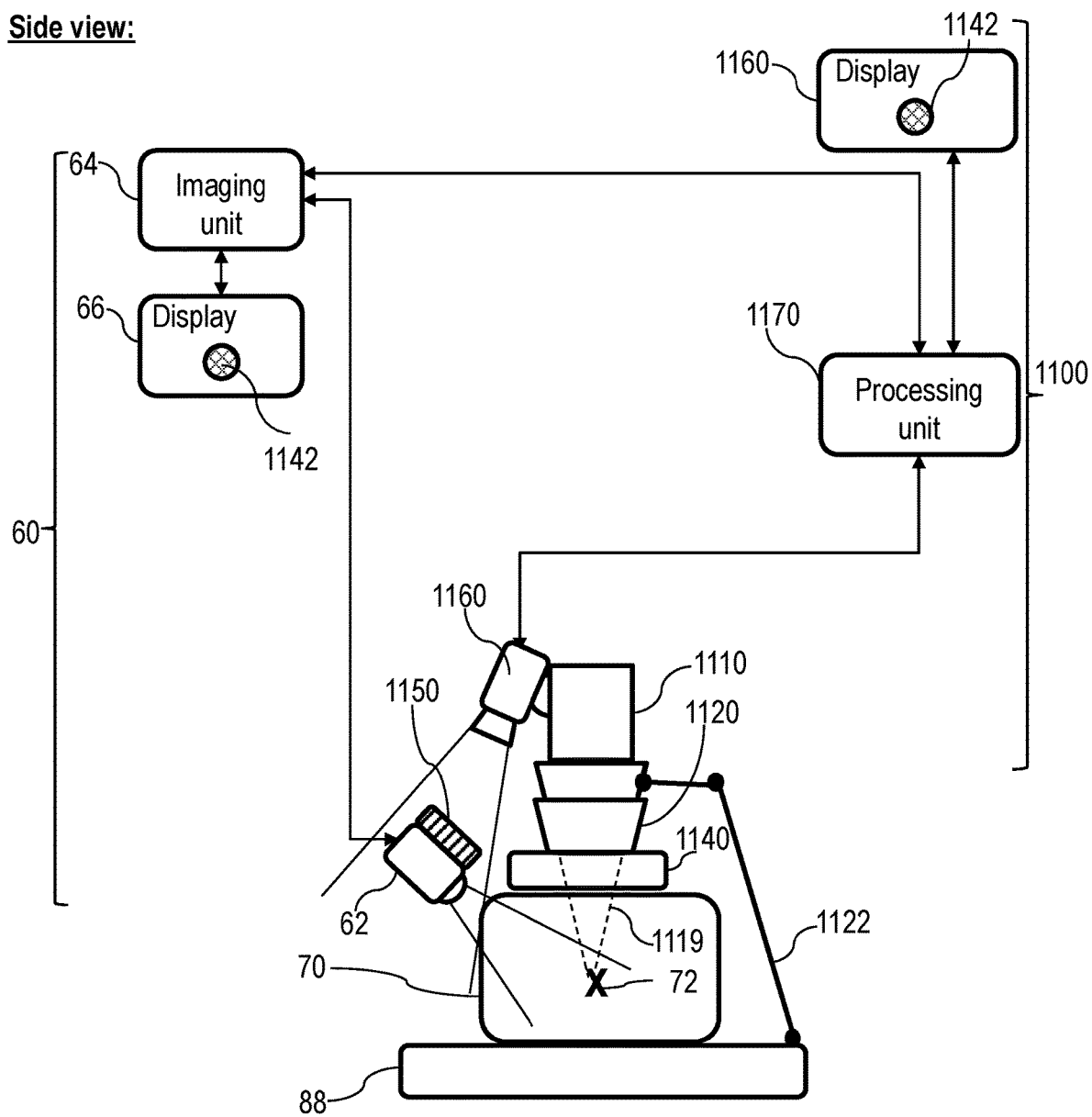
FIG. 11 is a schematic illustration of a second embodiment of a system for projecting a focused ultrasound energy, according to some embodiments of the invention.

Reference is now made to FIG. 11, which is a schematic illustration of a second embodiment of a system 1100 for projecting a focused ultrasound energy, according to some embodiments of the invention.

According to some embodiments, system 1100 may include a focused ultrasound (FUS) transducer 1110 arranged to generate a FUS energy 1119.

According to some embodiments, system 1100 may include an ultrasound imaging probe 62.

According to some embodiments, system 1100 may include a support 1120 adapted to accommodate FUS transducer 1110. In some embodiments, support 1120 may be hand-held. In some embodiments, system 1100 may include an articulated arm 1122 coupled to a table 88 at its first end to support 1120 at its second end. Articulated arm 1122 may be arranged to enable translation, tilting, pitching, yawing and/or rolling of support 1120 and FUS transducer 1110 accommodated therein.

According to some embodiments, system 1100 may include an acoustic coupler 1140 arranged to acoustically couple FUS transducer 1110 to patient 70 to thereby enable delivery of FUS energy 1119 to target area 72 within patient 70.

According to some embodiments, system 1100 may include a calibration plate 1150 removably attachable to ultrasound imaging probe 62 (e.g., calibration plate 810 described above with respect to FIG. 8 or calibration plate 900 described above with respect to FIGS. 9A-9B).

According to some embodiments, system 1100 may include a camera 1160 removably attachable to support 1120 or FUS transducer 1110 (e.g., camera 820 described above with respect to FIG. 8).

According to some embodiments, system 1100 may include a processing unit 1170 (e.g., processing unit 830 described above with respect to FIG. 8). Processing unit 1170 may be configured to determine the position and orientation of FUS transducer 1110 with respect to ultrasound imaging probe 62.

According to some embodiments, system 1100 may include a display 1180. Processing unit 1170 may be configured to display, on display 1180 and/or on ultrasound display 66, a visual indicator 1142 indicating the determined position and orientation of FUS transducer 1110.

In some embodiments, processing unit 1170 may be configured to determine whether the determined position and orientation of treatment tool 90 with respect to ultrasound imaging probe 62 is within an allowed error range as compared to a required position and orientation of treatment tool 90 with respect to the ultrasound imaging probe 62. Processing unit 1170 may be configured to modify visual indicator 842 to thereby indicate whether the position and orientation of treatment tool 90 with respect to ultrasound imaging probe 62 is within the allowed error range thereof or not.

In various embodiments, processing unit 1170 may be configured to superimpose visual indicator 1142 on, for example, an ultrasound image of target area 72 of patient 70 to yield a superimposed image, and to display the superimposed image on display 1180 and/or on ultrasound display 66.

In some embodiments, processing unit 1170 may be configured to detect, or mark, target area 72 in the ultrasound image thereof. Processing unit 1170 may be configured to determine whether treatment tool 90 is aligned with respect to target area 72 based on the determined position and orientation of treatment tool 90 and the ultrasound image. In some embodiments, processing unit 1170 may be configured to update visual indicator 1142 to thereby indicate whether treatment tool 90 is aligned with target area 72 or not.

In some embodiments, processing unit 1170 may generate treatment tool guiding instructions and display the treatment tool guiding instructions on display 86/1180 (e.g., as described below with respect to FIGS. 14A and 14B). The treatment tool guiding instructions may be determined based on whether the position and orientation of treatment tool 90 with respect to ultrasound imaging probe 62 (e.g., as described below with respect to FIGS. 14A and 14B). The treatment tool guiding instructions may, for example, enable easy and intuitive aiming and/or aligning of treatment tool 90 with respect to target area 72 and/or ultrasound imaging probe 62.

System 1100 may enable the user (e.g., treating physician) to aim FUS transducer 1110 at target area 72 within patient 70 and/or to align FUS transducer 1110 with respect to ultrasound imaging probe 62 using visual indicator 1142 displayed on display 1180 and/or on ultrasound display 66. Visual indicator 1142 may indicate the determined position and orientation of FUS transducer 1110 with respect to ultrasound imaging probe 62. In this manner, system 1100 may enable significantly reducing the overall time duration of the treatment procedure as compared to current treatment procedures that do not utilize system 1100.

Figure 12:
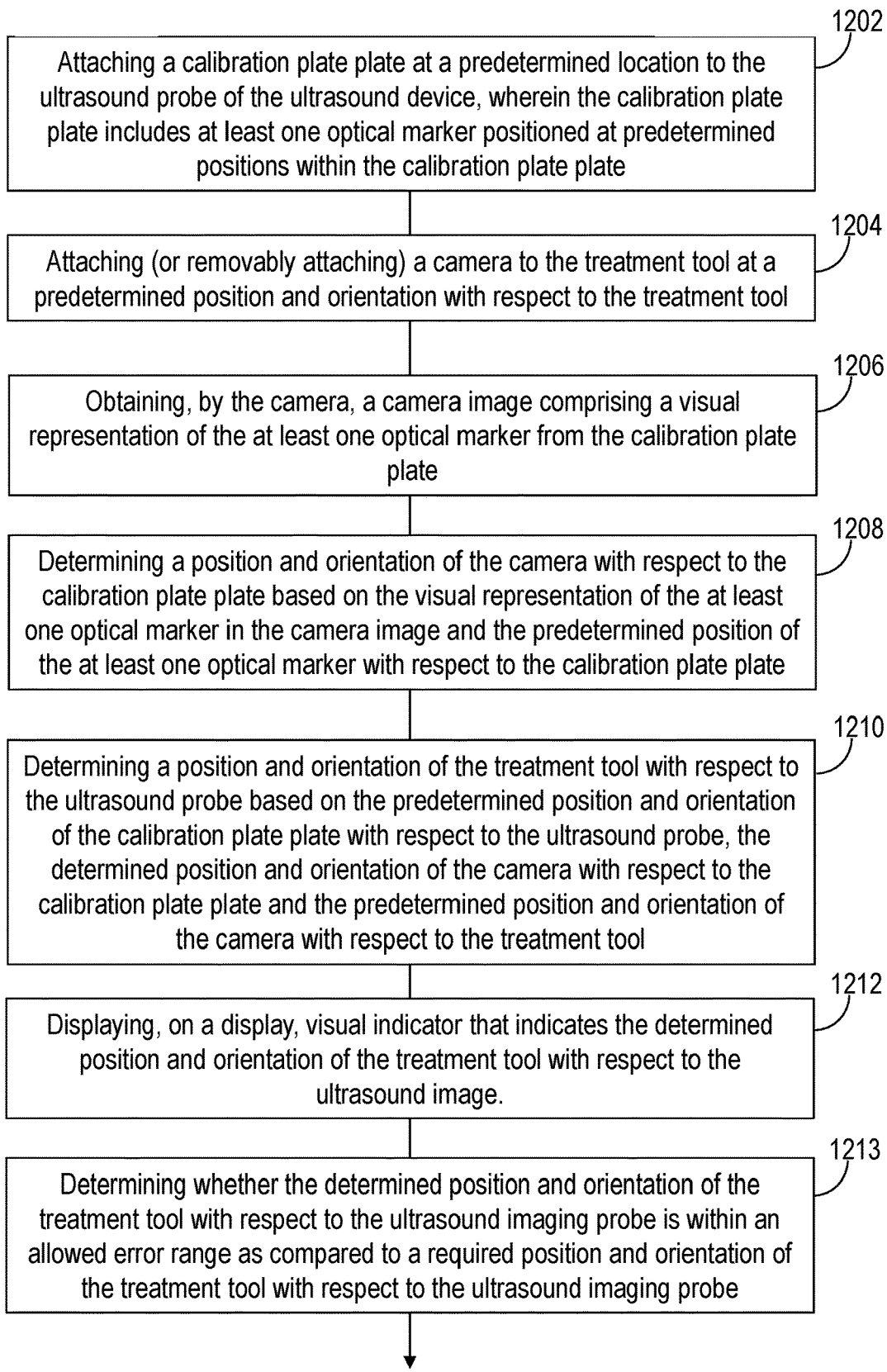
FIG. 12 is a flowchart of a first method of aiming and/or aligning a treatment tool in an ultrasound imaging device environment, according to some embodiments of the invention.
Figure 12:
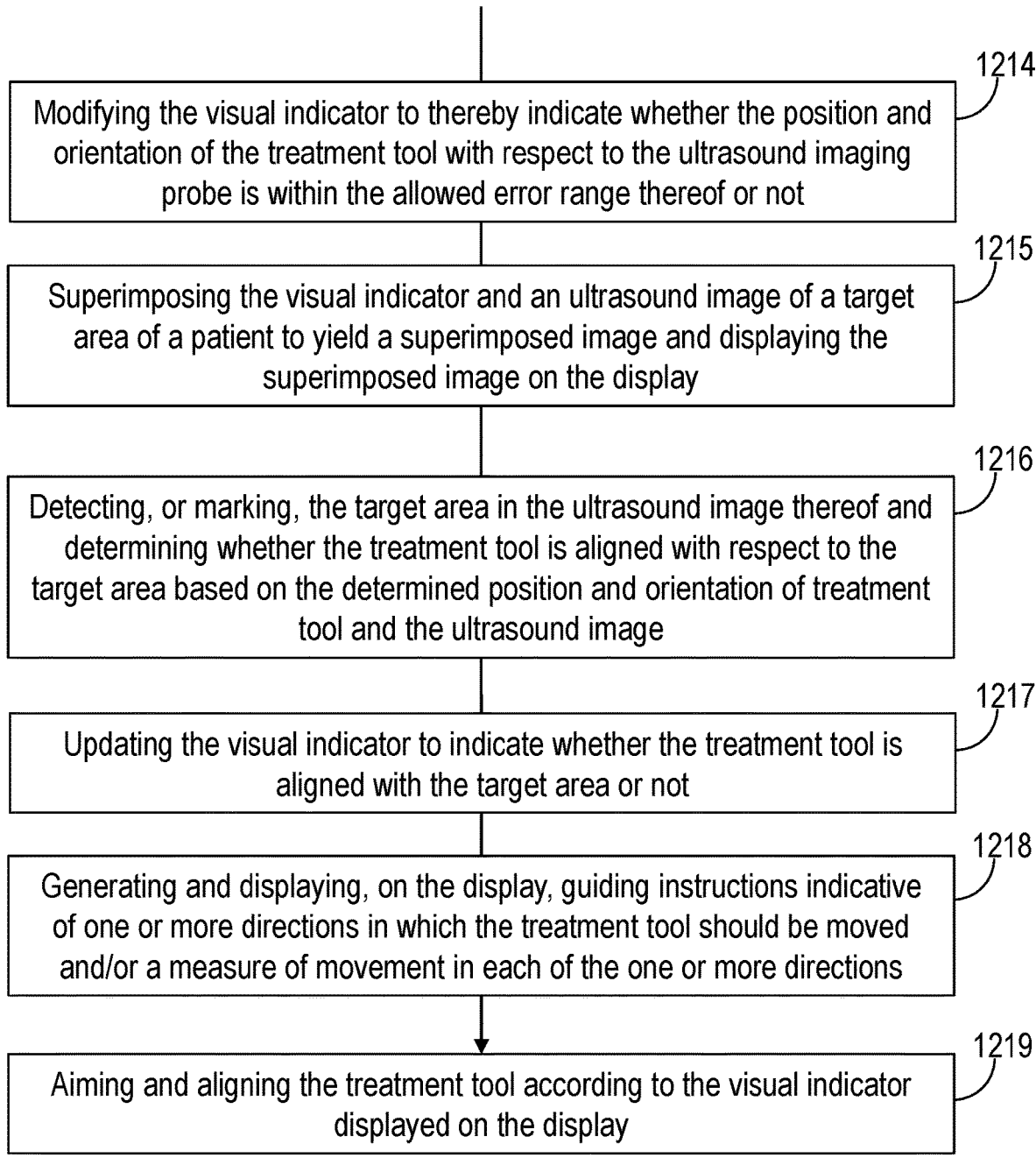

Reference is now made to FIG. 12, which is a flowchart of a first method of aiming and/or aligning a treatment tool in an ultrasound imaging device environment, according to some embodiments of the invention.

The method may be implemented by a system for aiming/aligning a treatment tool in an ultrasound imaging device environment (such as system 800 described above with respect to FIG. 8 or system 1100 described above with respect to FIG. 11), which may be configured to implement the method. It is noted that the method is not limited to the flowcharts illustrated in FIG. 12 and to the corresponding description. For example, in various embodiments, the method needs not move through each illustrated box or stage, or in exactly the same order as illustrated and described.

According to some embodiments, the method includes attaching (or removably attaching) a calibration plate to an ultrasound imaging probe of the ultrasound imaging device, wherein the calibration plate includes at least one optical marker positioned at predetermined positions within the calibration plate (stage 1202).

For example, calibration plate 810 described above with respect to FIG. 8 or calibration plate 900 and optical marker(s) 930 described above with respect to FIGS. 9A and 9B.

Some embodiments may include attaching (or removably attaching) a camera to the treatment tool at a predetermined position and orientation with respect to the treatment tool (stage 1204) (e.g., as described above with respect to FIG. 8). For example, camera 820 described above with respect to FIG. 8.

Some embodiments may include obtaining, by the camera, a camera image including a visual representation of the at least one optical marker (stage 1206) (e.g., as described above with respect to FIG. 8 and FIG. 11).

Some embodiments may include determining a position and orientation of the camera with respect to the calibration plate based on the visual representation of the at least one optical marker in the camera image and the predetermined position of the at least one optical marker within calibration plate (stage 1208) (e.g., as described above with respect to FIG. 8). For example, by utilizing bundle adjustment/PnP algorithms as described above with respect to FIG. 8.

Some embodiments, may include determining a position and orientation of the treatment tool with respect to the ultrasound imaging probe based on the predetermined position and orientation of the calibration plate with respect to the ultrasound imaging probe, the determined position and orientation of the camera with respect to the calibration plate and the predetermined position and orientation of the camera with respect to the treatment tool (stage 1210) (e.g., as described above with respect to FIG. 8).

Some embodiments may include displaying, on a display, a visual indicator that indicates the determined position and orientation of the treatment tool with respect to the ultrasound imaging probe (stage 1212). For example, visual indicator 842 described above with respect to FIG. 8.

Some embodiments may include determining whether the determined position and orientation of the treatment tool with respect to the ultrasound imaging probe is within an allowed error range as compared to a required position and orientation of the treatment tool with respect to the ultrasound imaging probe (stage 1213). This may, for example, allow fast and accurate targeting of the treatment tool to the target area.

Some embodiments may include modifying the visual indicator to thereby indicate whether the position and orientation of the treatment tool with respect to the ultrasound imaging probe is within the allowed error range thereof or not (stage 1214).

Some embodiments may include superimposing the visual indicator and an ultrasound image of a target area of a patient to yield a superimposed image and displaying the superimposed image on the display (stage 1215).

Some embodiments may include detecting, or marking, the target area in the ultrasound image thereof and determining whether the treatment tool is aligned with respect to the target area based on the determined position and orientation of treatment tool and the ultrasound image (stage 1216).

Some embodiments may include updating the visual indicator to indicate whether the treatment tool is aligned with the target area or not (stage 1217).

Some embodiments may include generating and displaying, on the display, treatment tool guiding instructions indicative of one or more directions in which the treatment tool should be moved (e.g., displaced and/or tilted) and/or a measure of movement in each of the direction(s) in order to bring the treatment tool into a position and orientation that is within an allowed error range (stage 1218). For example, as described below with respect to FIGS. 14A and 14B. This may, for example, thereof allow a fast and accurate targeting of treatment tool to the target area.

Some embodiments may include aiming and/or aligning the treatment tool according to the a least one visual indicator displayed on the display (stage 1219).

Figure 13:
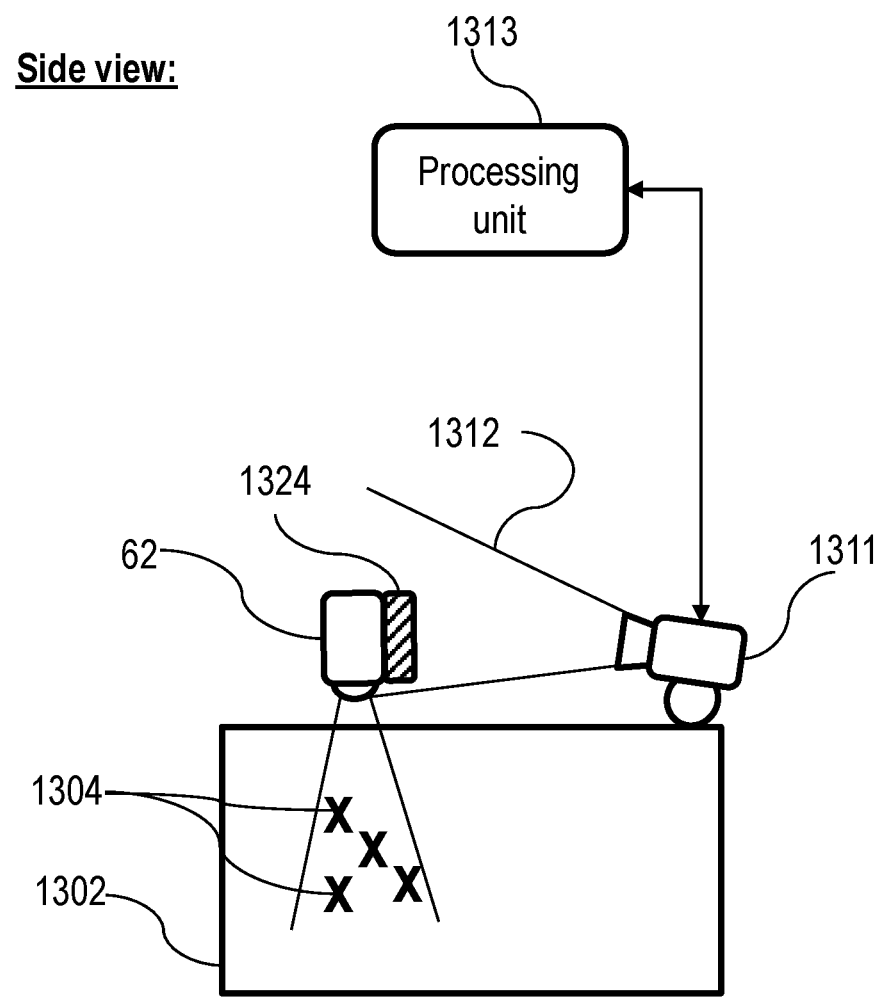
FIG. 13 is a schematic illustration of a calibration setup for a system for aiming and/or aligning a treatment tool in an ultrasound imaging device environment, according to some embodiments of the invention.

Reference is now made to FIG. 13, which is a schematic illustration of a calibration setup 1300 for a system for aiming and/or aligning a treatment tool using ultrasound imaging device (such as system 800 and 1100 described hereinabove), according to some embodiments of the invention.

Calibration setup 1300 may be used for calibrating a system for aiming and/or aligning a treatment tool in an ultrasound imaging device environment (such as system 800 and 1100 described hereinabove). For example, calibration setup 1300 may be used for determining a position and orientation of a calibration plate 1324 (e.g., such as calibration plate 810, 900, 1000 or 1150 described hereinabove) with respect to ultrasound imaging probe 62 (e.g., after calibration plate 1324 is attached to ultrasound imaging probe 62). The calibration may be performed only once, for example at a factory, if calibration plate 1324 is permanently attached to ultrasound probe 62 or the calibration may be repeated each time calibration plate 1324 is removably attached to ultrasound probe 62.

Calibration setup 1300 may include one or more imaging targets 1304, embedded in an acoustically transparent medium 1302 (e.g., ultrasonic gel, water). In some embodiments, the position(s) of imaging target(s) 1304 may be known. Ultrasound imaging probe 62 may be disposed at a known imaging probe position and orientation with respect to imaging target(s) 1304. Calibration plate 1324 may be attached, or removably attached, to ultrasound imaging probe 62. A camera 1311 (e.g., such as camera 820 or 1160 described hereinabove) may be disposed at a known camera position and orientation with respect to imaging target(s) 1304 such that calibration plate 1324 will be at least partly in a field of view 1312 thereof.

Ultrasound imaging probe 62 may obtain at least one ultrasound image of imaging target(s) 1304. Camera 1311 may obtain at least one camera image calibration plate 1324 attached to ultrasound imaging probe 62. A processing unit (e.g., such as processing unit 830, 1170 described herein-above) may receive the ultrasound image(s) of imaging target(s) 1304, the camera image(s) 1324 of calibration plate 1324. The processing unit may determine calibration data at least based on the ultrasound image(s), the camera image(s). For example, the calibration data may include the position and orientation of calibration plate 1324 with respect to ultrasound imaging probe 62. The processing unit may determine the position and orientation of calibration plate 1324 with respect to ultrasound imaging probe 62 based on the ultrasound image(s), the camera image(s), the known position of imaging target(s) 1304, the known imaging probe position and orientation and the known camera position and orientation.

The calibration data may be stored and used for further processing. For example, the calibration data may be loaded into processing unit 830 or processing unit 1170 described hereinabove and used by processing unit 830, 1170 for determining the position and orientation of treatment tool 90 with respect to ultrasound imaging probe 62 (e.g., as described above with respect to FIG. 8).

Figure 14A:
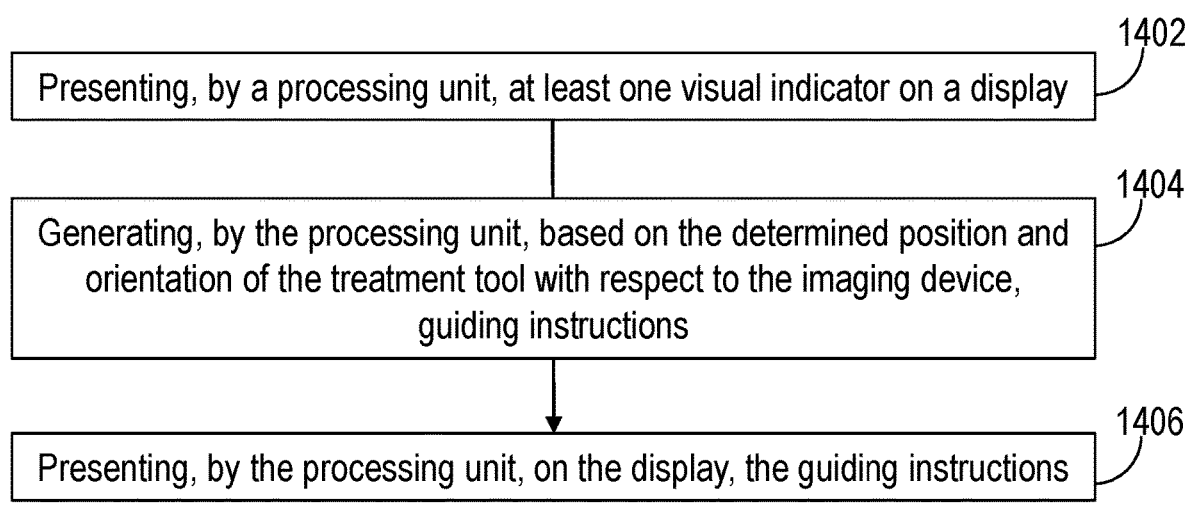
FIG. 14A is a flowchart of a method of guiding an aiming and/or aligning of a treatment tool in an imaging device environment, according to some embodiments of the invention.

Reference is now made to FIG. 14A, which is a flowchart of a method of guiding an aiming and/or aligning of a treatment tool in an imaging device environment, according to some embodiments of the invention.

The method may be performed by, for example, a processing unit of a system for aiming and/or aligning of a treatment tool in an imaging device environment, such as systems 100, 500, 600, 500 and 1100 described above with respect to FIGS. 1, 5A-5D, 6, 8 and 11, respectively.

Figure 14B:
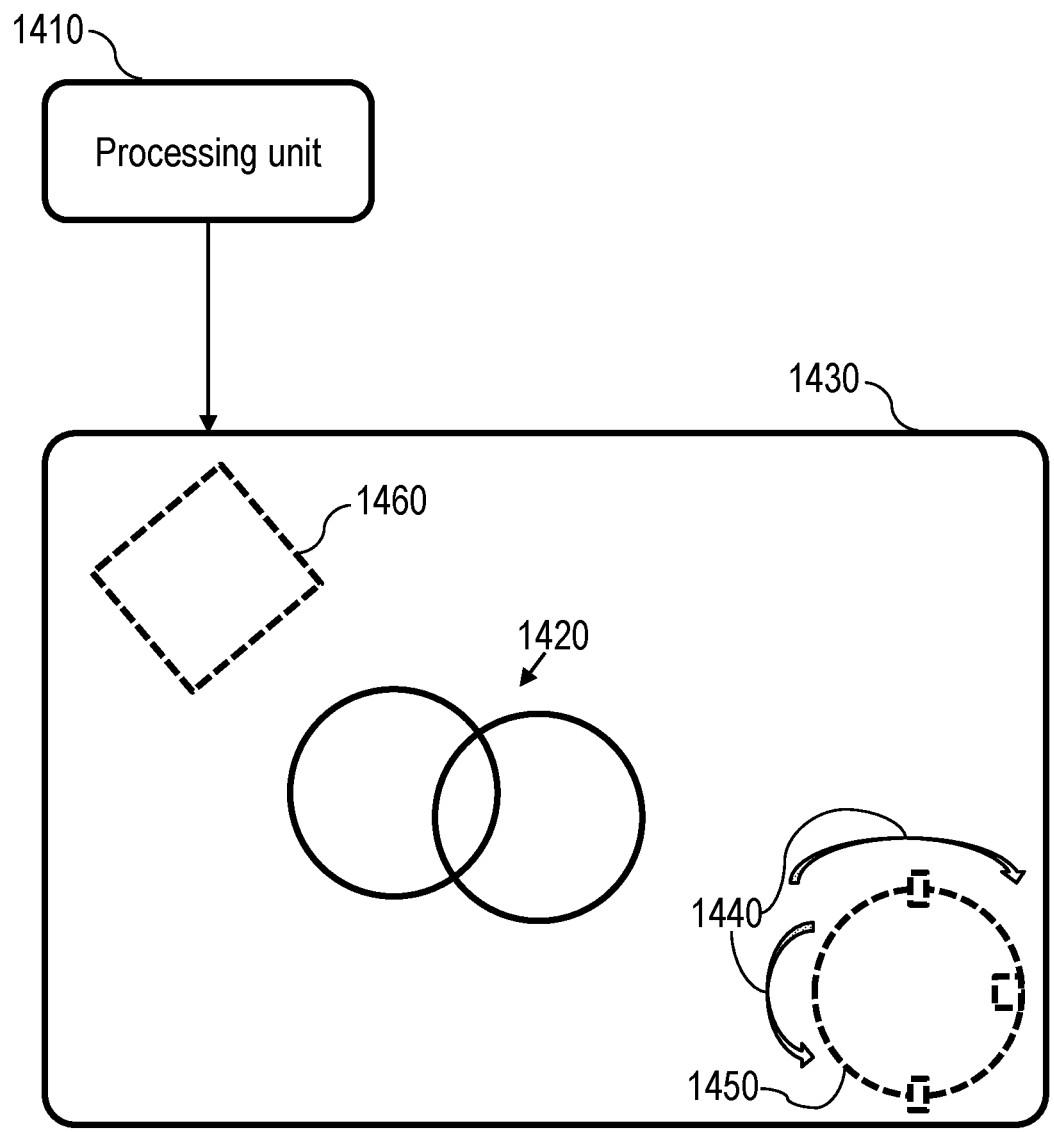
FIG. 14B is a schematic illustration of guiding features for guiding an aiming and/or aligning of a treatment tool in an imaging device environment, according to some embodiments of the invention.

Reference is also made to FIG. 14B, which is a schematic illustration of guiding features for guiding an aiming and/or aligning of a treatment tool in an imaging device environment, according to some embodiments of the invention, according to some embodiments of the invention.

According to some embodiments, the method may include presenting, by a processing unit 1410, at least one visual indicator 1420 on a display 1430 (stage 1402).

In various embodiments, visual indicator(s) 1420 may indicate the actual position and orientation of the treatment tool with respect to the imaging device (e.g., such as visual representation 85 of X-Ray aiming and aligning tool 92 described above with respect to FIGS. 5D-5F) and/or the determined position and orientation of the treatment tool with respect to the imaging device (e.g., such as visual indicator(s) 142, 542, 682, 842, 1142, described above with respect to FIGS. 1, 5A-5D, 6, 8 and 11, respectively. Visual indicator(s) 1420 may be also indicate whether the position and orientation of the treatment tool with respect to imaging device is within the allowed error range thereof or not. This may, for example, allow fast and accurate targeting of treatment tool to the target area. In some embodiments, visual indicator(s) 1420 may be superimposed on the image obtained or being obtained by the imaging device (e.g., as described above with respect to FIG. 1, 5A-5D, 8).

According to some embodiments, the method may include generating, by processing unit 1410, based on the determined position and orientation of the treatment tool with respect to the imaging device, treatment tool guiding instructions 1440 (stage 1404).

According to some embodiments, the method may include presenting, by processing unit 1410, on display 1430, treatment tool guiding instructions 1440 (stage 1406). Treatment tool guiding instructions 1440 may, for example, enable easy and intuitive aiming and/or aligning of the treatment tool with respect to the target area and/or imaging device.

Treatment tool guiding instructions 1440 may be displayed in, for example, a specified area 1432 on display 1430. Specified area 1432 may be selected by, for example, processing unit 1410 so as not to obstruct any important information displayed on display 1430.

In various embodiments, treatment tool guiding instructions 1440 may include treatment tool movement data indicative of one or more directions in which the treatment tool should be moved (e.g., displaced and/or tilted) and/or a measure of movement in each of the direction(s) in order to bring the treatment tool into a position and orientation that is within the allowed error range thereof. For example, each of the directions may be presented using an arrow, wherein the length of the arrow may be indicative of a required magnitude of movement in the respective direction. However, other symbols may be used as well. Treatment tool guiding instructions 1440 may, for example, allow a fast and accurate targeting of treatment tool to the target area.

According to some embodiments, the method may include presenting, by processing unit 1410, on display 1430, treatment tool visual data 1450. Treatment tool visual data 1450 may, for example, include a visual representation of at least a portion of the treatment tool 1452. For example, visual representation of the treatment tool 1452 may be displayed in a vicinity of treatment tool guiding instructions 1440.

According to some embodiments, the method may include presenting, by processing unit 1410, on display 1430, system components visual data 1460. System components visual data 1460 may, for example, include a visual representation of one or more components of the system (e.g., a camera) and may indicate an actual position orientation of the respective component(s) with respect to, for example, the treatment tool.

Treatment tool visual data 1450 and system components visual data 1460 may, for example, enhance understanding of treatment tool guiding instructions 1440 by the user.

Figure 15A:
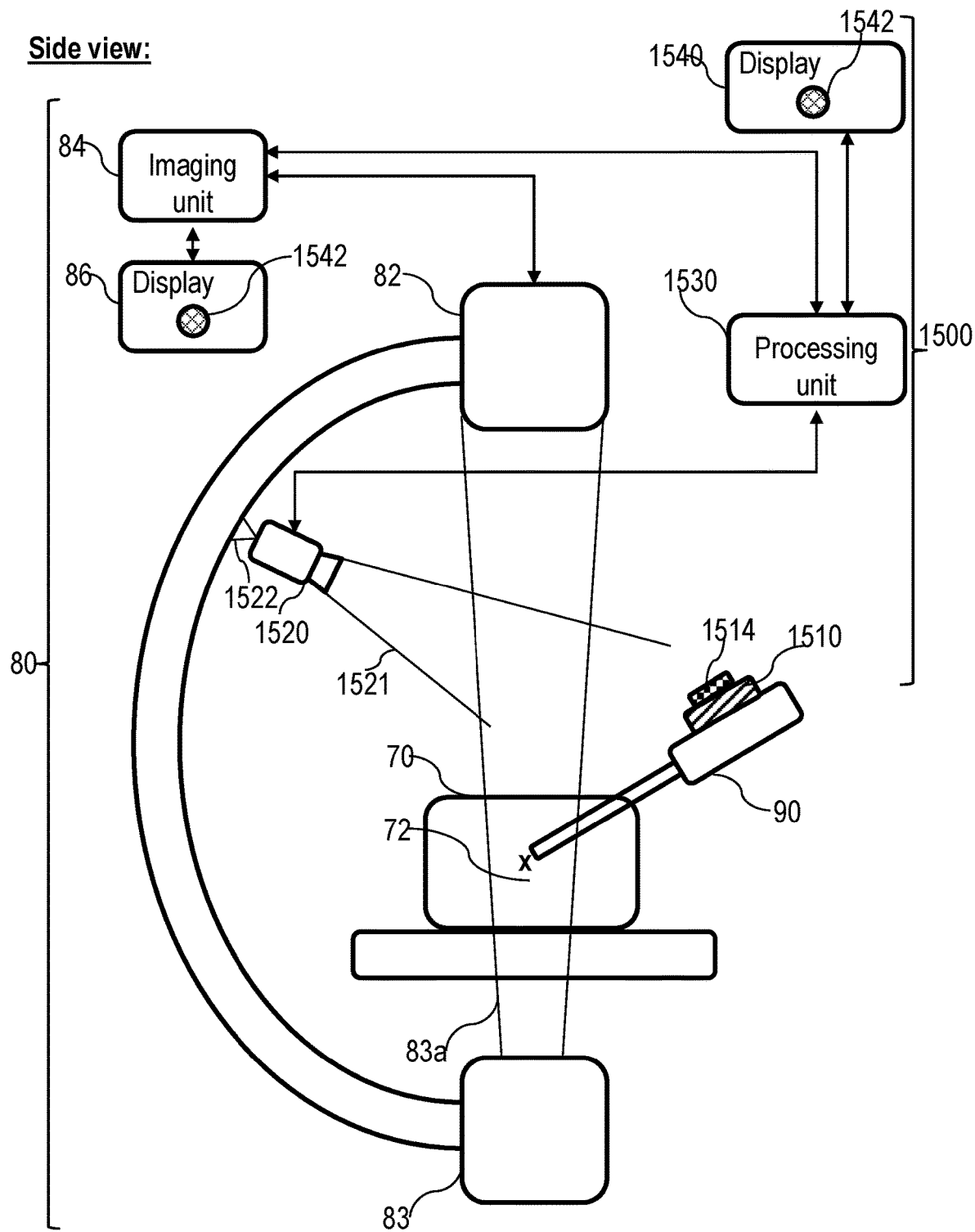
FIGS. 15A and 15B are schematic illustrations of a second embodiments of a system for aiming and/or aligning of a treatment tool in an X-Ray device environment, according to some embodiments of the invention.
Figure 15B:
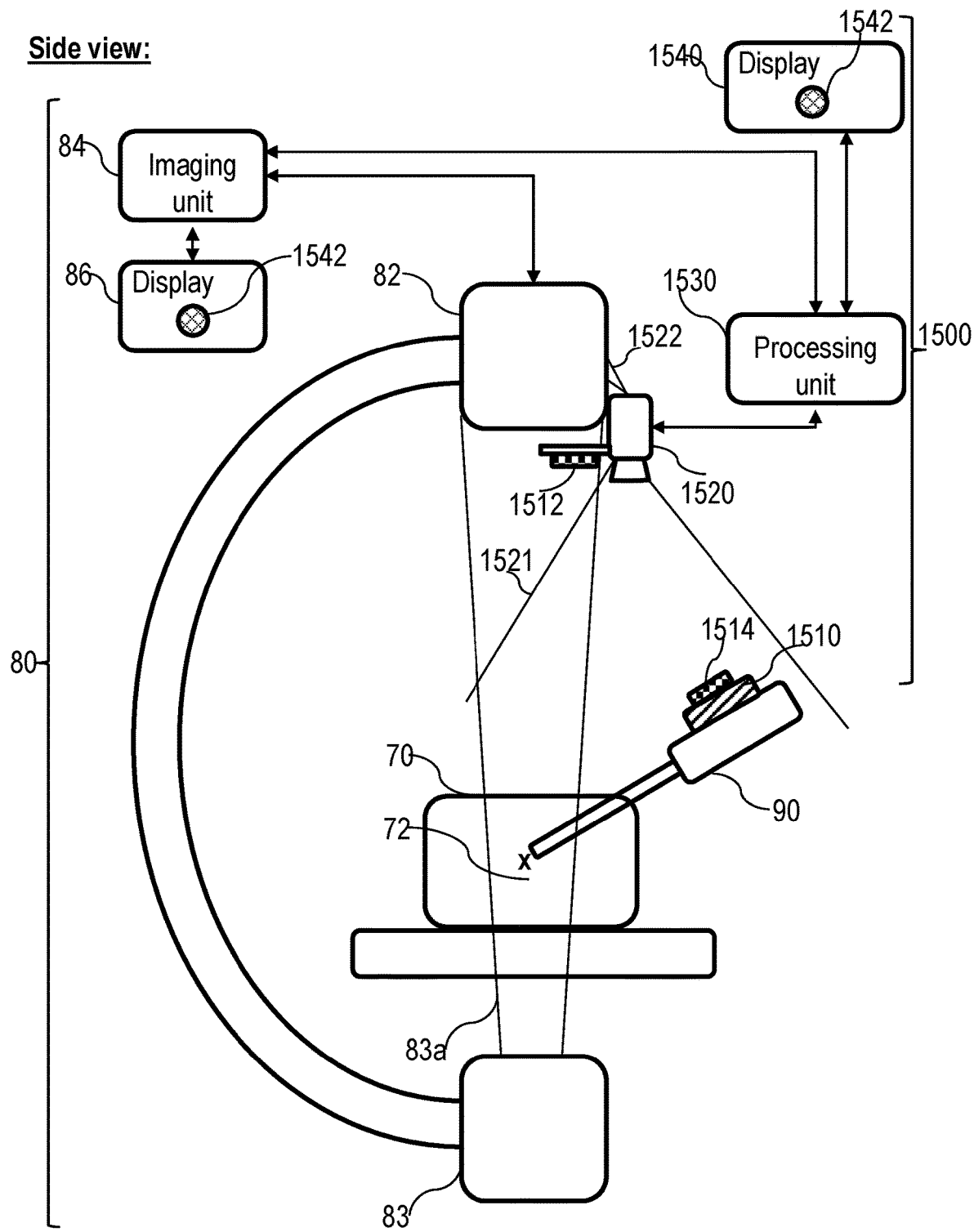

Reference is now made to FIGS. 15A and 15B, which are schematic illustrations of a second embodiments of a system 1500 for aiming and/or aligning of a treatment tool 90 in an X-Ray device 80 environment, according to some embodiments of the invention.

According to some embodiments, system 1500 may include a calibration plate 1510, a camera 1520 and a processing unit 1530 (e.g., as shown in FIGS. 15A and 15B). FIGS. 15A and 15B show a side view of system 1500. System 1500 may enable aiming of a treatment tool 90 at a target area 72 within a patient 70 and/or aligning of treatment tool 90 with respect to an X-Ray device 80, while significantly reducing the exposure of patient 70 to X-Ray radiation as compared to treatment procedures that are performed without system 1500.

According to some embodiments, calibration plate 1510 may include at least one optical marker 1514. Optical marker(s) 1514 may be positioned on the surface of calibration plate 1510 at predetermined and/or known positions. Calibration plate 1510 may be attachable, or removably attachable, to treatment tool 90. For example, calibration plate 1510 and optical marker(s) 1514 may be similar to calibration plate 110 (without radiopaque marker(s) 112) and optical marker(s) 114 described above with respect to FIG. 1.

According to some embodiments, camera 1520 is attachable, or removably attachable, to X-Ray device 80. Camera 1520 may be attachable to X-Ray device 80 at a predetermined and/or known position and orientation with respect to X-Ray device 80 (e.g., as shown in FIG. 15A).

In some embodiments, camera 1520 may include at least one radiopaque marker 1512. In this case, camera 1520 may be attached to X-Ray device 80 such that at least radiopaque marker(s) 1512 thereof will be disposed in field-of-view 83a of X-Ray source 83. For example, camera 1520 may be attachable to X-Ray intensifier 82 (e.g., as shown in FIG. 15B). In embodiments shown in FIG. 15B, the position and orientation of camera 1520 with respect to X-Ray device 80 may be unknown and it may be determined based on X-Ray imaging of radiopaque marker(s) 1512 attached to camera 1520 (e.g., as described above with respect to FIG. 1).

In some embodiments, system 1500 may include a camera connector 1522. Camera connector 1522 may be configured to tightly and stably attach camera 1520 to X-Ray device 80 and to prevent unintended relative movements of camera 1520 with respect to X-Ray device 80.

According to some embodiments, processing unit 1530 may be in communication (e.g., wired or wireless) with camera 1520 and with an X-Ray imaging unit 84 of X-Ray device 80.

According to some embodiments, processing unit 1530 may be configured to receive, from camera 1520, one or more camera images of calibration plate 1510. Camera image(s) of calibration plate 1510 may include a visual representation of optical marker(s) 1514.

According to some embodiments, processing unit 1530 may be configured to determine a position and orientation of calibration plate 1510 (that may be attached to, for example, treatment tool 90) with respect to camera 1520 based on the visual representation of optical marker(s) 1514 in the camera image(s), based on the known positions of optical marker(s) 1514 within calibration plate 1510 and based on parameters of camera 1520 (e.g., such as distortion, field of view 121, etc.). The determination thereof may be utilized using, for example, bundle adjustment/PnP algorithms.

According to some embodiments, processing unit 1530 may be configured to determine a position and orientation of treatment tool 90 with respect to X-Ray device 80 based on the determined position and orientation of calibration plate 1510 with respect to camera 1520 and the known position and orientation of camera 1520 with respect to the X-Ray device 80.

In embodiments shown in FIG. 15B where the position and orientation of camera 1520 with respect to X-Ray device 80 is not known and camera 1520 includes radiopaque marker(s) 1512, processing unit 1530 may be configured to receive an X-Ray image including a visual representation of the at least one radiopaque marker; and determine the position and orientation of the camera with respect to the X-Ray device based on the visual representation of the at least one radiopaque marker.

According to some embodiments, system 1500 may include a display 1540. Processing unit 1530 may be configured to present, for example on display 1540 and/or on X-ray display 86, at least one visual indicator 1542 that indicates the determined position and orientation of treatment tool 90.

In some embodiments, processing unit 1530 may be configured to determine whether the determined position and orientation of treatment tool 90 with respect to X-Ray device 80 is within an allowed error range as compared to a required position and orientation of treatment tool 90 with respect to X-Ray device 80. In some embodiments, processing unit 1530 may be configured to update visual indicator (s) 1542 to thereby indicate whether the position and orientation of treatment tool 90 is within the allowed error range thereof or not. The modification of visual indicator(s)

1542 may, for example, include change of a color and/or a shape of visual indicator(s) 1542 (e.g., according to predetermined rules).

In various embodiments, processing unit 1530 may be configured to superimpose visual indicator 1542 on, for example, an X-Ray image of target area 72 of patient 70 to yield a superimposed image, and to display the superimposed image on display 1540 and/or on X-Ray display 86.

In some embodiments, processing unit 1530 may be configured to detect, or mark, target area 72 in the X-Ray image thereof. Processing unit 1530 may be configured to determine whether treatment tool 90 is aligned with respect to target area 72 based on the determined position and orientation of treatment tool 90 and the X-Ray image. In some embodiments, processing unit 1530 may be configured to update visual indicator 1542 to thereby indicate whether treatment tool 90 is aligned with target area 72 or not.

In some embodiments, processing unit 1530 may generate treatment tool guiding instructions based on the determined position and orientation of treatment tool 90 with respect to X-Ray device 80 and display the treatment tool guiding instructions on display 86/1540 (e.g., as described above with respect to FIGS. 14A and 14B). The guiding instruction may be indicative of one or more directions in which treatment tool 90 should be moved (e.g., displaced and/or tilted) and/or a measure of movement in each of the direction(s) in order to bring treatment tool 90 into a position and orientation that is within the allowed error range thereof. The treatment tool guiding instructions may, for example, enable easy and intuitive aiming and/or aligning of treatment tool 90 with respect to target area 72 and/or X-Ray device 80.

System 1500 may enable the user (e.g., treating physician) to aim treatment tool 90 at target area 72 and/or to align (e.g., translate, tilt, pitch, yaw, roll, etc.) treatment tool 90 with respect to X-Ray device 80 using visual indicator 1542 displayed on display 1540 and/or on X-Ray display 86. Visual indicator 1542 may indicate the position and orientation of treatment tool 90 with respect to X-Ray device 80, which eliminates (or substantially eliminates) a need in X-Ray imaging of patent 70 during the aiming and/or aligning of treatment tool 90. When using system 1500, X-Ray imaging may be required only at final stages of aiming and/or aligning of treatment tool 90 in order to verify, prior to application of the treatment, that the actual position and orientation of treatment tool 90 with respect to X-Ray device 80 corresponds to the required position and orientation thereof or within the allowed error range thereof. In this manner, system 1500 may enable significantly reducing the exposure of the patient and/or the user to the X-Ray radiation during the treatment procedure as compared to current treatment procedures that require multiple exposures of patient 70 to X-Ray radiation during aiming and/or aligning of treatment tool 90.

Figure 16:
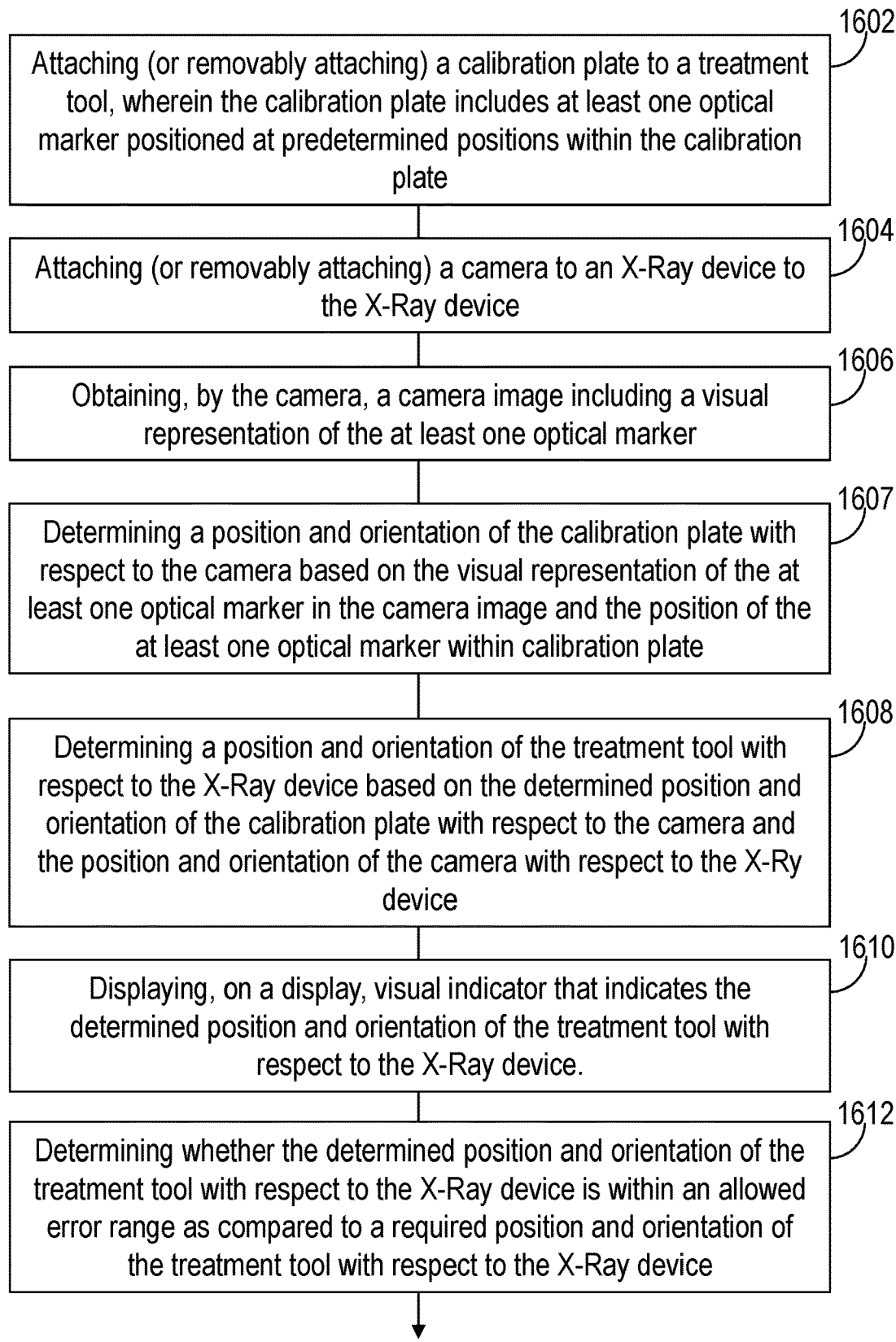
FIG. 16 is a flowchart of a second method of aiming and/or aligning a treatment tool in an X-Ray device environment, according to some embodiments of the invention.

Reference is now made to FIG. 16, which is a flowchart of a second method of aiming and/or aligning a treatment tool in an X-Ray device environment, according to some embodiments of the invention.

The method may be implemented by a system for aiming/aligning a treatment tool in an X-Ray device environment (such as system 1500 described above with respect to FIGS. 15A and 15B), which may be configured to implement the method. It is noted that the method is not limited to the flowcharts illustrated in FIG. 16 and to the corresponding description. For example, in various embodiments, the method needs not move through each illustrated box or stage, or in exactly the same order as illustrated and described.

According to some embodiments, the method includes attaching (or removably attaching) a calibration plate to a treatment tool, wherein the calibration plate includes at least one optical marker positioned at predetermined positions within the calibration plate (stage 1602). For example, calibration plate 1510 and optical marker(s) 1514 described above with respect to FIGS. 15A and 15B.

Some embodiments may include attaching (or removably attaching) a camera to an X-Ray device to the X-Ray device (stage 1604) (e.g., as described above with respect to FIGS. 15A and 15B). For example, camera 1520 described above with respect to FIGS. 15A and 15B.

Some embodiments may include obtaining, by the camera, a camera image including a visual representation of the at least one optical marker (stage 1606) (e.g., as described above with respect to FIG. 1 and FIG. 4).

Some embodiments may include determining a position and orientation of the calibration plate with respect to the camera based on the visual representation of the at least one optical marker in the camera image and the position of the at least one optical marker within calibration plate (stage 1607) (e.g., as described above with respect to FIGS. 15A and 15B). For example, by utilizing bundle adjustment/PnP algorithms as described above with respect to FIGS. 15A and 15B.

Some embodiments, may include determining a position and orientation of the treatment tool with respect to the X-Ray device based on the determined position and orientation of the calibration plate with respect to the camera and the position and orientation of the camera with respect to the X-Ry device (stage 1608) (e.g., as described above with respect to FIGS. 15A and 15B).

In some embodiments, the position and orientation of the camera with respect to the X-Ray device may be known/predetermined.

In some other embodiments, the camera may be attached to the X-Ray device at an arbitrary position and orientation, at least partly in the field-of-view of the X-Ray source of the X-Ray device and may include at least one radiopaque marker. These embodiments may include obtaining, by the X-Ray device, an X-Ray image of at least a portion of the camera and determining, based on visual representation of the at least one radiopaque marker in the X-Ray image, the position and orientation of the camera with respect to the X-Ray device.

Some embodiments may include displaying, on a display, visual indicator that indicates the determined position and orientation of the treatment tool (stage 1610). For example, visual indicator 1542 described above with respect to FIGS. 15A and 15B.

Some embodiments may include determining whether the determined position and orientation of the treatment tool with respect to the X-Ray device is within an allowed error range as compared to a required position and orientation of the treatment tool with respect to the X-Ray device (stage 1612) (e.g., as described above with respect to FIGS. 15A and 15B).

Some embodiments may include updating the visual indicator to thereby indicate whether the position and orientation of the treatment tool with respect to the X-Ray device is within the allowed error range thereof or not (stage 1614) (e.g., as described above with respect to FIGS. 15A and 15B).

Some embodiments may include superimposing the visual indicator and an X-Ray image of a target area of a patient to yield a superimposed image, and displaying the superimposed image on the display (stage 1616).

Some embodiments may include detecting, or marking, the target area in the X-Ray image thereof and determining whether the treatment tool is aligned with respect to the target area based on the determined position and orientation of treatment tool and the X-Ray image (stage 1618).

Some embodiments may include updating the visual indicator to indicate whether the treatment tool is aligned with the target area or not (stage 1620).

Some embodiments may include generating and displaying, on the display, treatment tool guiding instructions indicative of one or more directions in which the treatment tool should be moved (e.g., displaced and/or tilted) and/or a measure of movement in each of the direction(s) in order to bring the treatment tool into a position and orientation that is within the allowed error range thereof (stage 1622). The treatment tool guiding instructions may be determined based on the determined position and orientation of the treatment tool with respect to the X-Ray device, for example, as described above with respect to FIGS. 14A and 14B. The treatment tool guiding instructions may, for example, enable easy and intuitive aiming and/or aligning of the treatment tool with respect to the target area and/or the X-Ray device.

Some embodiments may include aiming and aligning the treatment tool according to the visual indicator displayed on the display, without exposing a patient to X-Ray imaging by the X-Ray device (stage 1624) (e.g., as described above with respect to FIGS. 15A and 15B).

Figure 17:
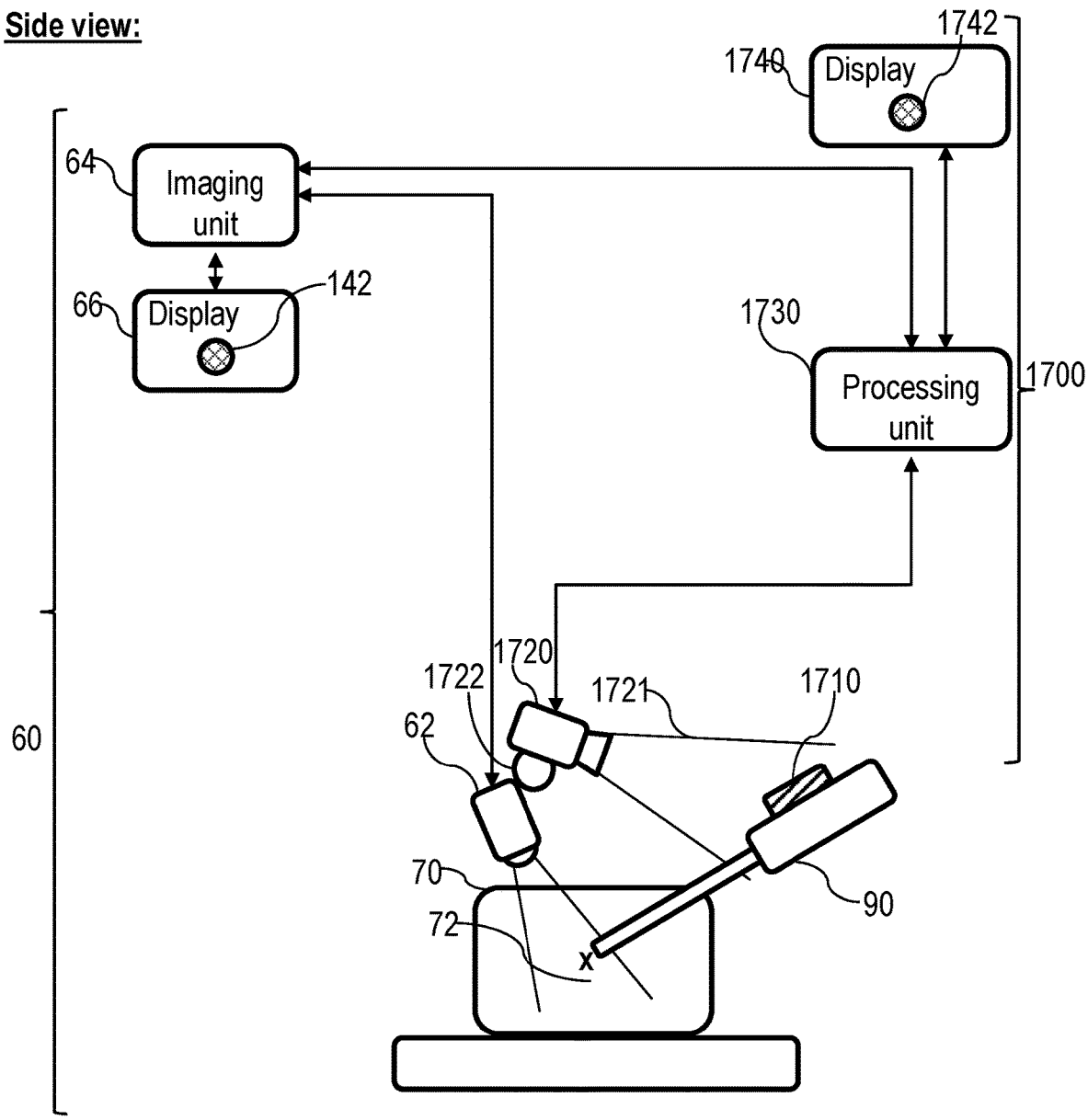
FIG. 17 is a schematic illustration of a second embodiment of a system for aiming and/or aligning of a treatment tool in an ultrasound imaging device environment, according to some embodiments of the invention.

Reference is now made to FIG. 17, which is a schematic illustration of a second embodiment of a system 1700 for aiming and/or aligning of a treatment tool 90 in an ultrasound imaging device 60 environment, according to some embodiments of the invention.

According to some embodiments, system 1700 may include a calibration plate 1710, a camera 1720 and a processing unit 1730. FIG. 17 shows a side view of system 1700. System 1700 may enable aiming of a treatment tool 90 at a target area 72 within a patient 70 and/or aligning of treatment tool 90 with respect to an ultrasound imaging probe 62.

Ultrasound imaging device 60 may be any type of ultrasound imaging device, for example a handheld device, a laptop device, a probe that is connected to a cell phone or tablet, or a system on a portable cart and may include one or more probes and other accessories.

Treatment tool 90 may be, for example, an invasive treatment tool (such as a needle (e.g., biopsy needle, radiofrequency needle) and/or a probe) or a non-invasive treatment tool (such as an ultrasound transducer or a focused ultrasound transducer) that needs to be aimed with respect to target area 72 and/or aligned with respect to ultrasound imaging probe 62. For example, FIG. 17 shows a needle as an example for treatment tool 90.

According to some embodiments, calibration plate 1710 may include at least one optical marker. Optical marker(s) may be positioned within calibration plate 1710 at predetermined and/or known positions. Calibration plate 1710 may be attachable, or removably attachable, to treatment tool 90.

According to some embodiments, camera 1720 is attachable, or removably attachable, to ultrasound imaging probe 62 of ultrasound device 60. Camera 1720 may be attachable to ultrasound imaging probe 62 at a predetermined and/or known position and orientation with respect to treatment tool 90. Camera 1720 may be attachable to ultrasound imaging probe 62 such that at least a portion of calibration plate 1710 will be within a field of view 1721 of camera 1720.

In some embodiments, system 1700 may include a camera connector 1722. Camera connector 1722 may be configured to tightly and stably attach camera 1720 to ultrasound imaging probe 62 and to prevent unintended relative movements of camera 1720 with respect to ultrasound imaging probe 62.

According to some embodiments, processing unit 1730 may be in communication (e.g., wired or wireless) with camera 1720 and with an ultrasound imaging unit 64 of ultrasound imaging device 60.

According to some embodiments, processing unit 1730 may be configured to receive, from camera 1720, one or more camera images of calibration plate 1710. Camera image(s) of calibration plate 1710 may include a visual representation of optical marker(s).

According to some embodiments, processing unit 1730 may be configured to determine a position and orientation of calibration plate 1710 with respect to camera 1720 (that may be attached to, for example, ultrasound imaging probe 62) based on the visual representation of optical marker(s) in the camera image(s), based on the known positions of optical marker(s) within calibration plate 1710 and based on parameters of camera 1720 (e.g., such as distortion, field of view 1721, etc.). The determination thereof may be utilized using, for example, bundle adjustment/PnP algorithms.

According to some embodiments, processing unit 1730 may be configured to determine a position and orientation of treatment tool 90 with respect to ultrasound imaging probe 62 based on a predetermined position and orientation of calibration plate 1710 with respect to treatment tool 90, the determined position and orientation of calibration plate 1710 with respect to camera 1720 and the known position and orientation of camera 1720 with respect to the ultrasound imaging probe 62.

According to some embodiments, system 1700 may include a display 1740. Processing unit 1730 may be configured to present, for example on display 1740 and/or on ultrasound display 66, at least one visual indicator 1742 that indicates the determined position and orientation of treatment tool 90.

In some embodiments, processing unit 1730 may be configured to determine whether the determined position and orientation of treatment tool 90 with respect to ultrasound imaging probe 62 is within an allowed error range as compared to a required position and orientation of treatment tool 90 with respect to the ultrasound imaging probe 62. Processing unit 1730 may be configured to modify visual indicator 1742 to thereby indicate whether the position and orientation of treatment tool 90 with respect to ultrasound imaging probe 62 is within the allowed error range thereof or not.

In various embodiments, processing unit 1730 may be configured to superimpose visual indicator 1742 on, for example, an ultrasound image of target area 72 of patient 70 to yield a superimposed image, and to display the superimposed image on display 1740 and/or on ultrasound display 66.

In some embodiments, processing unit 1730 may be configured to detect, or mark, target area 72 in the ultrasound image thereof. Processing unit 1730 may be configured to determine whether treatment tool 90 is aligned with respect to target area 72 based on the determined position and orientation of treatment tool 90 and the ultrasound image. In some embodiments, processing unit 1730 may be configured to update visual indicator 142 to thereby indicate whether treatment tool 90 is aligned with target area 72 or not.

In some embodiments, processing unit 1730 may generate treatment tool guiding instructions based on the determined position and orientation of treatment tool 90 with respect to ultrasound imaging probe 62 and display the treatment tool guiding instructions on display 86/1740 (e.g., as described above with respect to FIGS. 14A and 14B). The treatment tool guiding instructions may be indicative of one or more directions in which treatment tool 90 should be moved (e.g., displaced and/or tilted) and/or a measure of movement in each of the direction(s) in order to bring treatment tool 90 into a position and orientation that is within the allowed error range thereof and/or that is aligned with respect to target area 72. The treatment tool guiding instructions may, for example, enable easy and intuitive aiming and/or aligning of treatment tool 90 with respect to target area 72 and/or ultrasound imaging probe 62.

System 1700 may enable the user (e.g., treating physician) to aim treatment tool 90 at target area 72 and/or to align (e.g., translate, tilt, pitch, yaw, roll, etc.) treatment tool 90 with respect to ultrasound imaging probe 62 using visual indicator 1742 displayed on display 1740 and/or on ultrasound display 66. Visual indicator 1742 may indicate the position and orientation of treatment tool 90 with respect to ultrasound imaging probe 62, which eliminates (or substantially eliminates) a need for ultrasound imaging of the tip of the treatment tool. When using system 1700, ultrasound imaging of the treatment tool tip (where applicable), may be required only at final stages of aiming and/or aligning of treatment tool 90 in order to verify, prior to application of the treatment, that the actual position and orientation of treatment tool 90 with respect to patient anatomy is correct. In this manner, system 1700 may enable significantly reducing the procedure time as compared to current treatment procedures.

Figure 18:
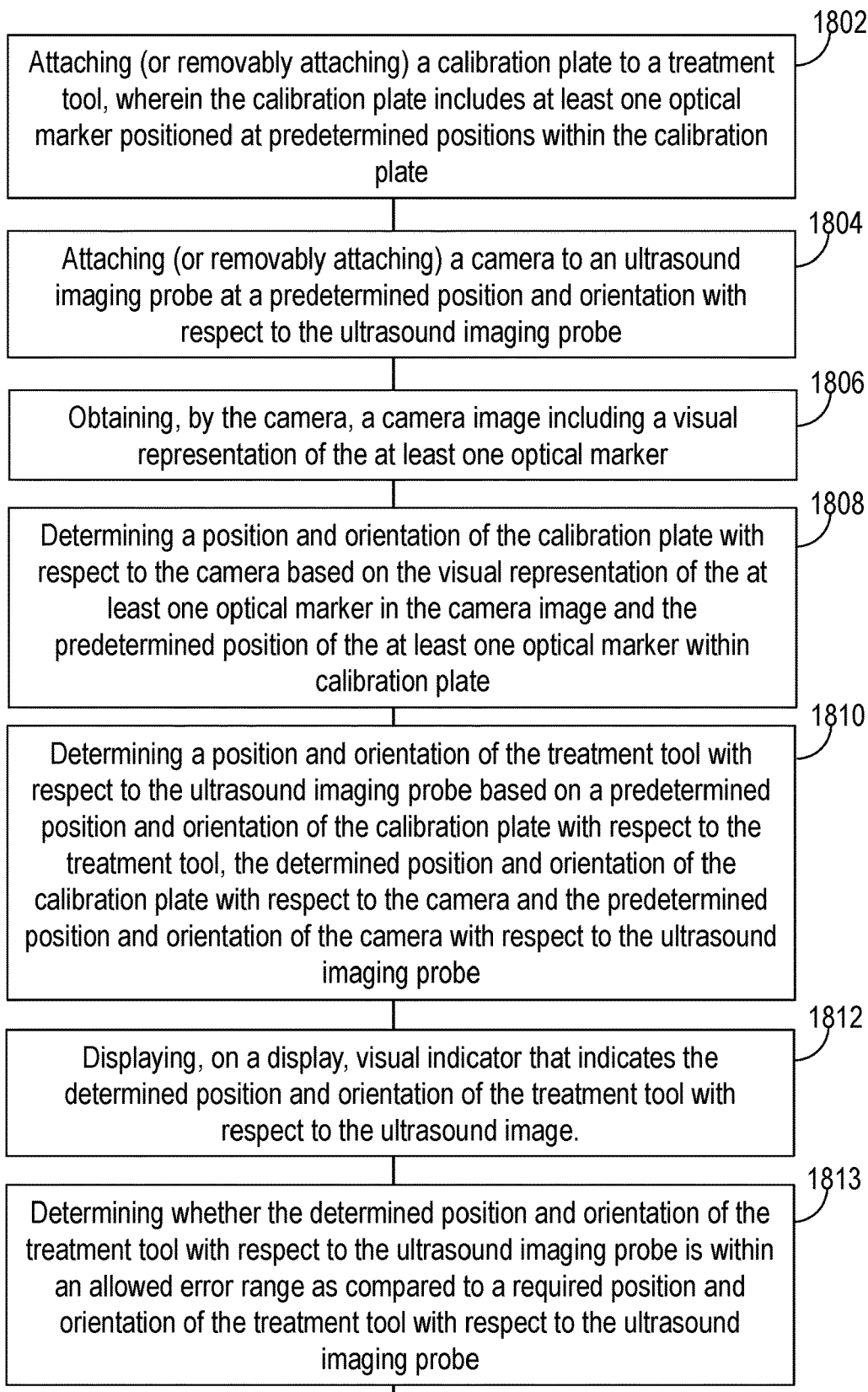
FIG. 18 which is a flowchart of a second method of aiming and/or aligning a treatment tool in an ultrasound imaging device environment, according to some embodiments of the invention.
Figure 18:
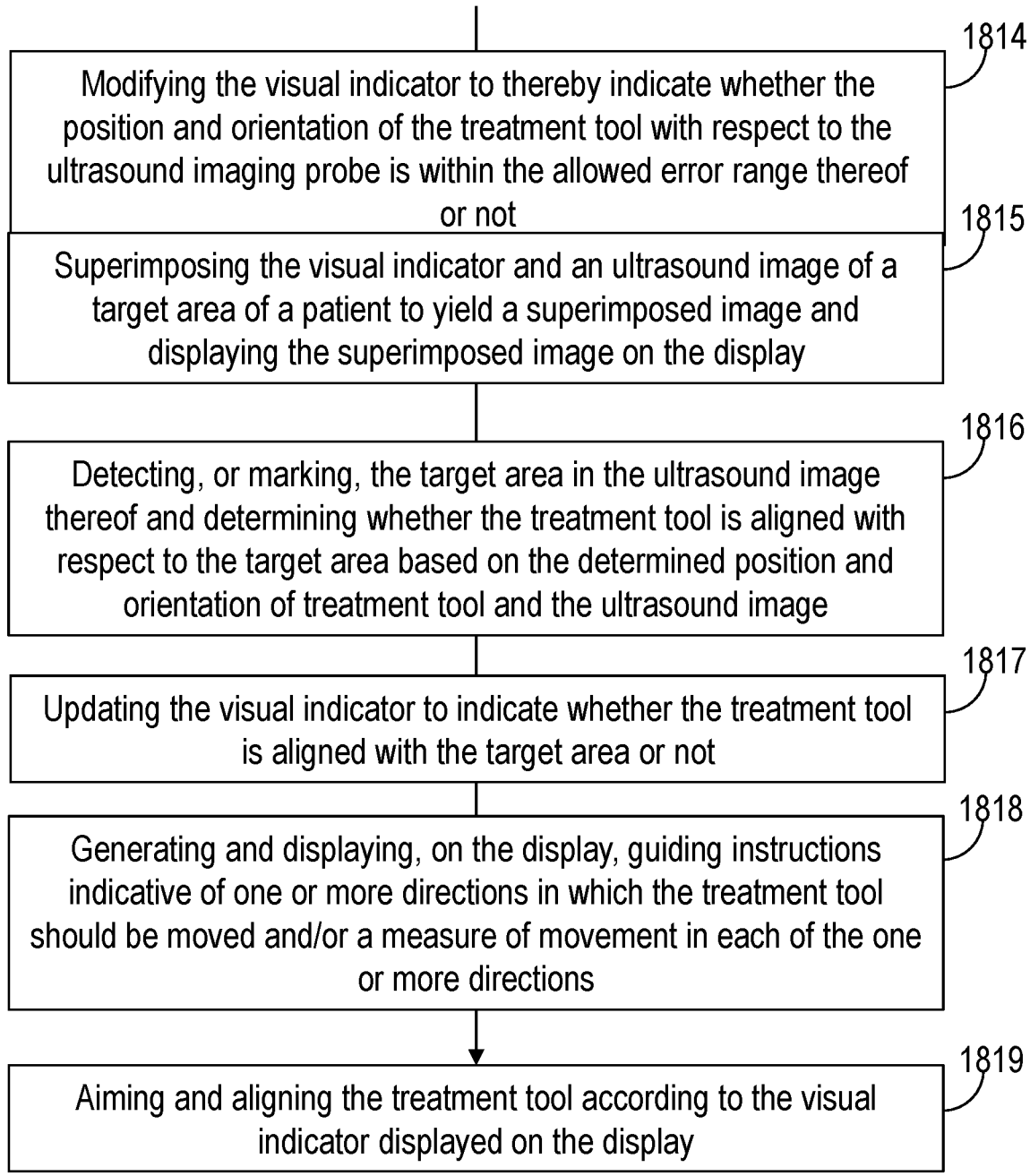

Reference is now made to FIG. 18, which is a flowchart of a second method of aiming and/or aligning a treatment tool in an ultrasound imaging device environment, according to some embodiments of the invention.

The method may be implemented by a system for aiming/aligning a treatment tool in an ultrasound imaging device environment (such as system 1700 described above with respect to FIG. 17), which may be configured to implement the method. It is noted that the method is not limited to the flowcharts illustrated in FIG. 18 and to the corresponding description. For example, in various embodiments, the method needs not move through each illustrated box or stage, or in exactly the same order as illustrated and described.

According to some embodiments, the method includes attaching (or removably attaching) a calibration plate to a treatment tool, wherein the calibration plate includes at least one optical marker positioned at predetermined positions within the calibration plate (stage 1802). For example, calibration plate 1710 described above with respect to FIG. 17.

Some embodiments may include attaching (or removably attaching) a camera to an ultrasound imaging probe at a predetermined position and orientation with respect to the ultrasound imaging probe (stage 1804) (e.g., as described above with respect to FIG. 17). For example, camera 1720 described above with respect to FIG. 17.

Some embodiments may include obtaining, by the camera, a camera image including a visual representation of the at least one optical marker (stage 1806) (e.g., as described above with respect to FIG. 17).

Some embodiments may include determining a position and orientation of the calibration plate with respect to the camera based on the visual representation of the at least one optical marker in the camera image and the predetermined position of the at least one optical marker within calibration plate (stage 1808) (e.g., as described above with respect to FIG. 17). For example, by utilizing bundle adjustment/PnP algorithms as described above with respect to FIG. 17.

Some embodiments, may include determining a position and orientation of the treatment tool with respect to the ultrasound imaging probe based on a predetermined position and orientation of the calibration plate with respect to the treatment tool, the determined position and orientation of the calibration plate with respect to the camera and the predetermined position and orientation of the camera with respect to the ultrasound imaging probe (stage 1810) (e.g., as described above with respect to FIG. 17).

Some embodiments may include displaying, on a display, a visual indicator that indicates the determined position and orientation of the treatment tool with respect to the ultrasound imaging probe (stage 1812). For example, visual indicator 1742 described above with respect to FIG. 17.

Some embodiments may include determining whether the determined position and orientation of the treatment tool with respect to the ultrasound imaging probe is within an allowed error range as compared to a required position and orientation of the treatment tool with respect to the ultrasound imaging probe (stage 1813). This may, for example, allow fast and accurate targeting of the treatment tool to the target area.

Some embodiments may include modifying the visual indicator to thereby indicate whether the position and orientation of the treatment tool with respect to the ultrasound imaging probe is within the allowed error range thereof or not (stage 1814).

Some embodiments may include superimposing the visual indicator and an ultrasound image of a target area of a patient to yield a superimposed image and displaying the superimposed image on the display (stage 1815).

Some embodiments may include detecting, or marking, the target area in the ultrasound image thereof and determining whether the treatment tool is aligned with respect to the target area based on the determined position and orientation of treatment tool and the ultrasound image (stage 1816).

Some embodiments may include updating the visual indicator to indicate whether the treatment tool is aligned with the target area or not (stage 1817).

Some embodiments may include generating and displaying, on the display, treatment tool guiding instructions indicative of one or more directions in which the treatment tool should be moved (e.g., displaced and/or tilted) and/or a measure of movement in each of the direction(s) in order to bring the treatment tool into a position and orientation that is within an allowed error range (stage 1818). For example, as described below with respect to FIGS. 14A and 14B. This may, for example, thereof allow a fast and accurate targeting of treatment tool to the target area.

Some embodiments may include aiming and/or aligning the treatment tool according to the a least one visual indicator displayed on the display (stage 1819).

Advantageously, the disclosed systems and methods may enable the user (e.g., treating physician) to aim a treatment tool at a target area within a patient and/or to align the treatment tool with respect to an imaging device using a visual indicator (e.g., displayed on a display) configured to indicate the determined position and orientation of the treatment tool with respect to the imaging device. This may be achieved without a need in mechanical connection of the treatment tool to the imaging device and without a need in complex and/or expensive tracking units required in current procedures. Furthermore, the disclosed systems and methods may increase an accuracy of the procedure, reduce the dependency of the accuracy thereof on the user's skillfulness and/or reduce a duration of the treatment procedure, as compared to current treatment procedures that do not utilize the disclosed systems and methods.

In the case of X-Ray imaging device, the disclosed systems and method may eliminate a need in X-Ray imaging of a patient during the aiming and/or aligning of the treatment tool, which may significantly reduce the exposure of the patient and/or the user to the X-Ray radiation during the treatment procedure and/or significantly reduce the time duration of the treatment procedure as compared to current treatment procedures that require X-Ray imaging of the patient during the aiming and/or aligning of the treatment tool. When using the disclosed systems and methods, the X-Ray imaging of the treatment tool and the patient may be required only at final stages of the aiming and/or aligning of the treatment tool in order to verify, prior to application of the treatment, that the actual position and orientation of the treatment tool with respect to the X-Ray device corresponds to the required position and orientation thereof or within the allowed error range thereof.

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram or portions thereof.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions thereof. The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions thereof.

The aforementioned flowchart and diagrams illustrate the architecture, functionality, and operation of possible implementations of systems, methods and computer program products according to various embodiments of the present invention. In this regard, each portion in the flowchart or portion diagrams can represent a module, segment, or portion of code, which includes one or more executable instructions for implementing the specified logical function(s). It should also be noted that, in some alternative implementations, the functions noted in the portion can occur out of the order noted in the figures. For example, two portions shown in succession can, in fact, be executed substantially concurrently, or the portions can sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A system for aiming and aligning of a treatment tool in an X-ray device, the X-Ray device comprising an X-Ray source, an X-Ray intensifier and an X-Ray imaging unit, the system comprising:
    a calibration plate attachable to the X-Ray device and comprising at least one radiopaque marker and at least one optical marker at predetermined positions within the calibration plate;
    a camera attachable to the treatment tool at a predetermined position and orientation with respect to the treatment tool; and
    a processor in communication with the camera and the X-Ray imaging unit of the X-Ray device, the processor configured to, upon attachment of the calibration plate to the X-Ray device and attachment of the camera to the treatment tool:

receive, from the X-Ray imaging unit, an X-Ray image comprising a visual representation of the at least one radiopaque marker;

determine a position and orientation of the calibration plate with respect to the X-Ray device based on the visual representation of the at least one radiopaque marker in the X-Ray image, the predetermined position of the at least one radiopaque marker within the calibration plate and specified parameters of the X-Ray device, the specified parameters comprising a distance value between the X-Ray source and the X-Ray intensifier;

receive, from the camera, a camera image comprising a visual representation of the at least one optical marker;

determine a position and orientation of the camera with respect to the calibration plate based on the visual representation of the at least one optical marker in the camera image and the predetermined position of the at least one optical marker within the calibration plate; and determine a position and orientation of the treatment tool with respect to the X-Ray device based on the determined position and orientation of the calibration plate with respect to the X-Ray device, the determined position and orientation of the camera with respect to the calibration plate and the predetermined position and orientation of the camera with respect to the treatment tool.

2. The system of claim 1, wherein the calibration plate comprises at least one of:

at least one non-symmetric radiopaque marker; and multiple symmetric radiopaque markers that are asymmetrically positioned within the calibration plate.

3. The system of claim 1, wherein the calibration plate comprises multiple optical markers.

4. The system of claim 1, further comprising a display and wherein the processor is configured to present, on the display, a visual indicator that indicates the determined position and orientation of the treatment tool with respect to the X-Ray device.

5. The system of claim 4, wherein the processor is configured to:

determine whether the determined position and orientation of the treatment tool with respect to the X-Ray device is within an allowed error range as compared to a required position and orientation of the treatment tool with respect to the X-Ray device; and modify the visual indicator to thereby indicate whether the position and orientation of the treatment tool with respect to the X-Ray device is within the allowed error range thereof or not.

6. The system of claim 4, wherein the processor is configured to superimpose the visual indicator on the X-Ray image, the X-Ray image further comprising representation of a target area within a patient.

7. The system of claim 6, wherein the processor is configured to:

detect, or mark, the target area in the X-Ray image;

determine whether the treatment tool is aligned with respect to the target area based on the determined position and orientation of the treatment tool with respect to the X-Ray device and the X-Ray image; and modify the visual indicator to indicate whether the treatment tool is aligned with respect to the target area.

8. The system of claim 4, wherein the processor is configured to:

generate treatment tool guiding instructions based on the determined position and orientation of the treatment tool with respect to the X-Ray device; and display the treatment tool guiding instructions on the display.

9. The system of claim 8, wherein the treatment tool guiding instructions are indicative of one or more directions in which the treatment tool should be moved and a measure of movement in each of the one or more directions in order to bring the treatment tool into a position and orientation that is within an allowed error range thereof.

10. The system of claim 8, wherein the processor is configured to display at least one of:

treatment tool visual data comprising a visual representation of at least a portion of the treatment tool; and system components visual data comprising a visual representation of at least one component of the system and indicative of an actual position and orientation of the respective at least one component with respect to the treatment tool.

* * * * *